United States Patent
Han et al.

(10) Patent No.: US 9,753,940 B2
(45) Date of Patent: Sep. 5, 2017

(54) APPARATUS AND METHOD FOR TRANSMITTING DATA

(75) Inventors: Jae Joon Han, Gyeonggi-do (KR); Seung Ju Han, Gyeonggi-do (KR); Won Chul Bang, Gyeonggi-do (KR); Do Kyoon Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 731 days.

(21) Appl. No.: 13/811,091

(22) PCT Filed: Jul. 21, 2011

(86) PCT No.: PCT/KR2011/005379
§ 371 (c)(1),
(2), (4) Date: Mar. 29, 2013

(87) PCT Pub. No.: WO2012/011755
PCT Pub. Date: Jan. 26, 2012

(65) Prior Publication Data
US 2013/0204852 A1    Aug. 8, 2013

(30) Foreign Application Priority Data
Jul. 21, 2010 (KR) .................. 10-2010-0070667

(51) Int. Cl.
*G06F 17/30* (2006.01)
*H04L 29/06* (2006.01)

(52) U.S. Cl.
CPC ........ *G06F 17/30179* (2013.01); *H04L 67/38* (2013.01)

(58) Field of Classification Search
CPC ..................... G06F 17/30179; H04L 67/38
See application file for complete search history.

(56) References Cited

U.S. PATENT DOCUMENTS

| | | | | |
|---|---|---|---|---|
| 6,624,769 B2 * | 9/2003 | Oktem | ................. | H03M 7/30 341/51 |
| 7,149,770 B1 * | 12/2006 | Kalva | ............ | H04N 21/234318 709/203 |
| 7,712,097 B2 * | 5/2010 | Byrne | ................. | G06Q 30/06 707/999.103 |

(Continued)

FOREIGN PATENT DOCUMENTS

| CN | 101346689 A | 1/2009 |
|---|---|---|
| JP | 2002-123838 | 4/2002 |

(Continued)

OTHER PUBLICATIONS

"Preserving Avatar Genuineness in Different Display Media" Carretero et al. (Jul. 15, 2008).*

(Continued)

*Primary Examiner* — Shew-Fen Lin
(74) *Attorney, Agent, or Firm* — NSIP Law

(57) ABSTRACT

A data transmission apparatus and method. Information exchange between virtual worlds is achieved by encoding information on a virtual world into metadata and transmitting the metadata to another virtual world. In particular, since the information on the virtual world is encoded into a binary format, high speed data transmission may be achieved.

15 Claims, 30 Drawing Sheets

(56) References Cited

U.S. PATENT DOCUMENTS

| | | | |
|---|---|---|---|
| 8,651,964 B2* | 2/2014 | Brick | A63F 13/211 463/2 |
| 2005/0216515 A1 | 9/2005 | Bray et al. | |
| 2007/0111795 A1* | 5/2007 | Choi | A63F 13/12 463/42 |
| 2007/0124789 A1 | 5/2007 | Sachson et al. | |
| 2007/0143315 A1 | 6/2007 | Stone | |
| 2008/0120558 A1 | 5/2008 | Nathan et al. | |
| 2009/0271715 A1 | 10/2009 | Tumuluri | |
| 2009/0276718 A1 | 11/2009 | Dawson et al. | |
| 2010/0005028 A1 | 1/2010 | Hartley et al. | |

FOREIGN PATENT DOCUMENTS

| | | |
|---|---|---|
| JP | 2003-256105 A | 9/2003 |
| JP | 2004-523166 A | 7/2004 |
| JP | 2005-215951 A | 8/2005 |
| JP | 2008-219264 A | 9/2008 |
| JP | 2009-501991 A | 1/2009 |
| KR | 10-2006-0085907 | 7/2006 |
| KR | 10-2009-0048288 | 5/2009 |
| KR | 10-2010-0034686 | 4/2010 |

OTHER PUBLICATIONS

"Lossless compression" Wikipedia.org (Jul. 4, 2009).*
"Living Greyhawk D&D v.3.5 Conversion Guidelines" (2003).*
Chinese Office Action issued on Jan. 12, 2015, in counterpart Chinese Application No. 201180035435.4 (11 pages in English, 9 pages in Chinese).
International Search Report of Corresponding PCT Application PCT/KR2011/005379 mailed Mar. 7, 2012.
Carretero, María, et al. "*Preserving avatar genuineness in different display media.*" Mobile Networks and Applications 13.6 (2008): 627-634 (8 pages in English).
Korean Office Action issued on Dec. 15, 2015 in counterpart Korean Application No. 10-2010-0070667 (6 pages with English translation).
Nakao, T. et al., "On the Object Sharing Architecture for an Integrative Use of Virtual Spaces," Multimedia, Distributed, Cooperative, and Mobile (DICOMO) Symposium Journals 1997-2006 Ver.1.1 [DVD-ROM], Corporation information processing society, Jun. 27, 2001, vol. 2001, Issue 7, pp. 247-252.
Japanese Office Action issued in counterpart Japanese Patent Application No. 2013-520670 on Jun. 30, 2015 (2 pages in English, 3 pages in Japanese).
Extended European Search Report issued on Apr. 25, 2016 in counterpart European Application No. 11809882.1. (7 pages in English).
International Organization for Standardization, and International Electrotechnical Commission. "Part 1: Binary MPEG Format for XML." Information Technology—MPEG Systems Technologies. International Standard ISO/IEC 23001-1, First Edition, 2006. (61 pages in English).
Japanese Office Action issued on May 31, 2016 in counterpart Japanese Application No. 2013-520670. (23 pages with English translation).

* cited by examiner

APPARATUS AND METHOD FOR TRANSMITTING DATA

CROSS-REFERENCE TO RELATED APPLICATIONS

This application is a U.S. National Phase application of International Application No. PCT/KR2011/005379, filed on Jul. 21, 2011, and which claims the priority benefit of Korean Patent Application No. 10-2010-0070667, filed Jul. 21, 2010, in the Korean Intellectual Property Office, the disclosure of each of which are incorporated herein by reference.

BACKGROUND

1. Field

Example embodiments of the following disclosure relate to a data transmission apparatus and method, and more particularly, to an apparatus and method for transmitting information on a virtual object of a virtual world.

2. Description of the Related Art

Currently, interest in experience-type games has been increasing in the video gaming market, for example. MICROSOFT CORPORATION introduced PROJECT NATAL at the "E3 2009" Press Conference. PROJECT NATAL may provide a user body motion capturing function, a face recognition function, and a voice recognition function by combining MICROSOFT's XBOX 360 game console with a separate sensor device including a depth/color camera and a microphone array, thereby enabling a user to interact with a virtual world without a dedicated controller. In addition, SONY CORPORATION introduced WAND which is an experience-type game motion controller. The WAND enables interaction with a virtual world through input of a motion trajectory of a controller by applying, to the SONY PLAYSTATION 3 game console, a location/direction sensing technology obtained by combining a color camera, a marker, and an ultrasonic sensor.

The real world and a virtual world may interact with each other in one of two directions. In one direction, data information obtained by a sensor in the real world may be reflected to the virtual world. In the other direction, data information obtained from the virtual world may be reflected to the real world using an actuator, for example.

Meanwhile, with development in a technology related to the virtual world, research with respect to the interaction between virtual worlds is actively being conducted. For the interaction, a method of transmitting information on one virtual world to another virtual world is necessitated.

Accordingly, example embodiments suggest an apparatus and method for transmitting data related to a virtual world for exchange of information between virtual worlds.

SUMMARY

Additional aspects and/or advantages will be set forth in part in the description which follows and, in part, will be apparent from the description, or may be learned by practice of the invention.

According to an aspect of the present disclosure, there is provided a data transmission apparatus that transmits data from a first virtual world to a second virtual world, the data transmission apparatus including an encoder to encode information on the first virtual world into first metadata; and a transmission unit to transmit the first metadata to the second virtual world.

According to another aspect of the present disclosure, there is provided a data transmission method to transmit data from a first virtual world to a second virtual world, the data transmission method including encoding information on the first virtual world into first metadata; and transmitting the first metadata to the second virtual world.

According to another aspect of the present disclosure, there is provided a system for transmitting data between a first virtual world and a second virtual world, the system including: a first data transmission apparatus to encode information relating to the first virtual world, and to transmit the encoded information to a second data transmission apparatus; and the second data transmission apparatus to receive the encoded information from the first data transmission apparatus, and to decode the received encoded information, wherein the decoded information is applied to the second virtual world.

According to example embodiments, information exchange between virtual worlds is implemented by encoding information on a virtual world into metadata and transmitting the metadata to another virtual world.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
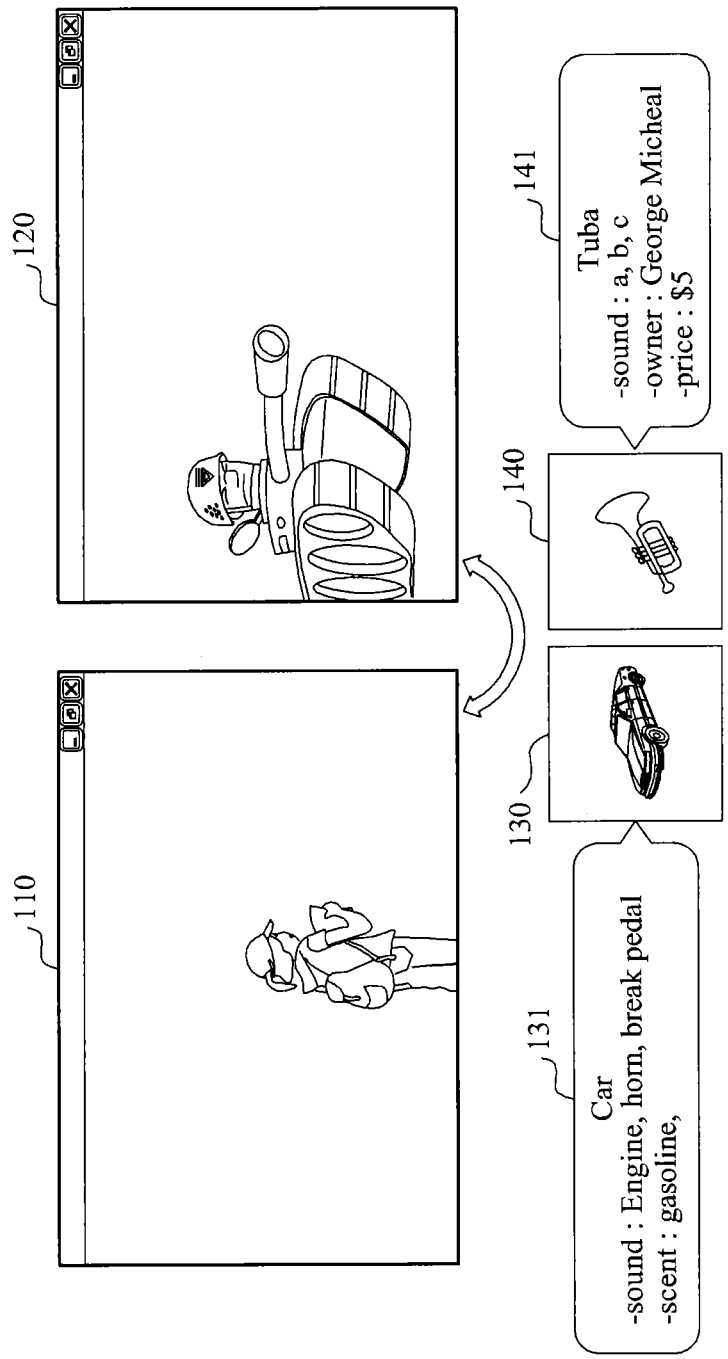
FIG. 1 illustrates an operation of transmitting an object from a virtual world to another virtual world by a data transmission apparatus, according to example embodiments.

Reference will now be made in detail to embodiments of the present disclosure, examples of which are illustrated in the accompanying drawings. However, the embodiments are not limiting. In the drawings, like reference numerals refer to the like elements throughout.

FIG. 1 illustrates an operation of transmitting an object from a virtual world to another virtual world by a data transmission apparatus, according to example embodiments.

Referring to FIG. 1, a first virtual world 110 may include a car 130 and a musical instrument 140.

The car 130, as an object of the virtual world 110, may include information 131 relating to the car 130. The information 131 may include sound information of an engine, a horn, and a brake pedal, and scent information of gasoline.

The musical instrument 140, as an object of the virtual world 110, may include information 141 relating to the musical instrument 140. The information 141 may include sound information, such as, a, b, and c, owner information, such as, George Michael, and price information, such as, $5.

The data transmission apparatus according to example embodiments may migrate a virtual object from a certain virtual world to another virtual world.

Depending on embodiments, the data transmission apparatus with respect to the first virtual world 110 may transmit information relating to the first virtual world 110 to a second virtual world 120. For example, the data transmission apparatus with respect to the first virtual world 110 may transmit, to the second virtual world 120, the information 131 and 141 related to the car 130 and the musical instrument 140, respectively, which are the objects implemented in the first virtual world 110.

Figure 2:
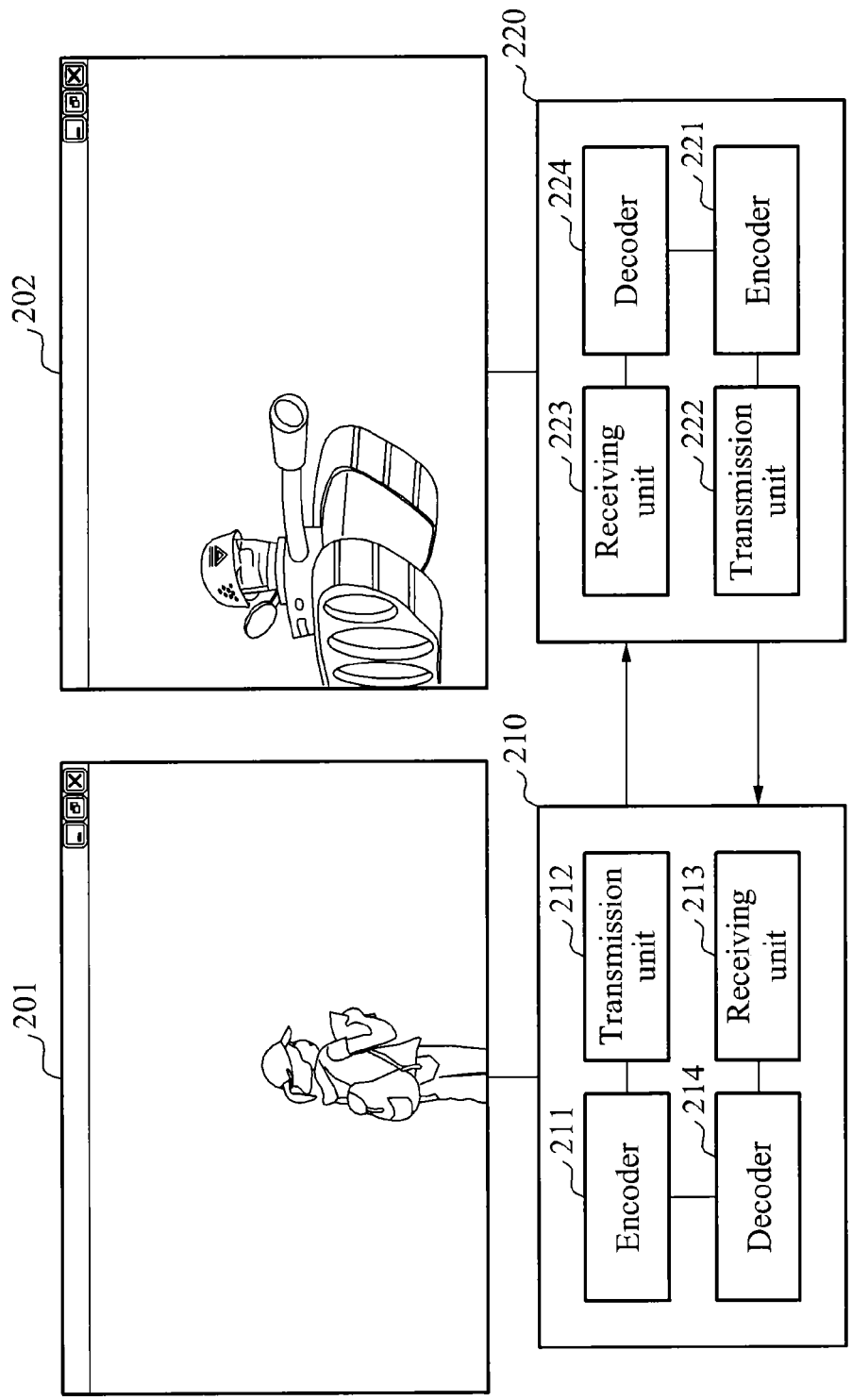
FIG. 2 illustrates configuration of data transmission apparatuses, according to example embodiments.

FIG. 2 illustrates configuration of data transmission apparatuses 210 and 220, according to example embodiments.

Referring to FIG. 2, the data transmission apparatuses 210 and 220 may include encoders 211 and 221, respectively, and transmission units 212 and 222, respectively.

The data transmission apparatus 210 may transmit data from a first virtual world 201 to a second virtual world 202. The data transmission apparatus 220 may transmit data from the second virtual world 202 to the first virtual world 201.

The encoder 211 may encode information on the first virtual world 201 into first metadata.

The virtual worlds 201 and 202 may be classified into a virtual environment and a virtual world object. The virtual world object may characterize various types of objects in the virtual environment. In addition, the virtual world object may provide interaction in the virtual environment.

The virtual world object may include an avatar and a virtual object. The avatar may be used as representation of a user in the virtual environment. The avatar and the virtual world object will be described in detail later.

Information on the virtual worlds 201 and 202 may include at least one of information on the avatar of the virtual worlds 201 and 202 and information on the virtual object of the virtual worlds 201 and 202.

The encoder 211 may generate the first metadata by encoding the information relating to the first virtual world 201 into a binary format, for example. In addition, the encoder 211 may generate the first metadata by encoding the information on the first virtual world 201 into the binary format and losslessly compressing the binary format information.

Depending on embodiments, the encoder 211 may generate the first metadata by encoding the information on the first virtual world 201 into an XML format and encoding the XML format information into a binary format, for example. In addition, the encoder 211 may generate the first metadata by encoding the information on the first virtual world 201 into an XML format, encoding the XML format information into a binary format, and losslessly compressing the binary format information.

The transmission unit 212 may transmit the first metadata encoded by the encoder 211 to the second virtual world 202. Depending on embodiments, the transmission unit 212 may transmit the encoded first metadata to the data transmission apparatus 220 that corresponds to the second virtual world 202.

A receiving unit 223 of the data transmission apparatus 220 may receive the first metadata from the transmission unit 212 of the first data transmission apparatus 210. A decoder 224 may recover the information on the first virtual world 201 by decoding the received first metadata.

According to an aspect, the data transmission apparatus 210 may further include a receiving unit 213 and a decoder 214.

The encoder 221 of the data transmission apparatus 220 may encode the information on the second virtual world 202 into second metadata.

According to an aspect, the encoder 221 may generate the second metadata by encoding the information relating to the second virtual world 202 into a binary format, for example. In addition, the encoder 221 may generate the second metadata by encoding the information relating to the second virtual world 202 into a binary format and losslessly compressing the binary format information.

Depending on embodiments, the encoder 221 may generate the second metadata by encoding the information on the second virtual world 202 into an XML format and encoding the XML format information into a binary format. In addition, the encoder 221 may generate the second metadata by encoding the information on the second virtual world 202 into an XML format, encoding the XML format information into a binary format, and losslessly compressing the binary format information.

The transmission unit 222 may transmit the second metadata encoded by the encoder 221 to the first virtual world 201. Depending on embodiments, the transmission unit 222 may transmit the encoded second metadata to the data transmission apparatus 210, which corresponds to the first virtual world 201.

The receiving unit 213 may receive the second metadata encoded from the information on the second virtual world 202.

The decoder 214 may decode the second metadata received by the receiving unit 213. The decoder 214 may recover the information on the second virtual world 202 by decoding the second metadata.

Hereinafter, an encoder to encode information relating to a virtual world and a decoder to decode the encoded information will be described in detail with reference to FIGS. 3 and 4.

Figure 3:
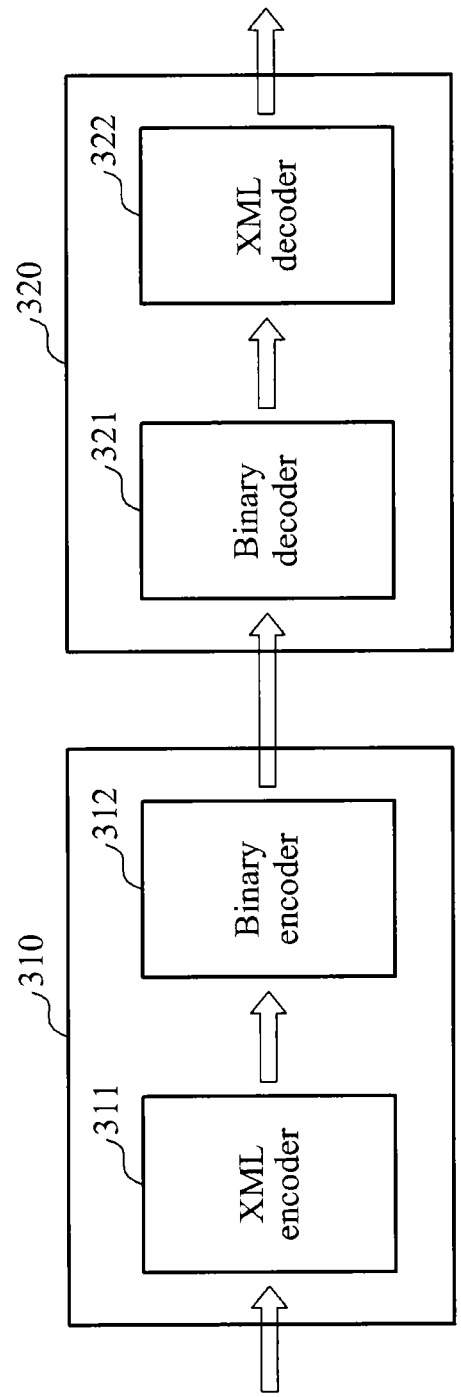
FIGS. 3 to 4 illustrate encoders and decoders of data transmission apparatuses, according to example embodiments.
Figure 4:
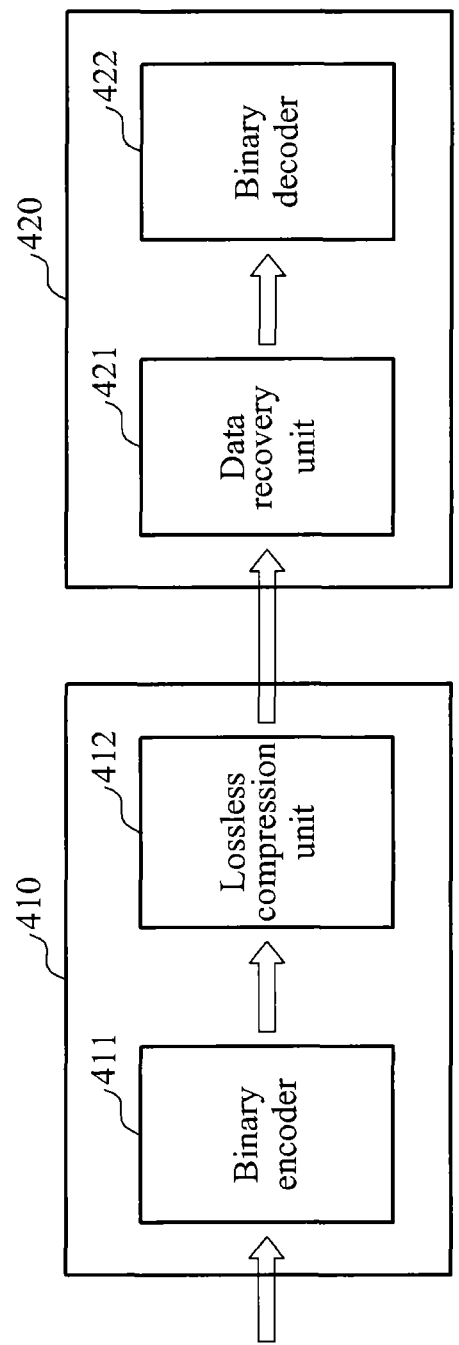

FIGS. 3 and 4 illustrate encoders and decoders of data transmission apparatuses, according to example embodiments.

Referring to FIG. 3, an encoder 310 of a first data transmission apparatus may include an XML encoder 311 and a binary encoder 312. A decoder 320 of a second data transmission apparatus may include a binary decoder 321 and an XML decoder 322.

The XML encoder 311 may encode information relating to a first virtual world into an XML format, for example. The binary encoder 312 may encode the XML format information into a binary format, for example.

When the information encoded into the binary format is transmitted to the second data transmission apparatus, the binary decoder 321 may decode the transmitted information. In addition, the XML decoder 322 may recover the information on the first virtual world, by decoding the information decoded by the binary decoder 321.

Referring to FIG. 4, an encoder 410 of a first data transmission apparatus may include a binary encoder 411 and a lossless compression unit 412. A decoder 420 of a second data transmission apparatus may include a data recovery unit 421 and a binary decoder 422.

The binary encoder 411 may encode information on a first virtual world into a binary format. The lossless compression unit 412 may losslessly compress the information encoded into the binary format.

When the compressed information is transmitted to the second data transmission apparatus, the data recovery unit 421 may recover the transmitted information. In addition, the binary decoder 422 may recover the information on the first virtual world, by decoding the information recovered by the data recovery unit 421.

The data transmission apparatus, according to the example embodiments, may control interoperability between a virtual world and a real world or between virtual worlds.

Here, the virtual world may be classified into a virtual environment and a virtual world object.

The virtual world object may characterize various types of objects in the virtual environment. In addition, the virtual world object may provide interaction in the virtual environment.

The virtual world object may include an avatar and a virtual object. The avatar may be used as representation of a user in the virtual environment. These described virtual world objects are exemplary, and thus, the present disclosure is not limited thereto.

Hereinafter, the virtual world object will be described in detail with reference to FIGS. 5 through 18.

Figure 5:
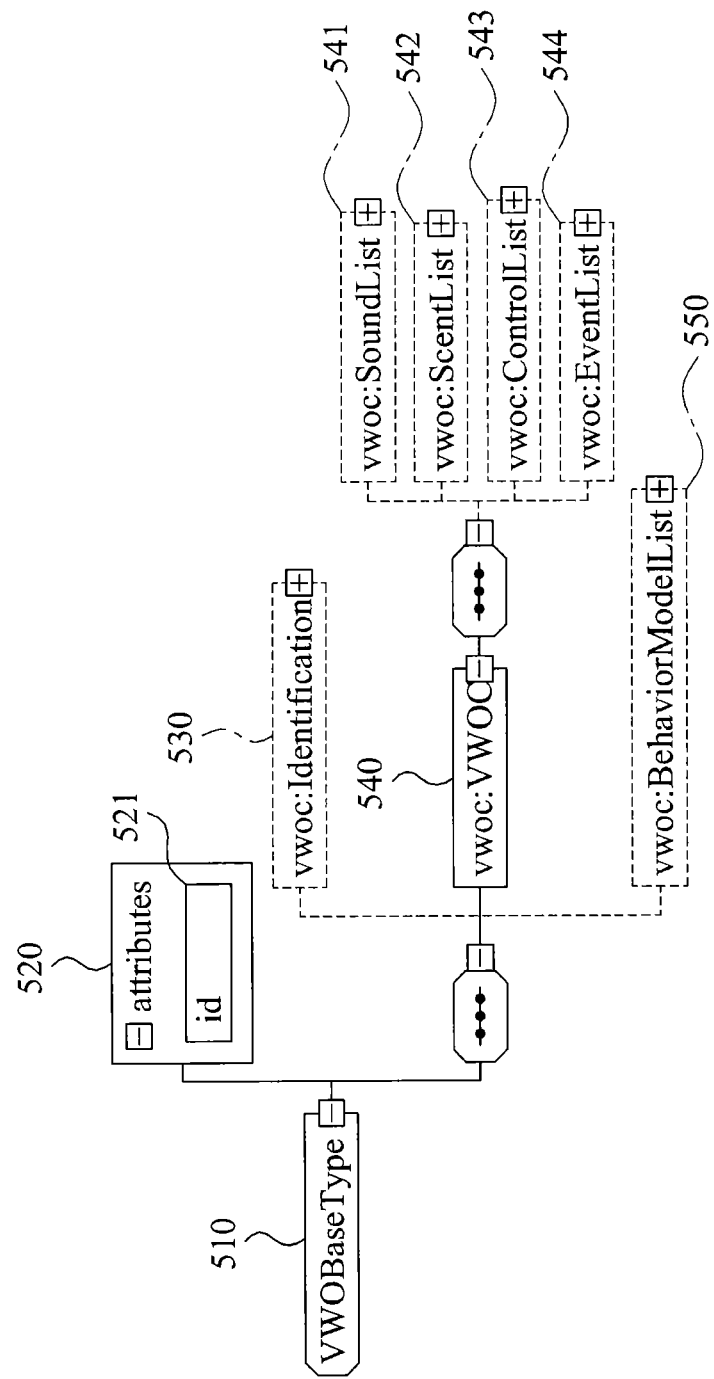
FIG. 5 illustrates a data structure of a virtual world object, according to example embodiments.

FIG. 5 illustrates a data structure of a virtual world object, according to example embodiments.

Referring to FIG. 5, a virtual world object (VWO) base type 510 representing a basic data structure of the virtual world object may include attributes 520 and a plurality of characteristics 530, 540, and 550.

The attributes 520 and the characteristics 530, 540, and 550 of the VWO base type 510 may be shared by both the avatar and the virtual object. That is, the VWO base type 510 may be inherited as avatar metadata and virtual object metadata to extend particular aspects of the respective metadata. The virtual object metadata, which is representation of the virtual object in the virtual environment, may characterize various types of objects in the virtual environment. In addition, the virtual object metadata may provide interaction between the virtual object and the avatar. Furthermore, the virtual object metadata may provide interaction with a virtual environment, however, the present disclosure is not limited thereto.

The VWO may include a root element. The root element may include an avatar list and a virtual object list.

Depending on embodiments, the root element may be expressed using an extensible markup language (XML) as shown in Source 1. However, a program source shown in Source 1 is not limiting and is only an example embodiment.

---

Source 1

```
<!-- ############################################## -->
<!-- Declaration of Root Element                    -->
<!-- ############################################## -->
<element name="VWOCInfo" type="vwoc:VWOCInfoType"/>
<complexType name="VWOCInfoType">
  <sequence>
    <element name="AvatarList" type="vwoc:AvatarListType"
      minOccurs="0"/>
    <element name="VirtualObjectList"
type="vwoc:VirtualObjectListType" minOccurs="0"/>
  </sequence>
</complexType>
<complexType name="AvatarListType">
  <sequence>
    <element name="Avatar" type="vwoc:AvatarType"
maxOccurs="unbounded"/>
  </sequence>
</complexType>
<complexType name="VirtualObjectListType">
  <sequence>
    <element name="VirtualObject" type="vwoc:VirtualObjectType"
maxOccurs="unbounded"/>
  </sequence>
</complexType>
```

---

Table 1-2 shows binary representation syntax corresponding to the root element, according to the example embodiments.

TABLE 1-2

|  | Number of bits | Mnemonic |
|---|---|---|
| VWOCInfo |  | VWOCInfoType |
| VWOCInfoType{ |  |  |
|   AvatarListFlag | 1 | bslbf |
|   VritualObjectListFlag | 1 | bslbf |
|   if(AvatarListFlag){ |  |  |
|     AvatarList |  | AvatarListType |
|   } |  |  |
|   if(VirtualObjectListFlag){ |  |  |
|     VirtualObjectList |  |  |
|   } |  |  |
| AvatarListType{ |  |  |
|   NumAvatarType |  | vluimsbf5 |
|   for(k=0;k< |  |  |
|   NumAvatarType;lk++){ |  |  |
|     Avatar |  | AvatarType |
|   } |  |  |
| } |  |  |
| VirtualObjectListType{ |  |  |

TABLE 1-2-continued

|  | Number of bits | Mnemonic |
|---|---|---|
| NumVirtualObjectType | vluimsbf5 | |
| for(k=0;k< | | |
| NumVirtualObjectType;lk++){ | | |
|    VirtualObject | | VirtualObjectType |
| } | | |
| } | | |

Table 1-3 shows descriptor components semantics of the root element, according to the example embodiments.

TABLE 1-3

| Name | Description |
|---|---|
| VWOCInfo | The root element that serves as the topmost element in the virtual world object characteristics description. |
| VWOCInfoType | The root type provides basic structure that the virtual world object characteristics information description should follow through the root element. |
| AvatarListFlag | This field, which is only present in the binary representation, signals the presence of the AvatarList element. "1" means that the element shall be used. "0" means that the element shall not be used. |
| VirtualObjectListFlag | This field, which is only present in the binary representation, signals the presence of the VirtualObjectList element. "1" means that the element shall be used. "0" means that the element shall not be used. |
| AvatarList | Optional wrapper element that serves as the placeholder for thelist of avatar characteristics information. |
| VirtualObjectList | Optional wrapper element that serves as the placeholder for the list of virtual object characteristics information. |
| AvatarListType | Wrapper element type which allows multiple occurrences of avatar characteristics information. |
| NumAvatarType | This field, which is only present in the binary representation, specifies the number of Avatar information contained in the Avatar list type. |
| Avatar | Specifies the description of avatar characteristics information. |
| AvatarType | AvatarType is a type providing a characteristic description of an individual avatar. |
| VirtualObjectListType | Wrapper element type which allows multiple occurrences of virtual object characteristics information. |
| NumVirtualObjectType | This field, which is only present in the binary representation, specifies the number of virtual object information contained in the virtual object list type. |
| VirtualObject | Specifies the description of virtual object characteristics information. |
| VirtualObjectType | VirtualObjectType is a type providing a characteristic description of an individual virtual object. |

Depending on embodiments, the VWO base type 510 may be expressed using the XML as shown in Source 1-4 below. However, a program source shown in Source 1-4 is not limiting but only an example embodiment.

Source 1-4

```
<!-- ##################################################-->
<!-- VWO Base Type                                    -->
<!-- ##################################################-->
<complexType name="VWOBaseType">
    <sequence>
        <element name="Identification" type="vwoc:IdentificationType" minOccurs="0"/>
        <element name="VWOC">
            <complexType>
                <sequence>
                    <element name="SoundList" type="vwoc:VWOSoundListType" minOccurs="0"/>
                    <element name="ScentList" type="vwoc:VWOScentListType" minOccurs="0"/>
                    <element name="ControlList" type="vwoc:VWOControlListType" minOccurs="0"/>
                    <element name="EventList" type="vwoc:VWOEventListType" minOccurs="0"/>
                </sequence>
            </complexType>
        </element>
        <element name="BehaviorModelList" type="vwoc:VWOBehaviorModelListType" minOccurs="0"/>
    </sequence>
    <attribute name="id" type="ID" use="required"/>
</complexType>
```

The attributes 520 may include id 521.

The id 521 may refer to a unique identifier for identifying an individual piece of VWO information.

The VWO base type 510 may include characteristics such as identification 530, VWO characteristics (VWOC) 540, and behavior model list 550.

The identification 530 refers to an identification of the VWO.

The VWOC 540 refers to a set of the characteristics of the VWO. According to example embodiments, the VWOC 540 may include a sound list 541, a scent list 542, a control list 543, and an event list 544, however, the present disclosure is not limited thereto. The sound list 541 may refer to a list of sound effects related to the VWO. The scent list 542 may refer to a list of scent effects related to the VWO. The control list 543 may refer to a list of control related to the VWO. The event list 544 may refer to a list of an input events related to the VWO.

The behavior model list 550 refers to a list of behavior models related to the VWO.

Example 1-5 below shows an example of the VWO base type 510. However, Example 1-5 is not limiting and is only an example embodiment.

Example 1-5

```
<vwoc:VWOCInfo>
    <vwoc:AvatarList>
        <vwoc:Avatar id="AVATARID_1" gender="male">
            <vwoc:VWOC>
                <vwoc:SoundList>
                    <vwoc:Sound loop="1" soundID="SOUNDID_10" duration="10" intensity="3" name="BurpSound">
                        <vwoc:ResourcesURL>http://www.BurpSound.info</vwoc:ResourcesURL>
                    </vwoc:Sound>
```

```
            </vwoc:SoundList>
            <vwoc:ScentList>
                <vwoc:Scent loop="2" duration="1" intensity="3"
name="BurpingScent" scentID="SCENTID_11">
<vwoc:ResourcesURL>http://www.Burp.info</vwoc:ResourcesURL>
                </vwoc:Scent>
            </vwoc:ScentList>
            <vwoc:ControlList>
                <vwoc:Control controlID="CTRLID_12">
                    <vwoc:MotionFeatureControl>
                        <vwoc:Position>
                            <mpegvct:X>1</mpegvct:X>
                            <mpegvct:Y>1</mpegvct:Y>
                            <mpegvct:Z>10</mpegvct:Z>
                        </vwoc:Position>
                        <vwoc:Orientation>
                            <mpegvct:X>0</mpegvct:X>
                            <mpegvct:Y>0</mpegvct:Y>
                            <mpegvct:Z>0</mpegvct:Z>
                        </vwoc:Orientation>
                        <vwoc:ScaleFactor>
                            <mpegvct:X>1</mpegvct:X>
                            <mpegvct:Y>1</mpegvct:Y>
                            <mpegvct:Z>3</mpegvct:Z>
                        </vwoc:ScaleFactor>
                    </vwoc:MotionFeatureControl>
                </vwoc:Control>
            </vwoc:ControlList>
            <vwoc:EventList>
                <vwoc:Event eventID="ID_13">
                    <vwoc:Mouse>Click</vwoc:Mouse>
                </vwoc:Event>
            </vwoc:EventList>
        </vwoc:VWOC>
        <vwoc:BehaviorModelList>
            <vwoc:BehaviorModel>
                <vwoc:BehaviorInput eventIDRef="ID_13"/>
                <vwoc:BehaviorOutput
controlIDRefs="CTRLID_12" scentIDRefs="SCENTID_11" soundIDRefs="SOUNDID_10"/>
            </vwoc:BehaviorModel>
        </vwoc:BehaviorModelList>
    </vwoc:Avatar>
  </vwoc:AvatarList>
</vwoc:VWOCInfo>
```

Table 1-6 shows binary representation syntax corresponding to the VWO base type 510, according to the example embodiments.

TABLE 1-6

| VWOBaseType{ | Number of bits | Mnemonic |
|---|---|---|
| IdentificationFlag | 1 | bslbf |
| SoundListFlag | 1 | bslbf |
| ScentListFlag | 1 | bslbf |
| ControlListFlag | 1 | bslbf |
| EventListFlag | 1 | bslbf |
| BehaviorModelListFlag | 1 | bslbf |
| id | See ISO 10646 | UTF-8 |
| if(IdentificationFlag) { | | |
| Identification | | IdentificationType |
| } | | |
| if(SoundListFlag) { | | |
| SoundList | | VWOSoundListType |
| } | | |
| if(ScentListFlag) { | | |
| ScentList | | VWOScentListType |
| } | | |
| if(ControlListFlag) { | | |
| ControlList | | VWOControlListType |
| } | | |
| if(EventListflag) { | | |
| EventList | | VWOEventListType |
| } | | |
| if(BehaviorModelListFlag) { | | |
| BehaviorModelList | | VWOBehaviorModelListType |

TABLE 1-6-continued

| VWOBaseType{ | Number of bits | Mnemonic |
|---|---|---|
| } | | |
| } | | |

Table 1-7 shows descriptor components semantics of a VWO base type 510, according to the example embodiments.

TABLE 1-7

| Names | Description |
|---|---|
| VWOBaseType | Provides the common characteristics which each individual virtual world object can inherit. |
| IdentificationFlag | This field, which is only present in the binary representation signals the presence of the Identification element. "1" means that the element shall be used. "0" means that the element shall not be used. |
| SoundListFlag | This field, which is only present in the binary representation, signals the presence of the Sound element list. "1" means that the element shall be used. "0" means that the element shall not be used. |
| ScentListFlag | This field, which is only present in the binary representation, signals the presence of the Scent element list. "1" means that the element shall be used. "0" means that the element shall not be used. |
| ControlListFlag | This field, which is only present in the binary representation, signals the presence of the Control element list. "1" means that the element shall be used. "0" means that the element shall not be used. |
| EventListFlag | This field, which is only present in the binary representation, signals the presence of the Event element list. "1" means that the element shall be used. "0" means that the element shall not be used. |
| BehaviorModelListFlag | This field, which is only present in the binary representation, signals the presence of the BehaviorModel element list. "1" means that the element shall be used. "0" means that the element shall not be used. |
| id | Unique identifier for identifying individual virtual world object information. The ID is encoded by UTF-8. |
| Identification | Describes the identification of the virtual world object. |
| SoundList | Describes the sound effect associated to the virtual world object. |
| ScentList | Describes the scent effect associated to the virtual world object. |
| ControlList | Describes the control such as scaling, translation, and rotation associated to the virtual world object. |
| EventList | Describes the input event associated to the virtual world object. |
| BehaviorModelList | Describes the behaviour model associated to the virtual world object. |

Referring to Table 1-7, flags may express whether the characteristics with respect to the respective VWOs of the virtual world are used, the characteristics including the identification 530, the VWOC 540 including the sound list 541, the scent list 542, the control list 543, and the event list 544, and the behavior model list 550.

For example, when the sound list 541 with respect to a random VWO of the virtual world is being used, a sound list flag may have a value of "1." When the sound list 541 is not used, the sound list flag may have a value of "0."

Figure 6:
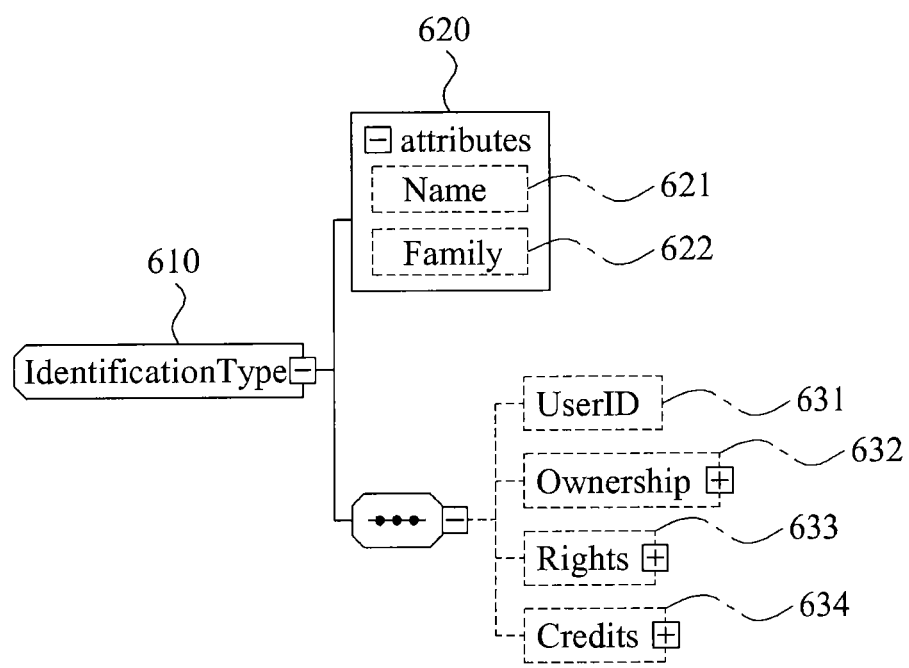
FIG. 6 illustrates a data structure of identification, according to example embodiments.

FIG. 6 illustrates a data structure of identification, according to example embodiments.

Referring to FIG. 6, an identification type 610 representing a data structure of the identification may include attributes 620 and a plurality of elements 631, 632, 633, and 634.

The identification type 610 may refer to identification of the VWO.

The attributes 620 may include at least a name 621 and family 622, however, the present disclosure is not limited thereto.

The name 621 may refer to a name of the VWO.

The family 622 may refer to a relationship of the VWO with another object.

The identification type 610, according to the example embodiments, may include at least user ID 631, ownership 632, right 633, and credits 634, however, the present disclosure is not limited thereto.

The user ID 631 may contain a user identifier related to the VWO.

The ownership 632 may refer to ownership of the VWO.

The right 633 may refer to a right of the VWO.

The credit 634 may refer to a chronological contributor of the VWO.

Depending on embodiments, the identification type 610 may be expressed using the XML, for example, as shown below in Source 2. However, a program source shown in Source 2 is not limiting and is only an example embodiment.

Source 2

```
<!-- ############################################# -->
<!-- Identification Type                            -->
<!-- ############################################# -->
<complexType name="IdentificationType">
    <annotation>
        <documentation>Comment describing your root
        element</documentation>
    </annotation>
    <sequence>
        <element name="UserID" type="anyURI" minOccurs="0"/>
        <element name="Ownership" type="mpeg7:AgentType"
        minOccurs="0"/>
        <element name="Rights" type="r:License" minOccurs="0"
maxOccurs="unbounded"/>
        <element name="Credits" type="mpeg7:AgentType"
minOccurs="0" maxOccurs="unbounded"/>
    </sequence>
    <attribute name="name" type="string" use="optional"/>
    <attribute name="family" type="string" use="optional"/>
</complexType>
```

Table 2 shows binary representation syntax corresponding to the identification type 610, according to the example embodiments.

TABLE 2

| IdentificationType{ | Number of bits | Mnemonic |
|---|---|---|
| UserIDFlag | 1 | bslbf |
| OwnershipFlag | 1 | bslbf |
| NumRights | 1 | bslbf |

TABLE 2-continued

| IdentificationType{ | Number of bits | Mnemonic |
|---|---|---|
| NumCredits | 1 | bslbf |
| nameFlag | 1 | bslbf |
| familyFlag | 1 | bslbf |
| if(UserIDFlag) { | | |
|   UserID | See ISO 10646 | UTF-8 |
| } | | |
| if(OwnershipFlag) { | | |
|   Ownership | | AgentType |
| } | | |
| for(k=0; k< NumCredits; k++){ | | |
|   Rights | See ISO/IEC 21000-16:2005 | LicenseType |
| } | | |
| for(k=0; k< NumCredits; k++){ | | |
|   Credits | | AgentType |
| } | | |
| if(nameFlag) { | | |
|   name | See ISO 10646 | UTF-8 |
| } | | |
| if(familyFlag) { | | |
|   family | See ISO 10646 | UTF-8 |
| } | | |
| } | | |

Table 2-2 shows descriptor components semantics of the identification type 610, according to the example embodiments.

TABLE 2-2

| Names | Description |
|---|---|
| IdentificationType | Defines the type of identification information belonging to each individual virtial world object. |
| UserIDFlag | This field, which is only present in the binary representation, signals the presence of the UserID element. "1" means that the element shall be used. "0" means that the element shall not be used. |
| OwnershipFlag | This field, which is only present in the binary representation, signals the presence of the Ownership element. "1" means that the element shall be used. "0" means that the element shall not be used. |
| NumRights | This field, which is only present in the binary representation, specifies the number of rights information. |
| NumCredits | This field which is only present in the binary representation, specifies the number of credits information. |
| nameFlag | This field, which is only present in the binary representation, signals the presence of the name attribute. "1" means that the element shall be used. "0" means that the element shall not be used. |
| familyFlag | This field, which is only present in the binary representation, signals the presence of the family attribute. "1" means that the attribute shall be used. "0" means that the attribute shall not be used. |
| NumVWOHapticPropertyType | This field, which is only present in the binary representation, specifies the number of haptic property information contained in the haptic property list type. |
| UserID | Contains the user identification associated to the virtual world object. |
| Ownership | Describes the ownership of the virtual world object. |

TABLE 2-2-continued

| Names | Description |
|---|---|
| Rights | Describes the rights of the virtual world object. |
| Credits | Describes the contributors of the virtual object in chronological order. Note: The 1st listed credit describes an original author of a virtual world object. The subsequent credits represent the list of the contibutors of the virtual world object chronologically. |
| Name | Describes the name of the virtual world object. |
| Family | Describes the relationship with other virtual world objects. |

According to an aspect of the present disclosure, descriptor components starting with "Num" among the descriptor components related to the VWO may represent a number of pieces of information included in components following "Num." For example, NumVWOHapticPropertyType may be a field representing a number of haptic property types included in VWOHapticPropertyType.

Figure 7:
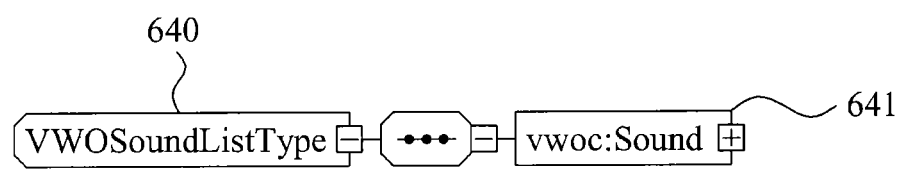
FIG. 7 illustrates a data structure of a virtual world object (VWO) sound list type, according to example embodiments.

FIG. 7 illustrates a data structure of a VWO sound list type 640, according to example embodiments.

Referring to FIG. 7, the VWO sound list type 640 may include an element including at least sound 641, however, the present disclosure is not limited thereto.

The VWO sound list type 640 may refer to a data format of the sound list 541 of FIG. 5.

The VWO sound list type 640 may refer to a wrapper element type that allows multiple occurrences of sound effects related to the VWO.

The sound 641 may refer to a sound effect related to the VWO.

Depending on embodiments, the VWO sound list type 640 may be expressed using the XML, for example, as shown below in Source 3. However, a program source shown in Source 3 is not limiting and is only an example embodiment.

Source 3

```
<!-- ################################################## -->
<!-- VWO Sound List Type                                 -->
<!-- ################################################## -->
<complexType name="VWOSoundListType">
    <sequence>
        <element name="Sound" type="vwoc:VWOSoundType" maxOccurs="unbounded"/>
    </sequence>
</complexType>
</xsd:complexType>
```

Table 3 shows binary representation syntax corresponding to the VWO sound list type 640, according to the example embodiments.

TABLE 3

| VWOSoundListType { | Number of bits | Mnemonic |
|---|---|---|
| NumVWOSoundType | | vluimsbf5 |
| for(k=0; k<NumVWOSoundType; | | |

TABLE 3-continued

| VWOSoundListType { | Number of bits | Mnemonic |
|---|---|---|
| k++){ | | |
| Sound | | VWOSoundType |
| } | | |
| } | | |

Table 3-2 shows descriptor components semantics of the VWO sound list type 640, according to the example embodiments.

TABLE 3-2

| Names | Description |
|---|---|
| VWOSoundListType | Defines the list type of sound information belonging to each individual virtual world object. |
| NumVWOSoundType | This field, which is only present in the binary representation, specifies the number of sound information contained in the sound list type. |

Figure 8:
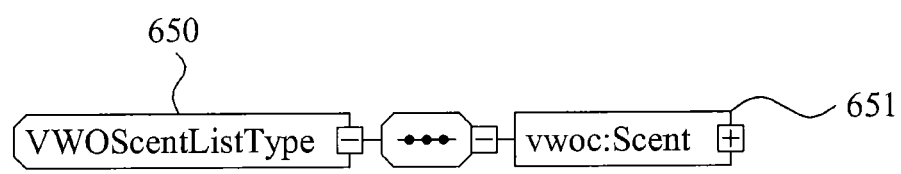
FIG. 8 illustrates a data structure of a VWO scent list type, according to example embodiments.

FIG. 8 illustrates a data structure of a VWO scent list type 650, according to example embodiments Referring to FIG. 8, the VWO scent list type 650 may include an element including a scent 641.

The VWO scent list type 650 may refer to a data format of the scent list 542 of FIG. 5.

The VWO scent list type 650 may refer to a wrapper element type that allows multiple occurrences of scent effects related to the VWO, however, the present disclosure is not limited thereto.

The scent 651 may refer to a scent effect related to the VWO.

Depending on embodiments, the VWO scent list type 650 may be expressed using the XML, for example, as shown below in Source 4. However, a program source shown in Source 4 is not limiting and is only an example embodiment.

Source 4

```
<!-- ################################################## -->
<!-- VWO Scent List Type                                 -->
<!-- ################################################## -->
<complexType name="VWOScentListType">
    <sequence>
        <element name="Scent" type="vwoc:VWOScentType" maxOccurs="unbounded"/>
    </sequence>
</complexType>
</xsd:complexType>
```

Table 4 shows binary representation syntax corresponding to the VWO scent list type 650, according to the example embodiments.

TABLE 4

| VWOScentListType { | Number of bits | Mnemonic |
|---|---|---|
| NumVWOScentType | | vluimsbf5 |
| for(k=0; k< NumVWOScentType; k++){ | | |
| Scent | | VWOScentType |
| } | | |
| } | | |

Table 4-2 shows descriptor components semantics of the VWO scent list type 650, according to the example embodiments.

TABLE 4-2

| Names | Description |
|---|---|
| VWOScentListType | Defines the list type of scent information belonging to each individual virtual world object. |
| NumVWOScentType | This field, which is only present in the binary representation, specifies the number of sound information contained in the scent list type. |

Figure 9:
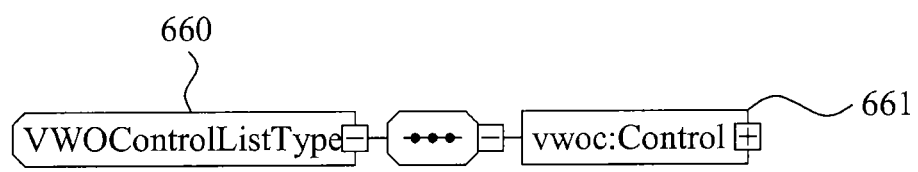
FIG. 9 illustrates a data structure of a VWO control list type, according to example embodiments.

FIG. 9 illustrates a data structure of a VWO control list type 660, according to example embodiments.

Referring to FIG. 9, the VWO control list type 660 may include an element including a control 661, however, the present disclosure is not limited thereto.

The VWO control list type 660 may refer to a data format of the control list 543 of FIG. 5.

The VWO control list type 660 may refer to a wrapper element type that allows multiple occurrences of control related to the VWO.

The control 661 may refer to the control related to the VWO.

Depending on embodiments, the VWO control list type 660 may be expressed using the XML, for example, as shown below in Source 5. However, a program source shown in Source 5 is not limiting and is only an example embodiment.

Source 5

```
<!-- ################################################## -->
<!-- VWO Control List Type                               -->
<!-- ################################################## -->
<complexType name="VWOControlListType">
    <sequence>
        <element name="Control" type="vwoc:VWOControlType" maxOccurs="unbounded"/>
    </sequence>
</complexType>
</xsd:complexType>
```

Table 5 shows binary representation syntax corresponding to the VWO control list type 660, according to the example embodiments.

TABLE 5

| VWOControlListType { | Number of bits | Mnemonic |
|---|---|---|
| NumVWOControlType | | vluimsbf5 |
| for(k=0; k< NumVWOControlType; k++){ | | |
| Control | | VWOControlType |
| } | | |
| } | | |

Table 5-2 shows descriptor components semantics of the VWO control list type 660, according to the example embodiments.

TABLE 5-2

| Names | Description |
|---|---|
| VWOControlListType | Defines the list type of Control information belonging to each individual viral world object. |

TABLE 5-2-continued

| Names | Description |
| --- | --- |
| NumVWOControlType | This field, which is only present in the binary representinon, specifies the number of control information contained in the Control list type. |

Figure 10:
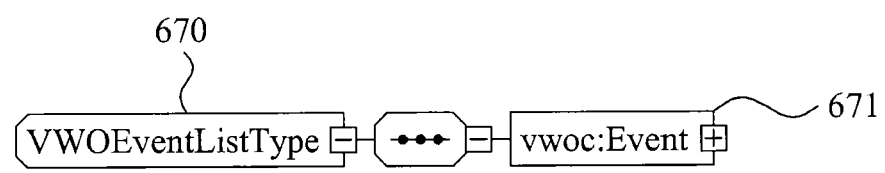
FIG. 10 illustrates a data structure of a VWO event list type, according to example embodiments.

FIG. 10 illustrates a data structure of a VWO event list type 670, according to example embodiments.

Referring to FIG. 10, the VWO event list type 670 may include an element including an event 671, however, the present disclosure is not limited thereto.

The VWO event list type 670 may refer to a data format of the event list 544 of FIG. 5.

The VWO event list type 670 may refer to a wrapper element type that allows multiple occurrences of input events related to the VWO.

The event 671 may refer to the input events related to the VWO.

Depending on embodiments, the VWO event list type 670 may be expressed using the XML, for example, as shown below in Source 6. However, a program source shown in Source 6 is not limiting and is only an example embodiment.

Source 6

```
<!-- ################################################## -->
<!-- VWO Event List Type                              -->
<!-- ################################################## -->
<complexType name="VWOEventListType">
    <sequence>
        <element name="Event" type="vwoc:VWOEventType" maxOccurs="unbounded"/>
    </sequence>
</complexType>
</xsd:complexType>
```

Table 6 shows binary representation syntax corresponding to the VWO event list type 670, according to the example embodiments.

TABLE 6

| VWOEventListType { | Number of bits | Mnemonic |
| --- | --- | --- |
| NumVWOEventType | | vluimsbf5 |
| for(k=0; k< NumVWOEventType; k++){ | | |
| Event | | VWOEventType |
| } | | |
| } | | |

Table 6-2 shows descriptor components semantics of the VWO event list type 670, according to the example embodiments.

TABLE 6-2

| Names | Description |
| --- | --- |
| VWOEventListType | Defines the list type of Event information belonging to each individual virtual world object. |
| NumVWOEventType | This field, which is only present in the binary representation, specifies the number of Event information contained in the Event list type. |

Figure 11:
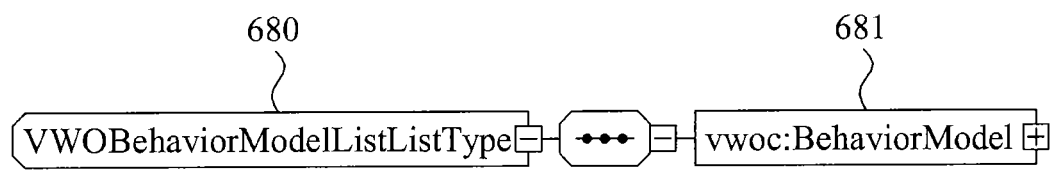
FIG. 11 illustrates a data structure of a VWO behavior model list type, according to example embodiments.

FIG. 11 illustrates a data structure of a VWO behavior model list type 680, according to example embodiments.

Referring to FIG. 11, the VWO behavior model list type 680 may include an element including a behavior model 681.

The VWO behavior model list type 680 may refer to a data format of the behavior model list 550 of FIG. 5.

The VWO behavior model list type 680 may refer to a wrapper element type that allows multiple occurrences of input behavior models related to the VWO.

The behavior model 671 may refer to the input behavior models related to the VWO.

Depending on embodiments, the VWO behavior model list type 680 may be expressed using the XML, for example, as shown below in Source 7. However, a program source shown in Source 7 is not limiting and is only an example embodiment.

Source 7

```
<!-- ################################################## -->
<!-- VWO Behavior Model List Type                     -->
<!-- ################################################## -->
<complexType name="VWOBehaviorModelListType">
    <sequence>
        <element name="BehaviorModel" type="vwoc:VWOBehaviorModelType" maxOccurs="unbounded"/>
    </sequence>
</complexType>
</xsd:complexType>
```

Table 7 shows binary representation syntax corresponding to the VWO behavior model list type 680, according to the example embodiments.

TABLE 7

| VWOBehaviorModelListType { | Number of bits | Mnemonic |
| --- | --- | --- |
| NumVWOBehaviorModelType | | vluimsbf5 |
| for(k=0; k< NumVWOBehaviorModelType; k++){ | | |
| BehaviorModel | | VWOBehaviorModelType |
| } | | |
| } | | |

Table 7-2 shows descriptor components semantics of the VWO behavior model list type 680, according to the example embodiments.

TABLE 7-2

| Names | Description |
|---|---|
| VWOBehaviorModelListType | Defines the list type of behavior model information belonging to each individual virtual world object. |
| NumVWOBehaviorModelType | This field, which is only present in the binary representation, specifies the number of behavior model information contained in the behavior model list type. |

According to an aspect of the present disclosure, the VWO base type 510 may further include characteristics of a haptic property list.

The haptic property list type may refer to a data structure of the haptic property list.

Depending on embodiments, the VWO sound list type 640 may be expressed using the XML, for example, as shown below in Source 7-3. However, a program source shown in Source 7-3 is not limiting and is only an example embodiment.

Source 7-3

```
<!-- ################################################## -->
<!-- VWO HapticProperty List Type                  -->
<!-- ################################################## -->
    <complexType name="VWOHapticPropertyListType">
        <sequence>
            <element name="HapticProperty"
type="vwoc:VWOHapticPropertyType" maxOccurs="unbounded"/>
        </sequence>
    </complexType>
</xsd:complexType>
```

Table 7-4 shows binary representation syntax corresponding to the haptic property list type, according to the example embodiments.

TABLE 7-4

| VWOHapticPropertyListType { | Number of bits | Mnemonic |
|---|---|---|
| NumVWOHapticPropertyType | | vluimsbf5 |
| for(k=0; k< NumVWOHapticPropertyType; k++){ | | |
| HapticProperty | | VWOHapticPropertyType |
| } | | |
| } | | |

Table 7-5 shows descriptor components semantics of the haptic property list type, according to the example embodiments, however, the present disclosure is not limited thereto.

TABLE 7-5

| Names | Description |
|---|---|
| VWOHapticProprtyListType | Defines the list type of haptic property information belonging to each individual virtual world oblect. |
| NumVWOHapticPropertyType | This field, which is only present in the binary representation, specifies |

TABLE 7-5-continued

| Names | Description |
|---|---|
| | the number of haptic property informafion contained in the haptic property list type. |

Figure 12:
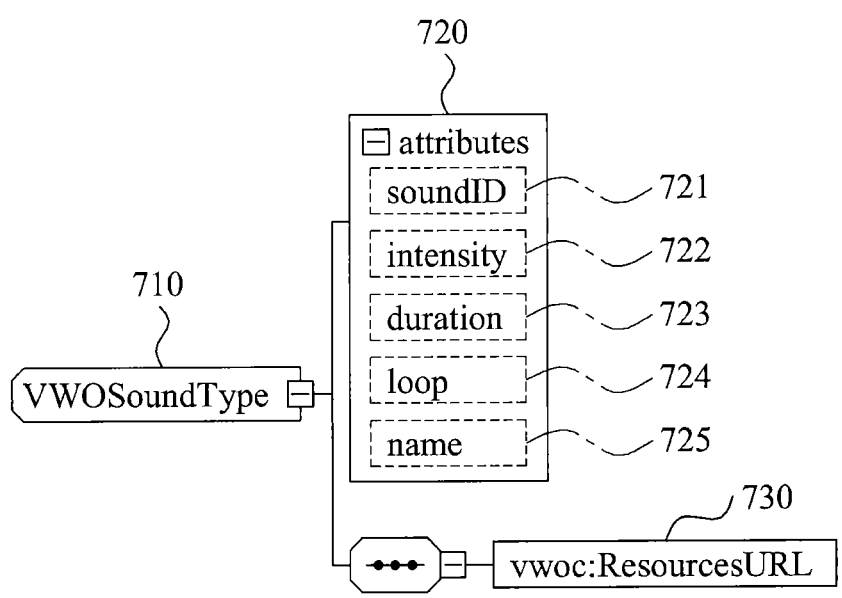
FIG. 12 illustrates a data structure of a VWO sound type, according to example embodiments.

FIG. 12 illustrates a data structure of a VWO sound type 710, according to example embodiments.

Referring to FIG. 12, the VWO sound type 710 may include elements including attributes 720 and resources URL 730, however, the present disclosure is not limited thereto.

The VWO sound type 710 may refer to type information of sound effects related to the VWO.

Depending on embodiments, the VWO sound type 710 may be expressed using the XML, for example, as shown below in Source 8. However, a program source shown in Source 8 is not limiting and is only an example embodiment.

Source 8

```
<complexType name="VWOSoundType">
    <sequence>
        <element name="ResourcesURL" type="anyURI"/>
    </sequence>
    <attribute name="soundID" type="ID" use="optional"/>
    <attribute name="intensity" type="float" use="optional"/>
    <attribute name="duration" type="unsignedInt" use="optional"/>
    <attribute name="loop" type="unsignedInt" use="optional"/>
    <attribute name="name" type="string" use="optional"/>
</complexType>
```

The attributes 720 may include sound ID 721, intensity 722, duration 723, loop 724, and name 725, however, the present disclosure is not limited thereto.

The sound ID 721 may refer to a unique identifier of an object sound.

The intensity 722 may refer to an intensity of the sound.

The duration 723 may refer to a length of duration of the sound.

The loop 724 may refer to a number of repetitions of the sound.

The name 725 may refer to a name of the sound.

The resources URL 730 includes a link related to a sound file. The sound file may be in the form of a MP4 file, for example, however, the present disclosure is not limited thereto, and thus, the sound file may be in other forms or formats.

Example 2 shows an example of the VWO sound type 710. However, Example 2 is not limiting and is only an example embodiment.

Example 2

```
<vwoc:Sound loop="0" soundID="soundID3" duration="30" intensity="0.5" name="BigAlarm">
    <vwoc:ResourcesURL>http://sounddb.com/alarmsound_0001.wav</vwoc:ResourcesURL>
</vwoc:Sound>
```

Referring to Example 2, a sound resource having "BigAlarm" as the name 725 is stored in "http://sounddb.com/alarmsound_0001.wav" and the sound ID 721 is "SoundID3." The duration of the sound of Example 2 may be 30 seconds and the intensity 722 of the sound may be 50%.

Table 8 shows binary representation syntax corresponding to the VWO sound type 710, according to the example embodiments.

TABLE 8

| VWOSoundType{ | Number of bits | Mnemonic |
|---|---|---|
| SoundIDFlag | 1 | bslbf |
| IntensityFlag | 1 | bslbf |
| DurationFlag | 1 | bslbf |
| LoopFlag | 1 | bslbf |
| NameFlag | 1 | bslbf |
| ResourcesURL | See ISO 10646 | UTF-8 |
| if(SoundIDFlag) { | | |
|     SoundID | See ISO 10646 | UTF-8 |
| } | | |
| if (IntensityFlag) { | | |
|     Intensity | 32 | fsbf |
| } | | |
| if(DurationFlag) { | | |
|     Duration | 8 | uimsbf |
| } | | |
| if (LoopFlag) { | | |
|     Loop | 8 | uimsbf |
| } | | |
| if (NameFlag){ | | |
|     Name | See ISO 10646 | UTF-8 |
| } | | |
| } | | |

Table 8-2 shows descriptor components semantics of the VWO sound type 710, according to the example embodiments.

TABLE 8-2

| Names | Description |
|---|---|
| VWOSoundType | Defines the sound information which each individual virtual world object can include as one of the characteristics. |
| SoundFlag | This field, which is only present in the binary representation, signals the presence of the ID attribute of the sound. "1" means the attribute shall be used and "0" means the attribute shall not be used. |
| IntesityFlag | This field, which is only present in the binary representation, signals the presence of the intensity attribute. "1" means the attribute shall be used and "0" means the attribute shall not be used. |
| DurationFlag | This field, which is only present in the binary representation, signals the presence of the duration attribute. "1" means the attribute shall be used and "0" means the attribute shall not be used. |
| LoopFlag | This field, which is only present in the binary representation, signals the presence of the loop attribute. "1" means the attribute shall be used and "0" means the attribute shall not be used. |

TABLE 8-2-continued

| Names | Description |
|---|---|
| NameFlag | This field, which is only present in the binary representation, signals the presence of the name attribute. "1" means the attribute shall be used and "0" means the attribute shall not be used. |
| ResourcesURL | Contains a link to sound resource file. |
| SoundID | Unique ID of the object sound resource. |
| Intensity | The intensity (volume) of the sound with respect to percent. |
| Duration | The length of time that the sound lasts. |
| Loop | This is a playing option. (default value: 1, 0: repeated, 1: once, 2: twice, . . . , n: n times) |
| Name | The name of the sound. |

Figure 13:
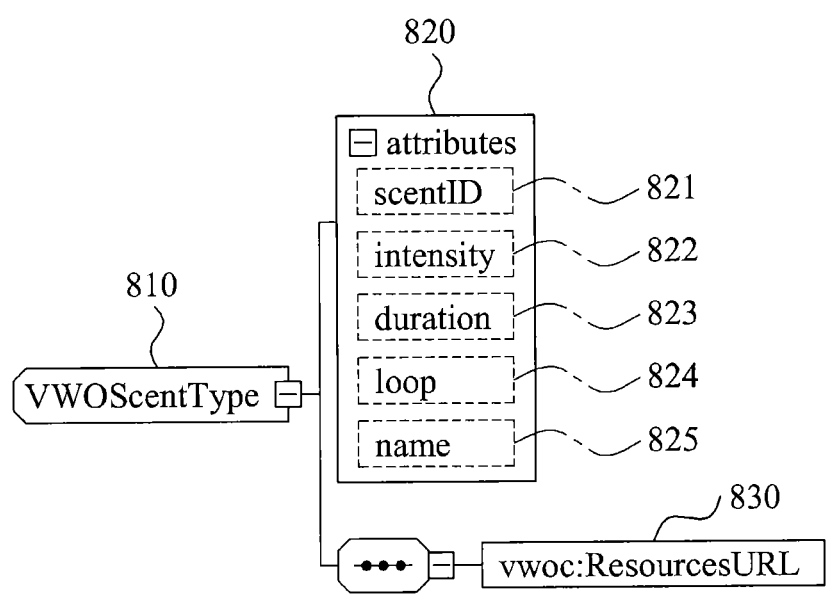
FIG. 13 illustrates a data structure of a VWO scent type, according to example embodiments.

FIG. 13 illustrates a data structure of a VWO scent type 810, according to example embodiments.

Referring to FIG. 13, the VWO scent type 810 may include elements including attributes 820 and resources URL 830.

The VWO scent type 810 may refer to type information of scent effects related to the VWO.

Depending on embodiments, the VWO scent type 810 may be expressed using the XML, for example, as shown below in Source 9. However, a program source shown in Source 9 is not limiting and is only an example embodiment.

Source 9

```
<complexType name="VWOScentType">
    <sequence>
        <element name="ResourcesURL" type="anyURI"/>
    </sequence>
    <attribute name="ScentID" type="ID" use="optional"/>
    <attribute name="intensity" type="float" use="optional"/>
    <attribute name="duration" type="unsignedInt" use="optional"/>
    <attribute name="loop" type="unsignedInt" use="optional"/>
    <attribute name="name" type="string" use="optional"/>
</complexType>
```

The attributes 820 may include scent ID 821, intensity 822, duration 823, loop 824, and name 825.

The scent ID 821 may refer to a unique identifier of an object scent.

The intensity 822 may refer to an intensity of the scent.

The duration 823 may refer to a length of duration of the scent.

The loop 824 may refer to a number of repetitions of the scent.

The name 825 may refer to a name of the scent.

The resources URL 830 may include a link related to a scent file.

Example 3 shows an example of the VWO scent type 810. However, Example 3 is not limiting and is only an example embodiment of the VWO scent type 810.

Example 3

```
<vwoc:Scent duration="20" intensity="0.2" name="rose" scentID="ScentID5">
    <vwoc:ResourcesURL>http://scentdb.com/flower_0001.sct</vwoc:ResourcesURL>
</vwoc:Scent>
```

Table 9 shows example binary representation syntax corresponding to the VWO scent type 810, according to the example embodiments.

TABLE 9

| VWOScentType{ | Number of bits | Mnemonic |
|---|---|---|
| ScentIDFlag | 1 | bslbf |
| IntensityFlag | 1 | bslbf |
| DurationFlag | 1 | bslbf |
| LoopFlag | 1 | bslbf |
| NameFlag | 1 | bslbf |
| ResourcesURL | See ISO 10646 | UTF-8 |
| if(ScentIDFlag) { | | |
| ScentID | See ISO 10646 | UTF-8 |
| } | | |
| if(IntensityFlag) { | | |
| Intensity | 32 | fsbf |
| } | | |
| if(DurationFlag) { | | |
| Duration | 8 | uimsbf |
| } | | |
| if(LoopFlag) { | | |
| Loop | 8 | uimsbf |
| } | | |
| if(NameFlag) { | | |
| Name | See ISO 10646 | UTF-8 |
| } | | |
| } | | |

Table 9-2 shows example descriptor components semantics of the VWO scent type 810, according to the example embodiments.

TABLE 9-2

| Names | Description |
|---|---|
| VWOScentType | Defines the scent information which each individual virtual world object can include as one of the charactaistics. |
| ScentIDFlag | This field, which is only present in the binary representation, signals the presence of the ID attribute of the scent. "1" means the attribute shall be used and "0" means the attribute shall not be used. |
| IntensityFlag | This field, which is only present in the binary representation, signals the presence of the intensity attribute. "1" means the attribute shall be used and "0" means the attribute shall not be used. |
| DurationFlag | This field, which is only present in the binary representation, signals the presence of the duration attribute. "1" means the attribute shall be used and "0" means the attribute shall not be used. |
| LoopFlag | This field, which is only present in the binary representation, signals the presence of the loop attribute. "1" means the attribute shall be used and "0" means the attribute shall not be used. |
| NameFlag | This field, which is only present in the binary representation, signals the presence of the name attribute. "1" means the attribute shall be used and "0" means the attribute shall not be used. |
| ResourcesURL | Contains a link to scent resource file. |
| ScentID | Unique ID of the object scent resource. |
| Intensity | The intensity (volume) of the scent with respect to percent. |

TABLE 9-2-continued

| Names | Description |
|---|---|
| Duration | The length of time that the scent lasts. |
| Loop | This is a playing option. (default value: 1, 0: repeated, 1: once, 2: twice, . . . , n: n times) |
| Name | The name of the scent. |

Figure 14:
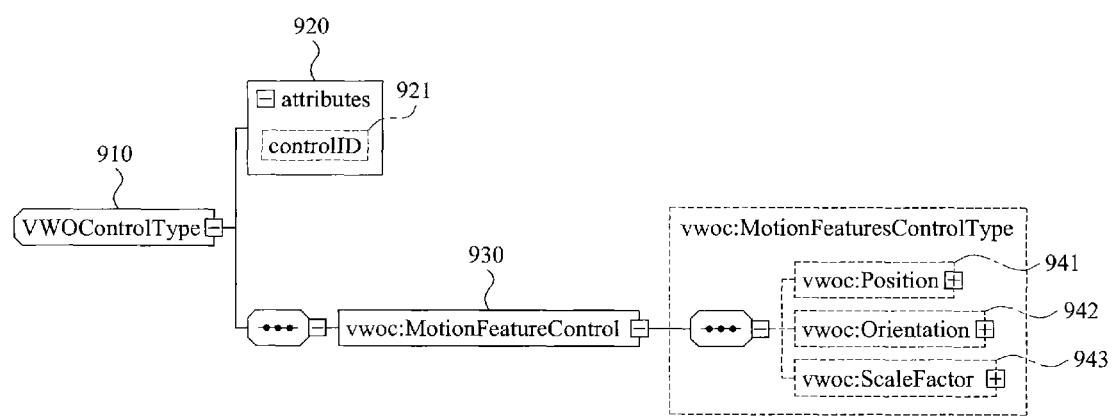
FIG. 14 illustrates a data structure of a VWO control type, according to example embodiments.

FIG. 14 illustrates a data structure of a VWO control type 910, according to example embodiments.

Referring to FIG. 14, the VWO control type 910 may include attributes 920 and motion feature control 930.

The VWO control type 910 may refer to type information of control related to the VWO.

Depending on embodiments, the VWO control type 910 may be expressed using the XML, for example, as shown below in Source 10. However, a program source shown in Source 10 is not limiting and is only an example embodiment.

Source 10

```
<!-- ################################################## -->
<!-- VWO Control Type                                  -->
<!-- ################################################## -->
<complexType name="VWOControlType">
    <sequence>
        <element name="MotionFeatureControl"
type="vwoc:MotionFeaturesControlType"/>
    </sequence>
    <attribute name="controlID" type="ID" use="optional"/>
</complexType>
<!-- ################################################## -->
<!-- Motion Features Control Type                      -->
<!-- ################################################## -->
<complexType name="MotionFeaturesControlType">
    <sequence>
        <element name="Position" type="mpegvct:Float3DVectorType"
           minOccurs="0"/>
        <element name="Orientation"
type="mpegvct:Float3DVectorType" minOccurs="0"/>
        <element name="ScaleFactor"
type="mpegvct:Float3DVectorType" minOccurs="0"/>
    </sequence>
</complexType>
```

The attributes 920 may include control ID 921.

The control ID 921 may refer to a unique identifier of the control.

The motion feature control 930 may refer to a set of elements controlling a position, an orientation, and a scale of the virtual object. According to example embodiments, the motion feature control 930 may include elements including a position 941, an orientation 942, and a scale factor 943.

The position 941 may refer to a position of the object in a scene. As a non-limiting example, the position 941 may be expressed by a 3-dimensional (3D) floating point vector method (x, y, and z).

The orientation 942 may refer to an orientation of the object in the scene. Depending on embodiments, the orientation 942 may be expressed by the 3D floating point vector method (yaw, pitch, and roll) using an Euler angle.

The scale factor 943 may refer to a scale of the object in the scene. Depending on embodiments, the scale factor 943 may be expressed by the 3D floating point vector method (Sx, Sy, and Sz).

Table 10 shows example binary representation syntax corresponding to the VWO control type 910, according to the example embodiments.

Figure 15:
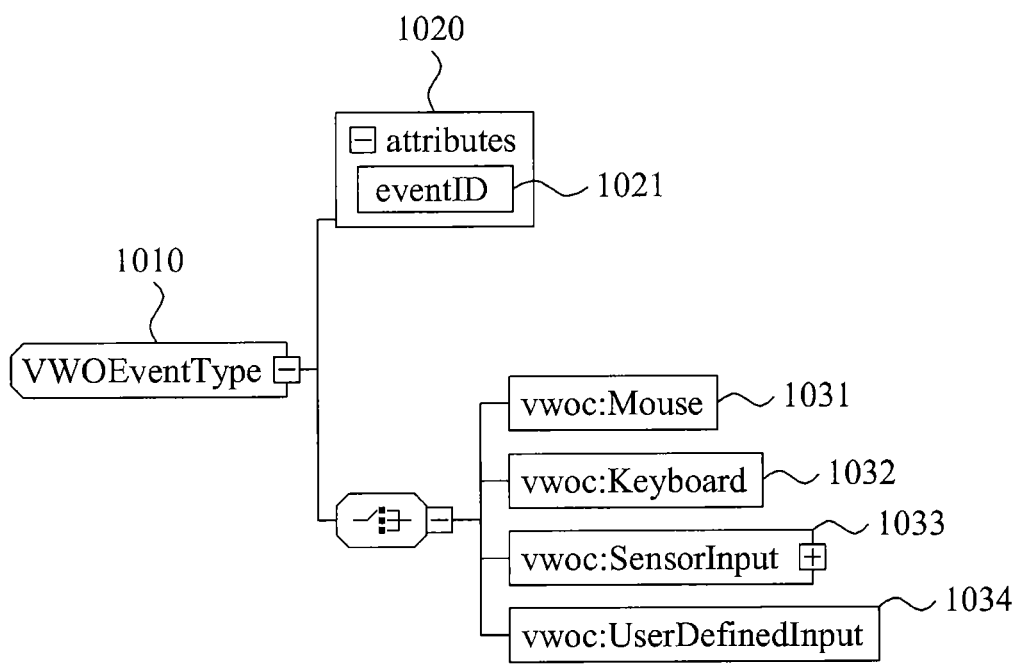
FIG. 15 illustrates a data structure of a VWO event type 1010, according to example embodiments.

FIG. 15 illustrates a data structure of a VWO event type 1010, according to example embodiments.

Referring to FIG. 15, the VWO event type 1010 may include attributes 1020 and a plurality of elements 1031, 1032, 1033, and 1034, however, the present disclosure is not limited thereto.

TABLE 10

| VWOControlType { | Number of bits | Mnemonic |
|---|---|---|
| ControlIDFlag | 1 | bslbf |
| MotionFeatureControl |  | MotionFeatureControlType |
| If(ControlIDFlag) { |  |  |
|   ControlID | See ISO 10646 | UTF-8 |
| } |  |  |
| } |  |  |
| MotionFeaturesControlType{ |  |  |
|   PositionFlag | 1 | bslbf |
|   OrientationFlag | 1 | bslbf |
|   ScaleFactorFlag | 1 | bslbf |
|   if(PositionFlag) { |  |  |
|     Position |  | Float3DVectorType |
|   } |  |  |
|   if(OrientatonFlag) { |  |  |
|     Orientation |  | Float3DVectorType |
|   } |  |  |
|   if(ScaleFactorFlag) { |  |  |
|     ScaleFactor |  | Float3DVectorType |
|   } |  |  |
| } |  |  |

Table 10-2 shows example descriptor components semantics of the VWO control type 910, according to the example embodiments.

TABLE 10-2

| Names | Description |
|---|---|
| VWOControlType | Defines the control infomiation which each individual virtual world object can include as one of the characteristics. |
| ControlIDFlag | This field, which is only present in the binary representation, signals the presence of the Control element, "1" means the attribute shall be used and "0" means the attribute shall not be used. |
| MotionFeatureCortrol | Set of elements that control the position, the orientation and the scale of the virtual object. |
| ControlID | Unique ID of the object scent resource. |
| MotionFeaturesControlType | Defines the rigid motion control with respect to the position, the orientation or the scale of the virtual object. |
| PositionFlag | This field, which is only present in the binary representation, signals the presence of the Position element. "1" means the attribute shall be used and "0" means the attribute shall not be used. |
| OrientationFlag | This field, which is only present in the binary representation, signals the presence of the Orientation element. "1" means the attribute shall be used and "0" means the attribute shall not be used. |
| ScaleFactorFlag | This field, which is only present in the binary representation, signals the presence of the ScaleFactor element "1" means the attribute shall be used and "0" means the attribute shall not be used. |
| Position | The position of the object in the scene with 3D floating point vector (x, y, z). |
| Orientation | The orientation of the object in the scale with 3D floating point vector as an Euler angle (yaw, pitch, roll). |
| ScaleFactor | The scale of the object in the scene expressed as 3D floating point vector (Sx, Sy, Sz). |

The VWO event type 1010 may refer to type information of an event related to the VWO.

Depending on embodiments, the VWO event type 1010 may be expressed using the XML, for example, as shown below in Source 11. However, a program source shown in Source 11 is not limiting and is only an example embodiment.

```
                              Source 11

<!-- #################################################### -->
<!-- VWO Event Type                                       -->
<!-- #################################################### -->
<complexType name="VWOEventType">
    <choice>
        <element name="Mouse" type="mpeg7:termReferenceType"/>
        <element name="Keyboard"
            type="mpeg7:termReferenceType"/>
        <element name="SensorInput"
            type="iidl:SensedInfoBaseType"/>
        <element name="UserDefinedInput" type="string"/>
    </choice>
    <attribute name="eventID" type="ID" use="required"/>
</complexType>
```

The attributes 1020 may include event ID 1021.

The event ID 1021 may refer to a unique identifier of an event.

The VWO event type 1010, according to the example embodiments, may include elements including mouse 1031, keyboard 1032, sensor input 1033, and user defined input 1034.

The mouse 1031 may refer to a mouse event. That is, the mouse 1031 may refer to an event occurring based on an input by manipulation of a mouse. For example, the mouse 1031 may include elements shown in Table 11.

TABLE 11

| Element | Information |
| --- | --- |
| Click | Event generated when a left mouse button is clicked |
| Double_Click | Event generated when a left mouse button is double clicked |
| LeftBttn_down | Event generated when pressing of a left mouse button starts |
| LeftBttn_up | Event generated upon release of a left mouse button from a pressed state |
| RightBttn_down | Event generated when pressing of a right mouse button starts |
| RightBttn_up | Event generated upon release of a right mouse button from a pressed state |
| Move | Event generated when a mouse is moved |

The keyboard 1032 refers to a keyboard event. That is, the keyboard 1032 may refer to an event generated based on an input by manipulation of a keyboard. For example, the keyboard 1032 may include elements shown in Table 11-2.

TABLE 11-2

| Element | Information |
| --- | --- |
| Key_Down | Event generated when a certain button of a keyboard is pressed |
| Key_Up | Event generated upon release of a certain button of a keyboard from a pressed state |

The sensor input 1033 may refer to a sensor input. That is, the sensor input 1033 may refer to an event occurring based on an input by manipulation of a sensor.

The user defined input 1034 may refer to an input event defined by a user.

Table 11-3 shows example binary representation syntax corresponding to the VWO event type 1010, according to the example embodiments.

TABLE 11-3

| VWOEventType { | Number of bits | Mnemonic |
| --- | --- | --- |
| VWOEventChoice | 2 | bslbf |
| if (VWOEventChoice ==000) { |  |  |
|   Mouse |  | MouseType |
| }else if(VWOEventChoice== 001) { |  |  |
|   Keyboard |  | KeyboardType |
| }else if(VWOEventChoice== 010) { |  |  |
|   SensorInput | See m17469 | IndividualSensedInfo Type + SensedInfoType specified by IndividualSensedInfo Type |
| }else if(VWOEventChoice== 011) { |  |  |
|   UserDefinedInput | See ISO 10646 | UTF-8 |
| } |  |  |
| EventID | See ISO 10646 | UTF-8 |
| } |  |  |
| KeyboardType | 7 | uimsbf |
| MouseType | 7 | uimsbf |

Table 11-4 shows example descriptor components semantics of the VWO event type 1010, according to the example embodiments.

TABLE 11-4

| Names | Description |
| --- | --- |
| VWOEventType | Defines the event information which each individual virtual world object can include as one of the characterisics. |
| VWOEventChoice | This field, which is only present in the binary representation, signals which type of events shall be chosen. (000: Mouse, 001:Keyboard, 010: SensorInput, 011: User defined Input, 011-111: Reserved) |

TABLE 11-4-continued

| Names | Description | | |
|---|---|---|---|
| Mouse | Mouse Events. | | |
| | Element | Information | |
| | 0000 | Describes the event of click the left button of a mouse (Click) | |
| | 0001 | Describes the event of double-click the left button of a mouse. (doubleclick) | |
| | 0010 | Describes the event which takes place at the moment of holding down the left button of a mouse. (LeftButtonDown) | |
| | 0011 | Describes the event which takes place at the moment of releasing the left button of a mouse. (LeftButtonUP) | |
| | 0100 | Describes the event which takes place at the moment of holding down the left button of a mouse. (RightButtonDown) | |
| | 0101 | Describes the event which takes place at the moment of releasing the left button of a mouse. ( RightButtonUP) | |
| | 0110 | Describes the event which takes place while changing the mouse position. (Move) | |
| | 0111 - 1111 | Reserved | |
| Keyboard | Keyboard Event | | |
| | Element | Information | |
| | 0000 | Describes the event which takes place at the moment of holding a keyboard button down. (KeyDown) | |
| | 0001 | Describes the event which takes place at the moment of releasing a keyboard button. (KeyUp) | |
| | 0010 - 1111 | Reserved | |
| SensorInput | sensor input events | | |
| | (IndividualSensedInfoType + SensedInfo(specified by IndividualSensedInfoType)) Refers to m17469 | | |
| UserDefinedInput | User defined input | | |
| EventID | A unique identifier of the event | | |

Figure 16:
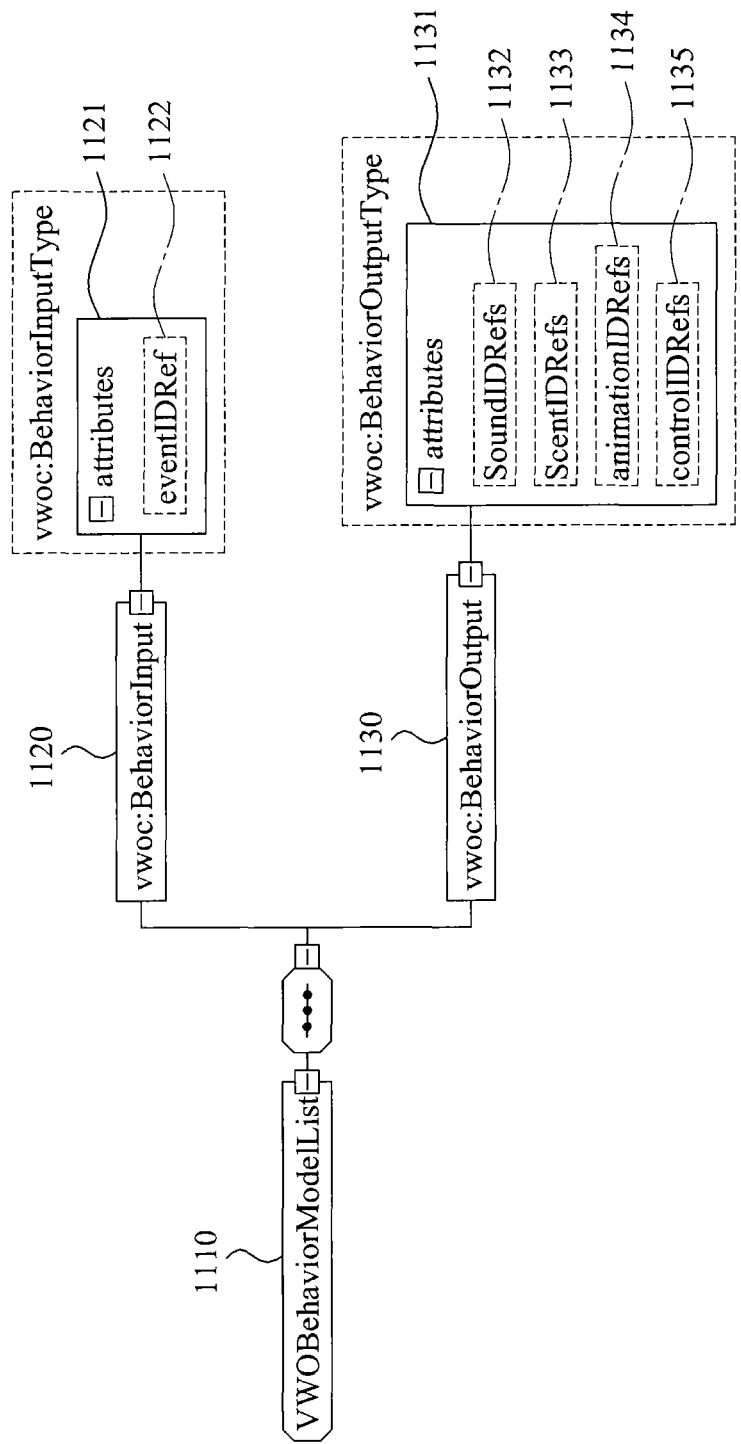
FIG. 16 illustrates a data structure of a VWO behavior model type, according to example embodiments.

FIG. 16 illustrates a data structure of a VWO behavior model type 1110, according to example embodiments.

Referring to FIG. 16, the VWO behavior model type 1110 may include behavior input 1120 and behavior output 1130.

The VWO behavior model type 1110 may refer to type information of a behavior model related to the VWO.

Depending on embodiments, the VWO behavior model type 1110 may be expressed using the XML, for example, as shown below in Source 12. However, a program source shown in Source 12 is not limiting and is only an example embodiment.

Source 12

```
<!-- ############################################ -->
<!-- VWO Behavior Model Type                      -->
<!-- ############################################ -->
<complexType name="VWOBehaviorModelType">
    <sequence>
        <element name="BehaviorInput"
        type="vwoc:BehaviorInputType"/>
        <element name="BehaviorOutput"
        type="vwoc:BehaviorOutputType"/>
    </sequence>
</complexType>
<!-- ############################################ -->
<!-- Behavior Input Type                          -->
<!-- ############################################ -->
<complexType name="BehaviorInputType">
    <attribute name="eventIDRef" type="IDREF"/>
</complexType>
```

-continued

Source 12

```
<!-- ############################################ -->
<!-- Behavior Output Type                         -->
<!-- ############################################ -->
<complexType name="BehaviorOutputType">
    <attribute name="soundIDRefs" type="IDREFS" use="optional"/>
    <attribute name="scentIDRefs" type="IDREFS" use="optional"/>
    <attribute name="animationIDRefs" type="IDREFS"
    use="optional"/>
    <attribute name="controlIDRefs" type="IDREFS" use="optional/>
</complexType>
```

The behavior input 1120 may refer to an input event for making an object behavior. Depending on embodiments, the behavior input 1120 may include attributes 1121.

The attributes 1121 may include event ID reference 1122, however, the present disclosure is not limited thereto. The event ID reference 1122 may refer to a unique identifier of the input event.

The behavior output 1130 may refer to an output of the object behavior corresponding to the input event. For example, the behavior output 1130 may include attributes 1131.

The attributes 1131 may include sound ID reference 1132, scent ID reference 1133, animation ID reference 1134, and control ID reference 1135, however, the present disclosure is not limited thereto.

The sound ID reference 1132 may reference a sound ID to provide sound effects of the object.

The scent ID reference 1133 may reference a scent ID to provide scent effects of the object.

The animation ID reference 1134 may reference an animation ID to provide an animation clip of the object.

The control ID reference 1135 may reference a control ID to provide control of the object.

Table 12 shows example binary representation syntax corresponding to the VWO behavior model type 1110, according to the example embodiments.

TABLE 12

| VWOBehaviorModelType{ | Number of bits | Mnemonic |
|---|---|---|
| BehaviorInput |  | BehaviorInputType |
| BehaviorOutput |  | BehaviorOutputType |
| } |  |  |
| BehaviorInputType{ |  |  |
| EventIDRef | See ISO 10646 | UTF-8 |
| } |  |  |
| BehaviorOutputType{ |  |  |
| SoundIDFlag | 1 | bslbf |
| ScentIDFlag | 1 | bslbf |
| AnimationIDFlag | 1 | bslbf |
| ControlIDFlag | 1 | bslbf |
| if(SoundIDFlag) { |  |  |
| SoundIDRefs | See ISO 10646 | UTF-8 |
| } |  |  |
| if(ScentIDFlag) { |  |  |
| ScentIDRefs | See ISO 10646 | UTF-8 |
| } |  |  |
| if(AnimationIDFlag) { |  |  |
| AnimationIDRefs | See ISO 10646 | UTF-8 |
| } |  |  |
| if(ControlIDFlag) { |  |  |
| ControlIDRefs | See ISO 10646 | UTF-8 |
| } |  |  |
| } |  |  |

Table 12-2 shows example descriptor components semantics of the VWO behavior model type 1110, according to the example embodiments.

TABLE 12-2

| Names | Description |
|---|---|
| VWOBehaviorModelType | Defines the behavior model information which each individual virtual world object can include as one of the characterstics. |
| BehaviorInput | Input event to make an object behavior. |
| BehaviorOutput | Object behavior output according to an input event |
| BehaviorInputType | Defines the input event corresponding to an output behavior. |
| EventIDRef | It refers Event ID of Input event |
| BehaviorOutputType | Defines an output behavior. |
| SoundIDRefs | It refers sound IDs of an output behavior. |
| ScentIDRefs | It refers scent IDs of an output behavior. |
| AnimationIDRefs | It refers animation IDs of an output behavior. |
| ControlIDRefs | It refers Contorl IDs of an output behavior. |

The VWO according to the example embodiments may include a common data type for the avatar metadata and the virtual object metadata. The common data type may be used as a basic building block. The common data type may include a haptic property type, a description type, an animation description type, an animation resources description type, and a common simple data type, however, the present disclosure is not limited thereto.

Hereinafter, the common data type will be described in detail with reference to FIGS. 17 and 18.

Figure 17:
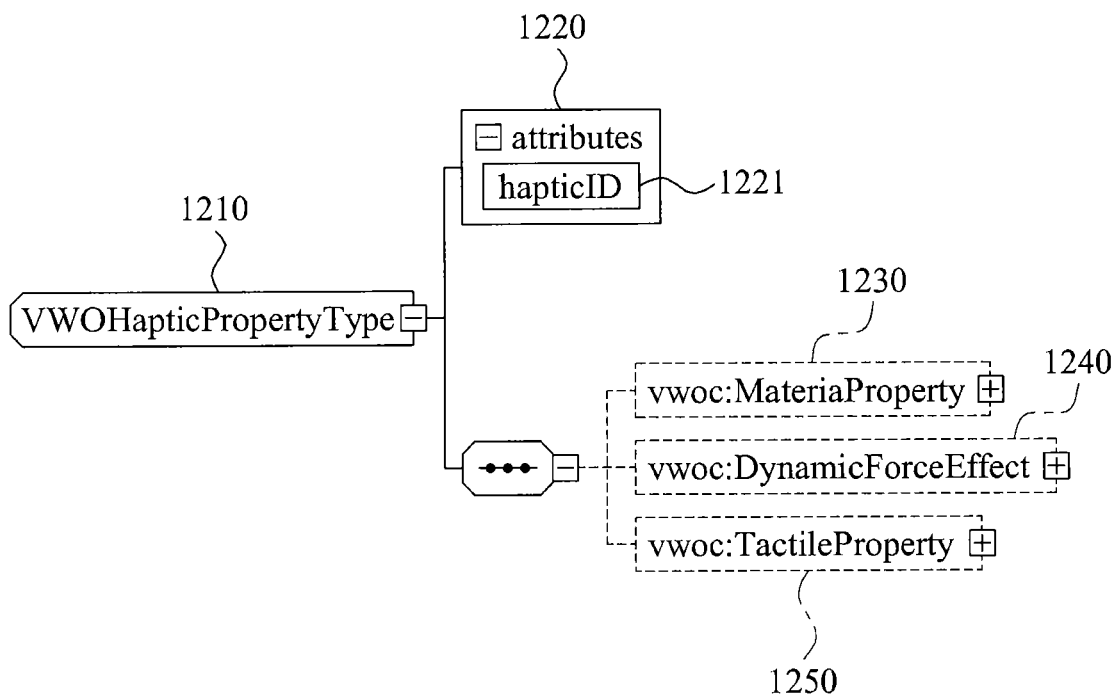
FIG. 17 illustrates a data structure of a VWO haptic property type, according to example embodiments.

FIG. 17 illustrates a data structure of a VWO haptic property type 1210, according to example embodiments.

Referring to FIG. 17, the VWO haptic property type 1210 may include attributes 1220 and a plurality of elements 1230, 1240, and 1250.

The VWO haptic property type 1210 may refer to type information related to a haptic property of the VWO.

Depending on embodiments, the VWO haptic property type 1210 may be expressed using the XML, for example, as shown below in Source 13. However, a program source shown in Source 13 is not limiting and is only an example embodiment.

Source 13

```
<complexType name="VWOHapticPropertyType">
    <sequence>
        <element name="MaterialProperty"
type="vwoc:MaterialPropertyType" minOccurs="0"/>
        <element name="DynamicForceEffect"
type="vwoc:DynamicForceEffectType" minOccurs="0"/>
        <element name="TactileProperty"
            type="vwoc:TactileType" minOccurs="0"/>
    </sequence>
    <attribute name="hapticID" type="ID" use="required"/>
</complexType>
<complexType name="MaterialPropertyType">
    <attribute name="stiffness" type="float" use="optional"/>
    <attribute name="staticFriction" type="float" use="optional"/>
    <attribute name="dynamicFriction" type="float" use="optional"/>
    <attribute name="damping" type="float" use="optional"/>
    <attribute name="texture" type="anyURI" use="optional"/>
    <attribute name="mass" type="float" use="optional"/>
</complexType>
<complexType name="DynamicForceEffectType">
    <attribute name="forceField" type="anyURI" use="optional"/>
    <attribute name="movementTrajectory" type="anyURI"
        use="optional"/>
</complexType>
<complexType name="TactileType">
    <attribute name="temperature" type="float" use="optional"/>
    <attribute name="vibration" type="float" use="optional"/>
    <attribute name="current" type="float" use="optional"/>
    <attribute name="tactilePatterns" type="anyURI" use="optional"/>
</complexType>
```

The attributes 1220 may include haptic ID 1221.

The haptic ID 1221 may refer to a unique identifier of the haptic property.

The VWO haptic property type 1210 may include a material property type 1230, a dynamic force effect type 1240, and a tactile type 1250.

The material property type 1230 may include a parameter characterizing property of a material.

The dynamic force type 1240 may include a parameter characterizing force effects.

The tactile type 1250 may include a parameter characterizing tactile property.

Table 13 shows example binary representation syntax corresponding to the VWO haptic property type 1210, according to the example embodiments.

TABLE 13

| VWOHapticPropertyType { | Number of bits | Mnemonic |
|---|---|---|
| MaterialPropertyFlag | 1 | bslbf |
| DynamicForceEffectFlag | 1 | bslbf |
| TactilePropertyFlag | 1 | bslbf |
| if(MaterialPropertyFlag) { | | |
| MaterialProperty | | MaterialPropertyType |
| } | | |
| if(DynamicForceEffectFlag) { | | |
| DynamicForceEffect | | DynamicForceEffectType |
| } | | |
| if(TactilePropertyFlag) { | | |
| TactileProperty | | TactilePropertyType |
| } | | |
| hapticID | See ISO 10646 | UTF-8 |
| } | | |
| | | |
| MaterialPropertyType{ | | |
| StiffnessFlag | 1 | bslbf |
| StaticFrictionFlag | 1 | bslbf |
| DynamicFrictionFlag | 1 | bslbf |
| DampingFlag | 1 | bslbf |
| TextureFlag | 1 | bslbf |
| MassFlag | 1 | bslbf |
| if(StiffnessFlag) { | | |
| Stiffness | 32 | fsbf |
| } | | |
| if(StaticFrictionFlag) { | | |
| StaticFriction | 32 | fsbf |
| } | | |
| if(DynamicFrictionFlag) { | | |
| DynamicFriction | 32 | fsbf |
| } | | |
| if(DampingFlag) { | | |
| Damping | 32 | fsbf |
| } | | |
| if(TextureFlag) { | | |
| Texture | See ISO 10646 | UTF-8 |
| } | | |
| if(MassFlag) { | | |
| Mass | 32 | fsbf |
| } | | |
| } | | |
| | | |
| DynamicForceEffectType{ | | |
| ForceFieldFlag | 1 | bslbf |
| MovementTrajectoryFlag | 1 | bslbf |
| if(ForceFieldFlag) { | | |
| ForceField | See ISO 10646 | UTF-8 |
| } | | |
| if(MovementTrajectoryFlag) { | | |
| MovementTrajectory | See ISO 10646 | UTF-8 |
| } | | |
| } | | |
| TactileType{ | | |
| TemperatureFlag | 1 | bslbf |
| VibrationFlag | 1 | bslbf |
| CurrentFlag | 1 | bslbf |
| TactilePatternsFlag | 1 | bslbf |
| if(TemperatureFlag) { | | |
| Temperature | 32 | fsbf |
| } | | |
| if(VibrationFlag) { | | |
| Vibration | 32 | fsbf |
| } | | |
| if(CurrentFlag) { | | |
| Current | 32 | fsbf |
| } | | |
| if(TactilePatternsFlag) { | | |
| TactilePatterns | See ISO 10646 | UTF-8 |
| } | | |
| } | | |

Table 13-2 shows descriptor components semantics of the VWO haptic property type 1210, according to the example embodiments.

TABLE 13-2

| Names | Description |
| --- | --- |
| VWOHapticPropertyType | Defines the haptic property information which each individual virtual world object can include as one of the characteristics. |
| MaterialPropertyFlag | This field, which is only present in the binary representation, signals the presence of the MaterialProperty element. "1" means the attribute shall be used and "0" means the attribute shall not be used. |
| DynamicForceEffectFlag | This field, which is only present in the binary representation, signals the presence of the DynamicForceEffect element "1" means the attribute shall be used and "0" means the attibute shall not be used. |
| TactilePropertyFlag | This field, which is only present in the binary representation, signals the presence of the TactileProperty element "1" means the attribute shall be used and "0" means the attibute shall not be used. |
| MaterialProperty | This type contains parameters characterizing haptic properties. |
| DynamicForceEffect | This type contains parameters characterizing force effects. |
| TactileProperty | This type contains parameters characterizing tactile properties. |
| hapticID | Idetifier of the haptic effect. |
| MaterialPropertyType | Defines the parameters characterizing material properties |
| StiffnessFlag | This field, which is only present in the binary representation, signals the presence of the Stiffness element. "1" means the attribute shall be used and "0" means the attribute shall not be used. |
| StaticFrictionFlag | This field, which is only present in the binary representation, signals the presence of the StaticFriction element "1" means the attribute shall be used and "0" means the attribute shall not be used. |
| DynamicFrictionFlag | This field, which is only present in the binary representation, signals the presence of the DynamicFriction element. "1" means the attribute shall be used and "0" means the attribute shall not be used. |
| DampingFlag | This field, which is only present in the binary representation, signals the presence of the Damping element. "1" means the attribute shall be used and "0" means the attribute shall not be used. |
| TextureFlag | This field, which is only present in the binary representation, signals the presence of the Texture element "1" means the attribute shall be used and "0" means the attribute shall not be used. |
| MassFlag | This field, which is only present in the binary representation, signals the presence of the Mass element. "1" means the attribute shall be used and "0" means the attribute shall not be used. |
| Stiffness | The stiffness of the virtual world object (in N/mm). |
| StaticFriction | The static friction of the virtual world object. |
| DynamicFriction | The dynamic friction of the virtual world object. |
| Damping | The damping of the virtual world object. |
| Texture | Contains a link to haptic texture file(e.g. bump image) |
| Mass | The mass of the virtual world object. |
| DynamicForceEffect | Defines the parameters characterizing force effects. |
| ForceFieldFlag | This field, which is only present in the binary representation, signals the presence of the Forcefield element. "1" means the attribute shall be used and "0" means the attribute shall not be used. |
| MovementTrajectoryFlag | This field, which is only present in use binary representation, signals the presence of the MovementTrajectory element. "1" means the attribute shall be used and "0" means the attribute shall not be used. |
| ForceField | Contains link to force filed vector file (sum of force field vectors). |
| MovementTrajectory | Contains link to force trajectory file (e.g. .dat file including sum of motion data). |
| TactileProperty | Defines the parameters characterizing tactile properties. |
| TemperatureFlag | This field, which is only present in the binary representation, signals the presence of the ForceField element. "1" means the attribute shall be used and "0" means the attribute shall not be used. |
| VibrationFlag | This field, which is only present in the binary representation, signals the presence of the ForceField element. "1" means the |

TABLE 13-2-continued

| Names | Description |
|---|---|
| | attribute shall be used and "0" means the attribute shall not be used. |
| CurrentFlag | This field, which is only present in the binary representation, signals the presence of the ForceField element. "1" means the attribute shall be used and "0" means the attribute shall not be used. |
| TactilePatternsFlag | This field, which is only present in the binary representation, signals the presence of the ForceField element. "1" means the attribute shall be used and "0" means the attribute shall not be used. |
| Temperature | The temperature of the virtual world object(in degree celcius). |
| Vibration | The vibration of the virtual world object. |
| Current | The electric current of the virtual world object. (in mA) |
| TactilePatterns | Contains link to tactile pattern file (e.g. grey-scale video. (.avi, h.264., or .dat file.) |

According to an aspect of the present disclosure, the common simple data type may be expressed using the XML, for example, as shown below in Source 13-3. However, a program source shown in Source 13-3 is not limiting and is only an example embodiment.

Source 13-3

```
<simpleType name="indicateOfLHType">
    <restriction base="string">
        <enumeration value="low"/>
        <enumeration value="high"/>
    </restriction>
</simpleType>
<simpleType name="indicateOfLMHType">
    <restriction base="string">
        <enumeration value="low"/>
        <enumeration value="medium"/>
        <enumeration value="high"/>
    </restriction>
</simpleType>
<simpleType name="indicateOfSMBType">
    <restriction base="string">
        <enumeration value="small"/>
        <enumeration value="medium"/>
        <enumeration value="big"/>
    </restriction>
</simpleType>
<simpleType name="indicateOfSMLType">
    <restriction base="string">
        <enumeration value="short"/>
        <enumeration value="medium"/>
        <enumeration value="long"/>
    </restriction>
</simpleType>
<simpleType name="indicateOfDMUType">
    <restriction base="string">
        <enumeration value="down"/>
        <enumeration value="medium"/>
        <enumeration value="up"/>
    </restriction>
</simpleType>
<simpleType name="indicateOfDUType">
    <restriction base="string">
        <enumeration value="down"/>
        <enumeration value="up"/>
    </restriction>
</simpleType>
<simpleType name="indicateOfPMNType">
    <restriction base="string">
        <enumeration value="pointed"/>
        <enumeration value="middle"/>
        <enumeration value="notpointed"/>
    </restriction>
</simpleType>
<simpleType name="indicateOfRCType">
```

Source 13-3

```
    <restriction base="string">
        <enumeration value="round"/>
        <enumeration value="cleft"/>
    </restriction>
</simpleType>
<simpleType name="indicateOfLRType">
    <restriction base="string">
        <enumeration value="left"/>
        <enumeration value="right"/>
    </restriction>
</simpleType>
<simpleType name="indicateOfLMRType">
    <restriction base="string">
        <enumeration value="left"/>
        <enumeration value="middle"/>
        <enumeration value="right"/>
    </restriction>
</simpleType>
<simpleType name="measureUnitLMHType">
    <union memberTypes="vwoc:indicateOfLMHType float"/>
</simpleType>
<simpleType name="measureUnitSMBType">
    <union memberTypes="vwoc:indicateOfSMBType float"/>
</simpleType>
<simpleType name="levelOf5Type">
    <restriction base="integer">
        <minInclusive value="1"/>
        <maxInclusive value="5"/>
    </restriction>
</simpleType>
<simpleType name="angleType">
    <restriction base="float">
        <minInclusive value="0"/>
        <maxInclusive value="360"/>
    </restriction>
</simpleType>
<simpleType name="percentageType">
    <restriction base="float">
        <minInclusive value="0"/>
        <maxInclusive value="100"/>
    </restriction>
</simpleType>
<simpleType name="unlimitedPercentageType">
    <restriction base="float">
        <minInclusive value="0"/>
    </restriction>
</simpleType>
<!-- ################################################ -->
<!-- Point Type                                       -->
<!-- ################################################ -->
<complexType name="PointType" abstract="true"/>
<!-- ################################################ -->
<!-- Logical Point Type                               -->
<!-- ################################################ -->
```

-continued

Source 13-3

```
<complexType name="LogicalPointType">
    <complexContent>
        <extension base="vwoc:PointType">
            <attribute name="name" type="string" use="optional"/>
            <attribute name="sensorID" type="anyURI"
                use="optional"/>
        </extension>
    </complexContent>
</complexType>
<!-- ################################################## -->
<!-- Physical 3D Point Type                             -->
<!-- ################################################## -->
<complexType name="Physical3DPointType">
    <complexContent>
        <extension base="vwoc:PointType">
            <attribute name="x" type="float" use="optional"/>
            <attribute name="y" type="float" use="optional"/>
            <attribute name="z" type="float" use="optional"/>
        </extension>
    </complexContent>
</complexType>
```

Table 13-4 shows example binary representation syntax corresponding to the common simple data type, according to the example embodiments.

TABLE 13-4

| | Number of bits | Mnemonic |
|---|---|---|
| indicateOfLHType | 1 | bslbf |
| indicateOfLMHType | 2 | bslbf |
| indicateOfSMBType | 2 | bslbf |
| indicateOfSMLType | 2 | bslbf |
| indicateOfDMUType | 2 | bslbf |
| indicateOfDUType | 1 | bslbf |
| indicateOfPMNType | 2 | bslbf |
| indicateOfRCType | 1 | bslbf |
| indicateOfLRType | 1 | bslbf |
| indicateOfLMRType | 2 | bslbf |
| measureUnitLMHType{ | | |
|   selectType | 1 | bslbf |
|   If(selectType == 0){ | | |
|     indicationOfLMH | | indicateOfLMHType |
|   }else{ | | |
|     measure | 32 | fsbf |
|   } | | |
| } | | |
| measureUnitSMBType{ | | |
|   selectType | 1 | bslbf |
|   If(selectType == 0){ | | |
|     indicateOfSMB | | indicateOfSMBType |
|   }else{ | | |
|     measure | 32 | fsbf |
|   } | | |
| } | | |
| levelOf5Type | 3 | bslbf |
| angleType | 32 | fsbf |
| percentageType | 32 | fsbf |
| unlimitedPercentageType | 32 | fsbf |
| PointType{ | | |
|   PointTypeSelect | 1 | bslbf |
|   if (PointTypeSelect) { | | |
|     Point | | LogicalPointType |
|   } | | |
|   else{ | | |
|     Point | | Physical3DPointType |
|   } | | |
| } | | |
| LogicalPointType{ | | |
|   nameflag | 1 | bslbf |
|   sensorIDflag | 1 | bslbf |
|   if(nameflag == 1){ | | |
|     name | See ISO 10646 | UTF-8 |
|   } | | |
|   if(sensorIDflag == 1){ | | |
|     sensorID | See ISO 10646 | UTF-8 |
|   } | | |
| } | | |
| Physical3DPointType{ | | |
|   x | 32 | fsbf |
|   y | 32 | fsbf |
|   z | 32 | fsbf |
| } | | |

Table 13-5 shows example descriptor components semantics of the common simple data type, according to the example embodiments.

TABLE 13-5

| Names | Description |
|---|---|
| indicateOfLHType | A type of which value is either low or high. (0: low, 1: high) |
| indicateOfLMHType | A type of which value is among low, medium, or high. (0: low, 1: medium, 2: high, 3: reserved) |
| indicateOfSMBType | A type of which value is among small, medium, or big. (0: small, 1: medium, 2: big, 3: reserved) |
| indicateOfSMLType | A type of which value is among short, medium, or long. (0: short, 1: medium, 2: long, 3: reserved) |
| indicateOfDMUType | A type of which value is among down, medium, or up. (0: down, 1: medium, 2: up, 3: reserved) |
| indicateOfDUType | A type of which value is either down or up. (0: down, 1: up) |
| indicateOfPMNType | A type of which value is among pointed, middle, or not pointed. (0: short, 1: medium, 2: long, 3: reserved) |
| indicateOfRCType | A type of which value is either round, or cleft. (0: round, 1: cleft) |
| indicateOfLRType | A type of which value is either left, or right. (0: left, 1: right) |
| indicateOfLMRType | A type of which value is amoung left, middle, or right. (0: left, 1: middle, 2: right, 3: reserved) |
| measureUnitLMHType | A type which may be either indicateOfLMHType or float. |
| selectType | This field, which is only present in the binary representation, signals whether a floating point value is used or the indicateOfLMHType is used. "1" means that the indicateOfLMHType shall be used, and "0" means that a floating point value shall not be used. |
| measure | a floating point value |
| measureUnitSMBType | A type which may be either indicateOfSMBType or float. |
| selectType | This field, which is only present in the binary representation, signals whether a floating point value is used or the indicateOfSMBType is used. "1" means that the indicateOfSMBType shall be used, and "0" means that a floating point value shall not be used. |
| measure | a floating point value |
| levelOf5Type | A type of which integer value is from one to five. (0:0, 1:1, 2:2, 3:3, 4:4, 5:5, 6-8:reserved) |
| angleType | A type of which floating value is from 0 degree to 360 degree. |
| percentageType | A type of which floating point value is from 0 percent to 100 percent. |

TABLE 13-5-continued

| Names | Description |
|---|---|
| unlimitedPercentageType | A type of which floating value is from 0 percent. |
| PointType | A type providing the point type |
| PointTypeSelect | This field, which is only present in the binary representation, signals whether the type of point is logical point type or the type of point is a physical 3d positional point. "1" means that the logical point type shall be used, and "0" means that the physical 3D point type shall be used. |
| LogicalPointType | A type providing the name of the feature point |
| nameflag | This field, which is only present in the binary representation, signals whether name is used or not. "1" means that the name shall be used, and "0" means that name shall not be used. |
| sensorIDflag | This field, which is only present in the binary representation, signals whether sensorID is used or not. "1" means that the sensorID shall be used, and "0" means that the sensorID shall not be used. |
| name | The name of the feature point |
| sensorID | The sensor ID corresponding to the feature point |
| Physical3DPointType | A type providing a three dimensional point vector value. |
| x | The point value on x-axis in 3 dimensional space |
| y | The point value on y-axis in 3 dimensional space |
| z | The point value on z-axis in 3 dimensional space |

According to an aspect of the present disclosure, the simple data type may include indicate of LH type, indicate of LMH type, indicate of SMB type, indicate of SML type, indicate of DMU type, indicate of DU type, indicate of MN type, indicate of RC type, indicate of LR type, indicate of LMR type, measure unit of LMH type, measure unit of SMB type, level of 5 type, angle type, percentage type, unlimited percentage type, and point type.

The indicate of LH type represents whether a value is high or low.

Depending on embodiments, the indicate of LH type may be expressed using the XML, for example, as shown below in Source 20. However, a program source shown in Source 20 is not limiting and is only an example embodiment.

Source 20

```xml
<!-- ################################################# -->
<!-- indicate Of LH Type                                -->
<!-- ################################################# -->
<simpleType name="indicateOfLHType">
    <restriction base="string">
        <enumeration value="low"/>
        <enumeration value="high"/>
    </restriction>
</simpleType>
```

The indicate of LMH type represents whether the value is high, medium, or low.

Depending on embodiments, the indicate of LMH type may be expressed using the XML as shown in Source 21. However, a program source shown in Source 21 is not limiting and is only an example embodiment.

Source 21

```xml
<!-- ################################################# -->
<!-- indicate Of LMH Type                               -->
<!-- ################################################# -->
<simpleType name="indicateOfLMHType">
    <restriction base="string">
        <enumeration value="low"/>
        <enumeration value="medium"/>
        <enumeration value="high"/>
    </restriction>
</simpleType>
```

The indicate of SMB type represents whether the value is small, medium, or big.

Depending on embodiments, the indicate of SMB type may be expressed using the XML, for example, as shown below in Source 22. However, a program source shown in Source 22 is not limiting and is only an example embodiment.

Source 22

```xml
<!-- ################################################# -->
<!-- indicate Of SMB Type                               -->
<!-- ################################################# -->
<simpleType name="indicateOfSMBType">
    <restriction base="string">
        <enumeration value="small"/>
        <enumeration value="medium"/>
        <enumeration value="big"/>
    </restriction>
</simpleType>
```

The indicate of SML type represents whether the value is short, medium, or long.

Depending on embodiments, the indicate of SML type may be expressed using the XML, for example, as shown in Source 23. However, a program source shown in Source 23 is not limiting and is only an example embodiment.

Source 23

```xml
<!-- ################################################# -->
<!-- indicate Of SML Type                               -->
<!-- ################################################# -->
<simpleType name="indicateOfSMLType">
    <restriction base="string">
        <enumeration value="short"/>
        <enumeration value="medium"/>
        <enumeration value="long"/>
    </restriction>
</simpleType>
```

The indicate of DMU type represents whether the value is down, medium, or up.

Depending on embodiments, the indicate of DMU type may be expressed using the XML, for example, as shown below in Source 24. However, a program source shown in Source 24 is not limiting and is only an example embodiment.

Source 24

```xml
<!-- ################################################# -->
<!-- indicate Of DMU Type                               -->
<!-- ################################################# -->
<simpleType name="indicateOfDMUType">
    <restriction base="string">
```

Source 24

```xml
        <enumeration value="down"/>
        <enumeration value="medium"/>
        <enumeration value="up"/>
    </restriction>
</simpleType>
```

The indicate of DU type represents whether the value is down or up.

Depending on embodiments, the indicate of DU type may be expressed using the XML, for example, as shown below in Source 25. However, a program source shown in Source 25 is not limiting and is only an example embodiment.

Source 25

```xml
<!-- ################################################## -->
<!-- indicate Of DU Type                                -->
<!-- ################################################## -->
<simpleType name="indicateOfDUType">
    <restriction base="string">
        <enumeration value="down"/>
        <enumeration value="up"/>
    </restriction>
</simpleType>
```

The indicate of PMN type represents whether the value is pointed, middle, or not pointed.

Depending on embodiments, the indicate of PMN type may be expressed using the XML, for example, as shown below in Source 26. However, a program source shown in Source 26 is not limiting and is only an example embodiment.

Source 26

```xml
<!-- ################################################## -->
<!-- indicate Of PMN Type                               -->
<!-- ################################################## -->
<simpleType name="indicateOfPMNType">
    <restriction base="string">
        <enumeration value="pointed"/>
        <enumeration value="middle"/>
        <enumeration value="notpointed"/>
    </restriction>
</simpleType>
```

The indicate of RC type represents whether the value is round or cleft.

Depending on embodiments, the indicate of RC type may be expressed using the XML, for example, as shown below in Source 27. However, a program source shown in Source 27 is not limiting and is only an example embodiment.

Source 27

```xml
<!-- ################################################## -->
<!-- indicate Of RC Type                                -->
<!-- ################################################## -->
<simpleType name="indicateOfRCType">
    <restriction base="string">
        <enumeration value="round"/>
        <enumeration value="cleft"/>
    </restriction>
</simpleType>
```

The indicate of LR type represents whether the value is left or right.

Depending on embodiments, the indicate of LR type may be expressed using the XML, for example, as shown below in Source 28. However, a program source shown in Source 28 is not limiting and is only an example embodiment.

Source 28

```xml
<!-- ################################################## -->
<!-- indicate Of LR Type                                -->
<!-- ################################################## -->
<simpleType name="indicateOfLRType">
    <restriction base="string">
        <enumeration value="left"/>
        <enumeration value="right"/>
    </restriction>
</simpleType>
```

The indicate of LMR type represents whether the value is left, middle, or right.

Depending on embodiments, the indicate of LMR type may be expressed using the XML, for example, as shown below in Source 29. However, a program source shown in Source 29 is not limiting and is only an example embodiment.

Source 29

```xml
<!-- ################################################## -->
<!-- indicate Of LMR Type                               -->
<!-- ################################################## -->
<simpleType name="indicateOfLMRType">
    <restriction base="string">
        <enumeration value="left"/>
        <enumeration value="middle"/>
        <enumeration value="right"/>
    </restriction>
</simpleType>
```

The measure unit of LMH type refers to the indicate of LMH type or float.

Depending on embodiments, the measure unit of LMH type may be expressed using the XML, for example, as shown below in Source 30. However, a program source shown in Source 30 is not limiting and is only an example embodiment.

Source 30

```xml
<!-- ################################################## -->
<!-- measure Unit LMH Type                              -->
<!-- ################################################## -->
<simpleType name="measureUnitLMHType">
    <union memberTypes="vwoc:indicateOfLMHType float"/>
</simpleType>
```

The measure unit of SMB type refers to the indicate of SMB type or float.

Depending on embodiments, the measure unit of SMB type may be expressed using the XML, for example, as shown below in Source 31. However, a program source shown in Source 31 is not limiting and is only an example embodiment.

Source 31

```xml
<!-- ################################################## -->
<!-- measure Unit SMB Type                              -->
<!-- ################################################## -->
```

Source 31

```
<simpleType name="measureUnitSMBType">
    <union memberTypes="vwoc:indicateOfSMBType float"/>
</simpleType>
```

The level of 5 type refers to a type of an integer value of from 1 to 5.

Depending on embodiments, the level of 5 type may be expressed using the XML, for example, as shown below in Source 32. However, a program source shown in Source 32 is not limiting and is only an example embodiment.

Source 32

```
<!-- ################################################## -->
<!-- level Of 5 Type                                   -->
<!-- ################################################## -->
<simpleType name="levelOf5Type">
    <restriction base="integer">
        <minInclusive value="1"/>
        <maxInclusive value="5"/>
    </restriction>
</simpleType>
```

The angle type refers to a type of a floating value of from 0 degrees to 360 degrees.

Depending on embodiments, the angle type may be expressed using the XML, for example, as shown below in Source 33. However, a program source shown in Source 33 is not limiting and is only an example embodiment.

Source 33

```
<!-- ################################################## -->
<!-- angle Type                                        -->
<!-- ################################################## -->
<simpleType name="angleType">
    <restriction base="float">
        <minInclusive value="0"/>
        <maxInclusive value="360"/>
    </restriction>
</simpleType>
```

The percentage type refers to a type of a floating value of from 0% to 100%.

Depending on embodiments, the percentage type may be expressed using the XML, for example, as shown below in Source 34. However, a program source shown in Source 34 is not limiting and is only an example embodiment.

Source 34

```
<!-- ################################################## -->
<!-- percentage Type                                   -->
<!-- ################################################## -->
<simpleType name="percentageType">
    <restriction base="float">
        <minInclusive value="0"/>
        <maxInclusive value="100"/>
    </restriction>
</simpleType>
```

The unlimited percentage type refers to a type of a floating value of from 0%.

Depending on embodiments, the unlimited percentage type may be expressed using the XML, for example, as shown below in Source 35. However, a program source shown in Source 35 is not limiting and is only an example embodiment.

Source 35

```
<!-- ################################################## -->
<!-- unlimited percentage Type                         -->
<!-- ################################################## -->
<simpleType name="unlimitedPercentageType">
    <restriction base="float">
        <minInclusive value="0"/>
    </restriction>
</simpleType>
```

The point type refers to a type of a floating value of from 0%.

The point type may provide roots related to two point types, that is, a logical point type and a physical 3D point type which specify feature points for face feature control.

The logical point type provides names of the feature points.

The physical 3D point type provides 3D point vector values.

Depending on embodiments, the point type may be expressed using the XML, for example, as shown below in Source 36. However, a program source shown in Source 36 is not limiting and is only an example embodiment.

Source 36

```
<!-- ################################################## -->
<!-- Point Type                                        -->
<!-- ################################################## -->
<complexType name="PointType" abstract="true"/>
<!-- ################################################## -->
<!-- Logical Point Type                                -->
<!-- ################################################## -->
<complexType name="LogicalPointType">
    <complexContent>
        <extension base="vwoc:PointType">
            <attribute name="name" type="string" use="optional"/>
            <attribute name="sensorID" type="anyURI" use="optional"/>
        </extension>
    </complexContent>
</complexType>
<!-- ################################################## -->
<!-- Physical 3D Point Type                            -->
<!-- ################################################## -->
<complexType name="Physical3DPointType">
    <complexContent>
        <extension base="vwoc:PointType">
            <attribute name="x" type="float" use="optional"/>
            <attribute name="y" type="float" use="optional"/>
            <attribute name="z" type="float" use="optional"/>
        </extension>
    </complexContent>
</complexType>
```

Hereinafter, the avatar will be described in detail with reference to FIGS. 18 to 27.

Figure 18:
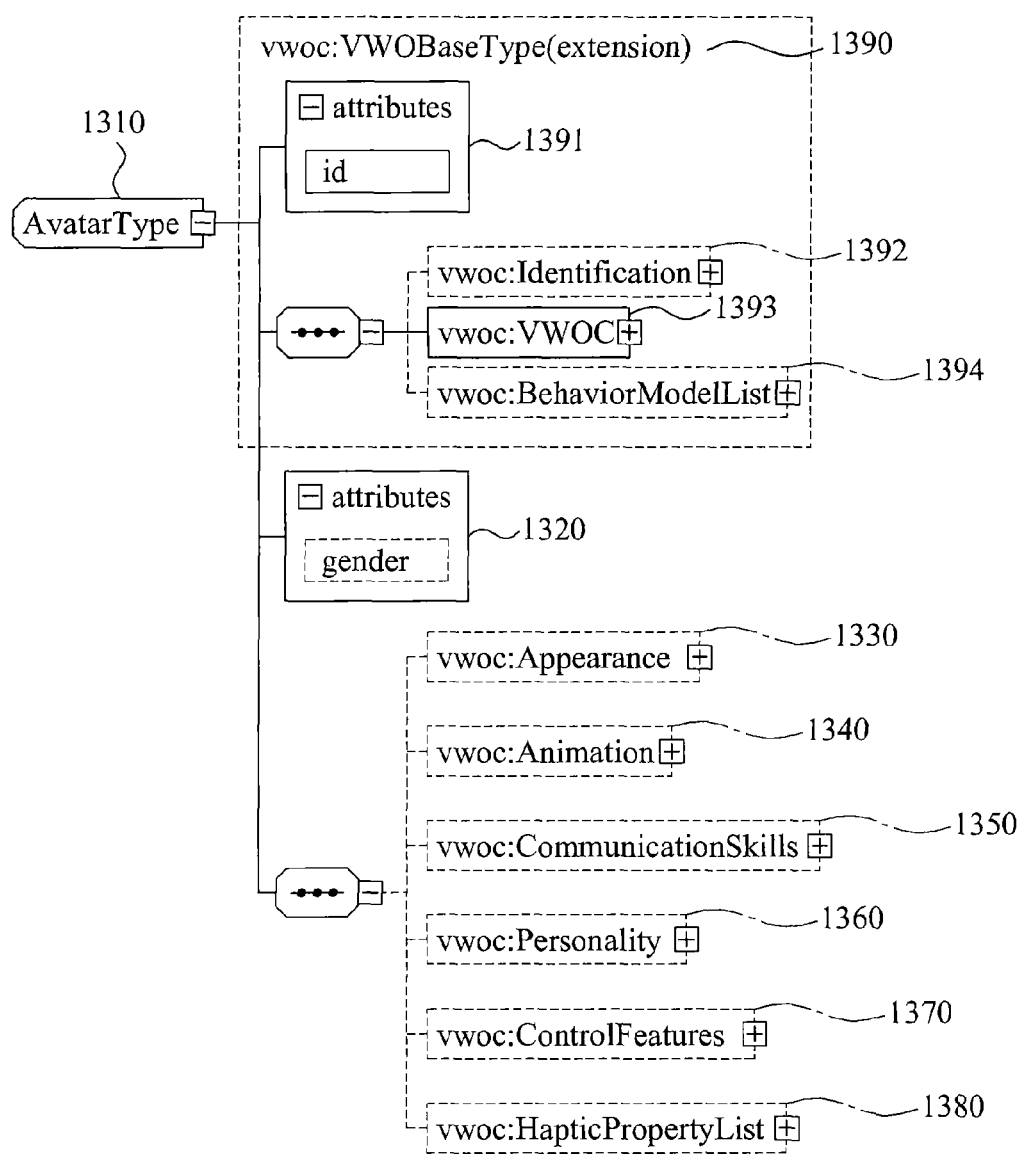
FIG. 18 illustrates a data structure of an avatar, according to example embodiments.

FIG. 18 illustrates a data structure of an avatar, according to example embodiments.

Referring to FIG. 18, the avatar type 1310 denoting a basic data structure of the avatar may include attributes 1320 and a plurality of characteristics 1330 to 1380.

According to the example embodiments, the attributes 1320 may include a gender, which represents a gender of the avatar.

The characteristics 1330 to 1380 may include appearance 1330, animation 1340, communication skills 1350, personality 1360, control feature 1370, and haptic property list 1380.

The avatar type 1330 may extend a VWO base type 1390 and share attributes 1391 and characteristics 1392, 1393, and 1394 of the VWO base type 1390. Since the attributes 1391 and the characteristics 1392, 1393, and 1394 of the VWO base type 1390 have already been described in detail with reference to FIG. 5, a detailed description will be omitted.

Depending on embodiments, the VWO base type 1390 may be expressed using the XML, for example, as shown below in Source 37. However, a program source shown in Source 37 is not limiting and is only an example embodiment.

Source 37

```
<!-- ################################################## -->
<!-- Avatar Type                                         -->
<!-- ################################################## -->
<complexType name="AvatarType">
    <complexContent>
        <extension base="vwoc:VWOBaseType">
            <sequence>
                <element name="Appearance"
type="vwoc:AvatarAppearanceType" minOccurs="0"
maxOccurs="unbounded"/>
                <element name="Animation"
type="vwoc:AvatarAnimationType" minOccurs="0"
maxOccurs="unbounded"/>
                <element name="CommunicationSkills"
type="vwoc:AvatarCommunicationSkillsType" minOccurs="0"
maxOccurs="unbounded"/>
                <element name="Personality"
type="vwoc:AvatarPersonalityType" minOccurs="0"
maxOccurs="unbounded"/>
                <element name="ControlFeatures"
type="vwoc:AvatarControlFeaturesType" minOccurs="0"
maxOccurs="unbounded"/>
                <element name="HapticPropertyList"
type="vwoc:VWOHapticPropertyListType" minOccurs="0"/>
            </sequence>
            <attribute name="gender" type="string" use="optional"/>
        </extension>
    </complexContent>
</complexType>
```

Table 37-4 shows example binary representation syntax corresponding to the avatar type 1310, according to the example embodiments.

TABLE 37-4

| AvatarType{ | Number of bits | Mnemonic |
|---|---|---|
| VWOBase | | VWOBaseType |
| LoopAvatarAppereance | | vluimsbf5 |
| for(k=0; k< LoopAvatarAppereance; k++){ | | |
| Appereance | | AvatarAppereanceType |
| } | | |
| LoopAvatarAnimation | | vluimsbf5 |
| for(k=0; k<LoopAvatarAnimation; k++){ | | |
| Animation | | AvatarAnimationType |
| } | | |
| LoopAvatarCommunicationSkills | | vluimsbf5 |
| for(k=0; k<LoopAvatarCommunicationSkills; k++){ | | |
| CommunicationSkills | | AvatarCommunicationSkillsType |
| } | | |
| LoopAvatarPersonality | | vluimsbf5 |
| for(k=0;k<LoopAvatarPersonality; k++){ | | |
| Personality | | AvatarPersonalityType |
| } | | |
| LoopAvatarControlFeatures | | vluimsbf5 |
| for(k=0;k<LoopAvatarControlFeatures; k++){ | | |
| ControlFeatures | | AvatarControlFeaturesType |
| } | | |
| HapticPropertyListFlag | 1 | bslbf |
| if(HapticPropertyListFlag){ | | |
| HapticPropertyList | | VWOHapticPropertyListType |
| } | | |
| genderFlag | 1 | bslbf |
| if(genderFlag){ | | |
| gender | See ISO 10646 | UTF-8 |
| } | | |
| } | | |

Table 37-5 shows example descriptor components semantics of the avatar type 1310, according to the example embodiments.

TABLE 37-5

| Names | Description |
| --- | --- |
| AvatarType | Defines the characteristics of avatar. |
| VWOBase | Define the common base attributes and elements for avatar. |
| LoopAvatarAppearance | This field, which is only present in the binary representation, specifies the number of appearance information contained in the avatar characteristics. |
| Appearance | Contains the description of the appearance of an avatar. |
| LoopAvatarAnimation | This field, which is only present in the binary representation, specifies the number of animation information contained in the avatar characteristics. |
| Animation | Contains the description of the animation of an avatar. |
| LoopAvatarCommunicationSkills | This field, which is only present in the binary representation, specifies the number of communication skills information contained in the avatar characteristics. |
| CommunicationSkills | Contains the description of the communication skills of an avatar. |
| LoopAvatarPersonality | This field, which is only present in the binary representation, specifies the number of personality information contained in the avatar characteristics. |
| Personality | Contains the description of the personality of an avatar. |
| LoopAvatarControlFeatures | This field, which is only present in the binary representation, specifies the number of feature control information contained in the avatar characteristics. |
| ControlFeatures | Contains the description of the feature control information of an avatar. |
| HapticPropertyListFlag | This field, which is only present in the binary representation, signals the presence of the Haptic Property list. "1" means that the element shall be used. "0" means that the element shall not be used. |
| HapticPropertyList | Contains the description of the haptic property list information of an avatar. |
| genderFlag | This field, which is only present in the binary representation, signals the presence of the gender attribute. "1" means that the attribute shall be used. "0" means that the attribute shall not be used. |
| gender | This attribute specifies the gender description of an avatar. |

Figure 19:
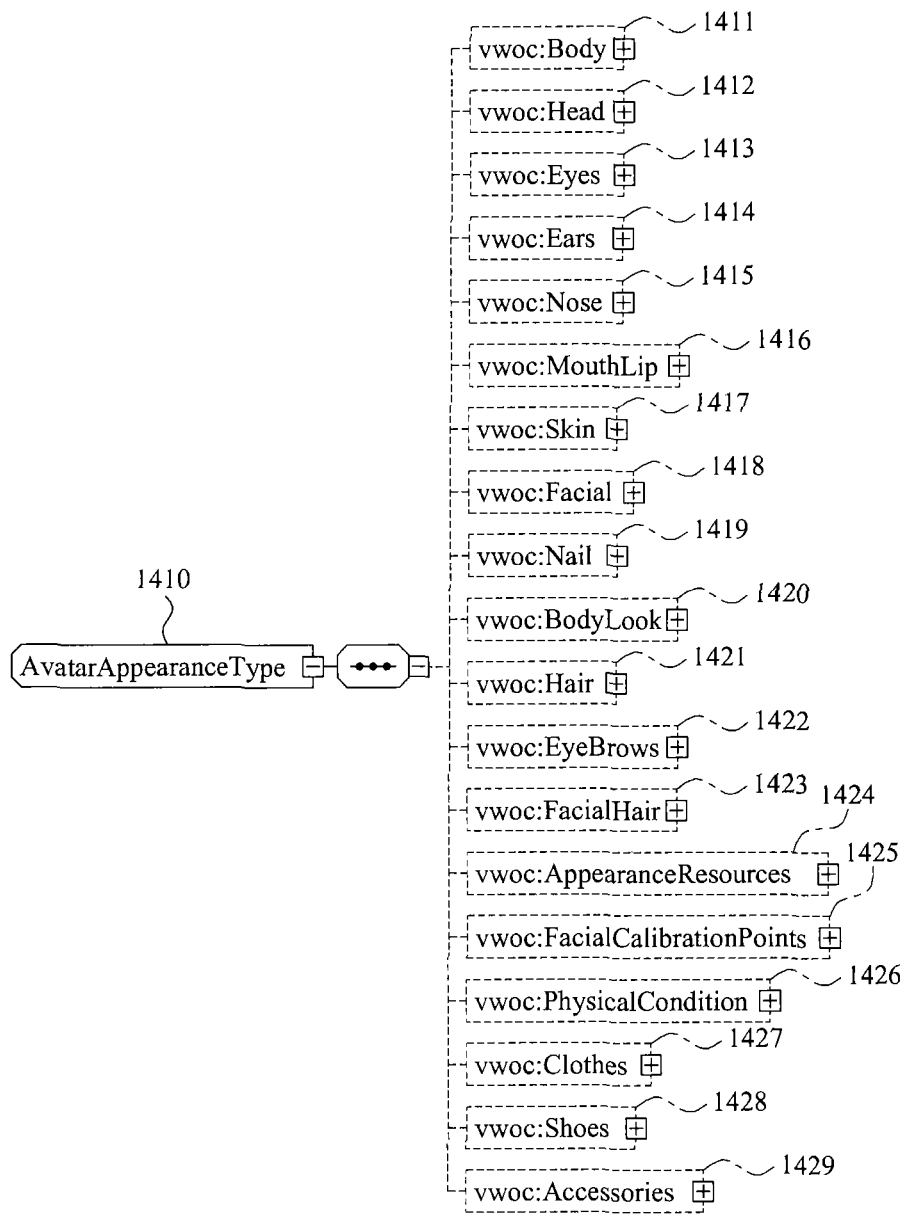
FIG. 19 illustrates a data structure of an avatar appearance type, according to example embodiments.

FIG. 19 illustrates a data structure of an avatar appearance type 1410, according to example embodiments.

Referring to FIG. 19, the avatar appearance type 1410 may include a plurality of elements 1411 to 1429.

The elements of the avatar appearance type 1410 may include body 1411, head 1412, eyes 1413, ears 1414, nose 1415, mouth lip 1416, skin 1417, facial 1418, nail 1419, body look 1420, hair 1421, eyebrows 1422, facial hair 1423, appearance resources 1424, facial calibration points 1425, physical condition 1426, clothes 1427, shoes 1428, and accessories 1429.

Depending on embodiments, the avatar appearance type 1410 may be expressed using the XML, for example, as shown below in Source 38. However, a program source shown in Source 38 is not limiting and is only an example embodiment.

Source 38

```
<!-- ################################################ -->
<!-- Avatar Appearance Type                           -->
<!-- ################################################ -->
<complexType name="AvatarAppearanceType">
    <sequence>
        <element name="Body" type="vwoc:BodyType" minOccurs="0"/>
        <element name="Head" type="vwoc:HeadType" minOccurs="0"/>
        <element name="Eyes" type="vwoc:EyesType" minOccurs="0"/>
        <element name="Ears" type="vwoc:EarsType" minOccurs="0"/>
        <element name="Nose" type="vwoc:NoseType" minOccurs="0"/>
        <element name="MouthLip" type="vwoc:MouthType" minOccurs="0"/>
        <element name="Skin" type="vwoc:SkinType" minOccurs="0"/>
        <element name="Facial" type="vwoc:FacialType" minOccurs="0"/>
        <element name="Nail" type="vwoc:NailType" minOccurs="0"/>
        <element name="BodyLook" type="vwoc:BodyLookType" minOccurs="0"/>
        <element name="Hair" type="vwoc:HairType" minOccurs="0"/>
        <element name="EyeBrows" type="vwoc:EyebrowsType" minOccurs="0"/>
        <element name="FacialHair" type="vwoc:FacialHairType" minOccurs="0"/>
        <element name="AppearanceResources" type="anyURI" minOccurs="0"
```

-continued

| Source 38 |
|---|

```
maxOccurs="unbounded"/>
      <element name="FacialCalibrationPoints"
type="vwoc:FacialCalibrationPointsType" minOccurs="0"/>
      <element name="PhysicalCondition" type="vwoc:PhysicalConditionType"
minOccurs="0"/>
      <element name="Clothes" type="vwoc:VirtualObjectType" minOccurs="0"
maxOccurs="unbounded"/>
      <element name="Shoes" type="vwoc:VirtualObjectType" minOccurs="0"
maxOccurs="unbounded"/>
      <element name="Accessories" type="vwoc:VirtualObjectType" minOccurs="0"
maxOccurs="unbounded"/>
   </sequence>
</complexType>
```

Table 38-1 shows example binary representation syntax corresponding to the avatar appearance type 1410, according to the example embodiments.

TABLE 38-1

| Avatar AppearanceType{ | Number of bits | Mnemonic |
|---|---|---|
| BodyFlag | 1 | bslbf |
| HeadFlag | 1 | bslbf |
| EyesFlag | 1 | bslbf |
| EarsFlag | 1 | bslbf |
| NoseFlag | 1 | bslbf |
| MouthLipFlag | 1 | bslbf |
| SkinFlag | 1 | bslbf |
| FacialFlag | 1 | bslbf |
| NailFlag | 1 | bslbf |
| BodyLookFlag | 1 | bslbf |
| HairFlag | 1 | bslbf |
| EyeBrowsFlag | 1 | bslbf |
| FacialHairFlag | 1 | bslbf |
| AppearanceResourcesFlag | 1 | bslbf |
| FacialCalibrationPointsFlag | 1 | bslbf |
| PhysicalConditionFlag | 1 | bslbf |
| ClothesFlag | 1 | bslbf |
| ShoesFlag | 1 | bslbf |
| AccessoriesFlag | 1 | bslbf |
| if(BodyFlag){ | | |
|   Body | | BodyType |
| } | | |
| if(HeadFlag){ | | |
|   Head | | HeadType |
| } | | |
| if(EyesFlag){ | | |
|   Eyes | | EyesType |
| } | | |
| if(EarsFlag){ | | |
|   Ears | | EarsType |
| } | | |
| if(NoseFlag){ | | |
|   Nose | | NoseType |
| } | | |
| if(MouthLipFlag){ | | |
|   MouthLip | | MouseLipType |
| } | | |
| if (SkinFlag){ | | |
|   Skin | | SkinType |
| } | | |
| if(FacialFlag){ | | |
|   Facial | | FacialType |
| } | | |
| if(NailFlag){ | | |
|   Nail | | NailType |
| } | | |
| if(BodyLookFlag){ | | |
|   BodyLook | | BodyLookType |
| } | | |
| if(HairFlag){ | | |
|   Hair | | HairType |
| } | | |

TABLE 38-1-continued

| Avatar AppearanceType{ | Number of bits | Mnemonic |
|---|---|---|
| if(EyeBrowsFlag){ | | |
|   EyeBrows | | EyeBrowsType |
| } | | |
| if(FacialHairFlag){ | | |
|   FacialHair | | FacialHairType |
| } | | |
| if(AppearanceResourcesFlag){ | | |
|   NumAppearanceResources | | vluimsbf5 |
|   for(k=0; k< NumAppearanceResources; k++){ | | |
|     AppearanceResources | See ISO 10646 | UTF-B |
|   } | | |
| } | | |
| if(FacialCalibrationPointsFlag){ | | |
|   FacialCalibrationPoints | | FacialCalibrationPointsType |
| } | | |
| if (PhysicalConditionFlag){ | | |
|   PhysicalCondition | | PhysicalConditionType |
| } | | |
| if(ClothesFlag){ | | |
|   NumClothes | | vluimsbf5 |
|   for(k=0; k< NumClothes; k++){ | | |
|     Clothes | | VirtualObjectType |
|   } | | |
| } | | |
| if(ShoesFlag){ | | |
|   NumShoes | | vluimsbf5 |
|   for(k=0; k< NumShoes; k++){ | | |
|     Shoes | | VirtualObjectType |
|   } | | |
| } | | |
| if(AccessoriesFlag){ | | |
|   NumAccesories | | vluimsbf5 |
|   for(k=0; k< NumAccessories; k++){ | | |
|     Accessories | | VirtualObjectType |
|   } | | |
| } | | |
| } | | |

Table 38-2 shows example descriptor components semantics of the avatar appearance type 1410, according to the example embodiments.

TABLE 38-2

| Names | Description |
|---|---|
| AvatarAppearanceType | Defines the appearance of avatar |
| BodyFlag | This field, which is only present in the binary representation signals the presence of the body element. "1" means that the element shall be used. "0" means that the element shall not be used. |
| HeadFlag | This field, which is only present in the binary representation, signals the presence of the head element. "1" means that the element shall be used. "0" means that the element shall not be used. |
| EyesFlag | This field, which is only present in the binary representation, signals the presence of the eyes element. "1" means that the element shall be used. "0" means that the element shall not be used. |
| EarsFlag | This field, which is only present in the binary representation, signals the presence of the ears element. "1" means that the element shall be used. "0" means that the element shall not be used. |
| NoseFlag | This field, which is only present in the binary representation, signals the presence of the nose element. "1" means that the element shall be used. "0" means that the element shall not be used. |
| MouthLipFlag | This field, which is only present in the binary representation, signals the presence of the mouth lip element. "1" means that the element shall be used. "0" means that the element shall not be used. |

TABLE 38-2-continued

| Names | Description |
|---|---|
| AvatarAppearanceType | Defines the appearance of avatar |
| SkinFlag | This field, which is only present in the binary representation, signals the presence of the skin element. "1" means that the element shall be used. "0" means that the element shall not be used. |
| FacialFlag | This field, which is only present in the binary representation, signals the presence of the facial element. "1" means that the element shall be used. "0" means that the element shall not be used. |
| NailFlag | This field, which is only present in the binary representation, signals the presence of the nail element. "1" means that the element shall be used. "0" means that the element shall not be used. |
| BodyLookFlag | This field, which is only present in the binary representation, signals the presence of the body-look element. "1" means that the element shall be used. "0" means that the element shall not be used. |
| HairFlag | This field, which is only present in the binary representation, signals the presence of the hair element. "1" means that the element shall be used. "0" means that the element shall not be used. |
| EyeBrowsFlag | This field, which is only present in the binary representation, signals the presence of the eyebrows element. "1" means that the element shall be used. "0" means that the element shall not be used. |
| FacialHairFlag | This field, which is only present in the binary representation, signals the presence of the facial hair element. "1" means that the element shall be used. "0" means that the element shall not be used. |
| AppearanceResourcesFlag | This field, which is only present in the binary representation, signals the presence of the appearance resources element. "1" means that the element shall be used. "0" means that the element shall not be used. |
| FacialCalibrationPointsFlag | This field, which is only present in the binary representation, signals the presence of the facial calibration element. "1" means that the element shall be used. "0" means that the element shall not be used. |
| PhysicalConditionFlag | This field, which is only present in the binary representation, signals the presence of the physical condition element. "1" means that the element shall be used. "0" means that the element shall not be used. |
| ClothesFlag | This field, which is only present in the binary representation, signals the presence of the clothes element. "1" means that the element shall be used. "0" means that the element shall not be used. |
| ShoesFlag | This field, which is only present in the binary representation, signals the presence of the shoes element. "1" means that the element shall be used. "0" means that the element shall not be used. |
| AccessoriesFlag | This field, which is only present in the binary representation, signals the presence of the accessories element. "1" means that the element shall be used. "0" means that the element shall not be used. |
| Body | Set of elements for body description of an avatar. |
| Head | Set of elements for head description of an avatar. |
| Eyes | Set of elements for eyes description of an avatar. |
| Ears | Set of elements for ears description of an avatar. |
| Nose | Set of elements for nose description of an avatar. |
| MouthLip | Set of elements for mouthlips description of an avatar. |
| Skin | Set of elements for skin description of an avatar. |
| Facial | Set of elements for facial description of an avatar. |
| Nail | Set of elements for nail description of an avatar. |
| BodyLook | Set of elements for body look description of an avatar. |
| Hair | Set of elements for hair description of an avatar. |
| EyeBrows | Set of elements for eyebrows description of an avatar. |
| FacialHair | Set of elements for facial hair description of an avatar. |
| NumAppearanceResources | This field, which is only present in the binary representation, specifies the number of Appearance Resource elements. |
| AppearanceResources | Set of elements for appearance resources of an avatar. |
| FacialCalibrationPoints | Set of elements for facial calibration points of an avatar. |
| PhysicalCondition | Set of elements for physical condition of an avatar. |
| NumClothes | This field, which is only present in the binary representation, specifies the number of clothes elements. |

TABLE 38-2-continued

| Names | Description |
|---|---|
| AvatarAppearanceType | Defines the appearance of avatar |
| Clothes | List of clothes description attached to an avatar. |
| NumShoes | This field, which is only present in the binary representation, specifies the number of shoes elements. |
| Shoes | List of shoes description attached to an avatar. |
| NumAccessories | This field, which is only present in the binary representation, specifies the number of accessories elements. |
| Accessories | List of accessory descriptions attachedd to an avatar. |

Depending on embodiments, the body 1411 of the avatar appearance type 1410 may be expressed using the XML, for example, as shown below in Source 39. However, a program source shown in Source 39 is not limiting and is only an example embodiment.

Source 39

```
<xsd:complexType name="BodyType">
<complexType name="BodyType">
  <sequence>
    <element name="BodyHeight" type="float" minOccurs="0"/>
    <element name="BodyThickness" type="float" minOccurs="0"/>
    <elementname="BodyFat" type="vwoc:measureUnitLMHType"
      minOccurs="0"/>
    <element name="TorsoMuscles" type="vwoc:measureUnitLMHType"
minOccurs="0"/>
    <element name="NeckThikness" type="float" minOccurs="0"/>
    <element name="NeckLength" type="float" minOccurs="0"/>
    <element name="Shoulders" type="float" minOccurs="0"/>
    <element name="Pectorials" type="float" minOccurs="0"/>
    <element name="ArmLength" type="float" minOccurs="0"/>
    <element name="HeadSize" type="float" minOccurs="0"/>
    <element name="TorsoLength" type="float" minOccurs="0"/>
    <element name="LoveHandles" type="float" minOccurs="0"/>
    <element name="BellySize" type="float" minOccurs="0"/>
    <element name="LegMuscles" type="float" minOccurs="0"/>
    <element name="LegLength" type="float" minOccurs="0"/>
    <element name="HipWidth" type="float" minOccurs="0"/>
    <element name="HipLength" type="float" minOccurs="0"/>
    <element name="ButtSize" type="float" minOccurs="0"/>
    <element name="Package" type="vwoc:indicateOfSMBType"
      minOccurs="0"/>
    <element name="SaddleBags" type="vwoc:indicateOfSMBType"
minOccurs="0"/>
    <element name="KneeAngle" type="vwoc:angleType"
      minOccurs="0"/>
    <element name="FootSize" type="float" minOccurs="0"/>
  </sequence>
  <attribute name="hapticIDRef" type="IDREF" use="optional"/>
</complexType>
```

Table 39-1 shows example binary representation syntax corresponding to the body 1411 of the avatar appearance type 1410, according to the example embodiments.

TABLE 39-1

| BodyType{ | Number of bits | Mnemonic |
|---|---|---|
| BodyHeightFlag | 1 | bslbf |
| BodyThicknessFlag | 1 | bslbf |
| BodyFatFlag | 1 | bslbf |
| TorsoMusclesFlag | 1 | bslbf |
| NeckThiknessFlag | 1 | bslbf |
| NeckLengthFlag | 1 | bslbf |
| ShouldersFlag | 1 | bslbf |
| PectorialsFlag | 1 | bslbf |
| ArmLengthFlag | 1 | bslbf |
| HeadSizeFlag | 1 | bslbf |
| TorsoLengthFlag | 1 | bslbf |

TABLE 39-1-continued

| BodyType{ | Number of bits | Mnemonic |
|---|---|---|
| LoveHandlesFlag | 1 | bslbf |
| LegMusclesFlag | 1 | bslbf |
| LegLengthFlag | 1 | bslbf |
| HipWidthFlag | 1 | bslbf |
| HipLengthFlag | 1 | bslbf |
| ButtSizeFlag | 1 | bslbf |
| PackageFlag | 1 | bslbf |
| SaddleBagsFlag | 1 | bslbf |
| KneeAngleFlag | 1 | bslbf |
| FootSizeFlag | 1 | bslbf |
| hapticIDRefFlag | 1 | bslbf |
| if(BodyHeightFlag){ | | |
|    BodyHeight | 32 | fsbf |
| } | | |
| if(BodyThicknessFlag){ | | |
|    BodyThickness | 32 | fsbf |
| } | | |
| if(BodyHeightFlag){ | | |
|    BodyFat | | measuredUnitLMHType |
| } | | |
| if(TorsoMusclesFlag){ | | |
|    TorsoMuscles | | measuredUnitLMHType |
| } | | |
| if(NeckThicknessFlag){ | | |
|    NeckThickness | 32 | fsbf |
| } | | |
| if (NeckLengthFlag){ | | |
|    NeckLengthness | 32 | fsbf |
| } | | |
| if(ShouldersFlag){ | | |
|    Shoulders | 32 | fsbf |
| } | | |
| if(PectorialsFlag){ | | |
|    Pectorials | 32 | fsbf |
| } | | |
| if (ArmLengthFlag){ | | |
|    ArmLength | 32 | fsbf |
| } | | |
| if(HeadSizeFlag){ | | |
|    HeadSize | 32 | fsbf |
| } | | |
| if(TorsoLengthFlag){ | | |
|    TorsoLength | 32 | fsbf |
| } | | |
| if (LoveHandlesFlag){ | | |
|    LoveHandles | 32 | fsbf |
| } | | |
| if(BellySizeFlag){ | | |
|    BellySize | 32 | fsbf |
| } | | |
| if (LegMusclesFlag){ | | |
|    LegMuscles | 32 | fsbf |
| } | | |
| if(LegLengthFlag){ | | |
|    LegLength | 32 | fsbf |
| } | | |
| if (HipWidthFlag){ | | |
|    HipWidth | 32 | fsbf |
| } | | |
| if(HipLengthFlag){ | | |
|    HipLength | 32 | fsbf |

TABLE 39-1-continued

| BodyType{ | Number of bits | Mnemonic |
|---|---|---|
| } | | |
| if (ButtSizeFlag){ | | |
| ButtSize | 32 | fsbf |
| } | | |
| if (PackageFlag){ | | |
| Package | | indicateOfSMBType |
| } | | |
| if(SaddleBagsFlag){ | | |
| SaddleBags | | indicateOfSMBType |
| } | | |
| if (KneeAngleFlag){ | | |
| KneeAngle | | angleType |
| } | | |

TABLE 39-1-continued

| BodyType{ | Number of bits | Mnemonic |
|---|---|---|
| if(FootSizeFlag){ | | |
| FootSize | 32 | fsbf |
| } | | |
| if (hapticIDRefFlagFlag){ | | |
| hapticIDRef | See ISO 10646 | UTF-8 |
| } | | |
| } | | |

Table 39-2 shows example descriptor components semantics of the body 1411 of the avatar appearance type 1410, according to the example embodiments.

TABLE 39-2

| Names | Description |
|---|---|
| BodyType | Defines the appearance of avatar. |
| BodyHeightFlag | This field, which is only present in the binary representation, signals the presence of the BodyHeight element. "1" means that the element shall be used. "0" means that the element shall not be used. |
| BodyThicknessFlag | This field, which is only present in the binary representation, signals the presence of the BodyThickness element. "1" means that the element shall be used. "0" means that the element shall not be used. |
| BodyFatFlag | This field, which is only present in the binary representation, signals the presence of the BodyFat element. "1" means that the element shall be used. "0" means that the element shall not be used. |
| TorsoMusclesFlag | This field, which is only present in the binary representation, signals the presence of the TorsoMuscles element "1" means that the element shall be used. "0" means that the element shall not be used. |
| NeckThiknessFlag | This field, which is only present in the binary representation, signals the presence of the NeckThikness element. "1" means that the element shall be used. "0" means that the element shall not be used. |
| NeckLengthFlag | This field, which is only present in the binary representation, signals the presence of the NeckLength element. "1" means that the element shall be used. "0" means that the element shall not be used. |
| ShouldersFlag | This field, which is only present in the binary representation, signals the presence of the Shoulders element. "1" means that the element shall be used. "0" means that the element shall not be used. |
| PectorialsFlag | This field, which is only present in the binary representation, signals the presence of the Pectorials element. "1" means that the element shall be used. "0" means that the element shall not be used. |
| ArmLengthFlag | This field, which is only present in the binary representation, signals the presence of the ArmLength element. "1" means that the element shall be used. "0" means that the element shall not be used. |
| HeadSizeFlag | This field, which is only present in the binary representation, signals the presence of the HeadSize element. "1" means that the element shall be used. "0" means that the element shall not be used. |
| TorsoLengthFlag | This field, which is only present in the binary representation, signals the presence of the TorsoLength element. "1" means that the element shall be used. "0" means that the element shall not be used. |
| LoveHandlesFlag | This field, which is only present in the binary representation, signals the presence of the LoveHandles element. "1" means that the element shall be used. "0" means that the element shall not be used. |
| LegMusclesFlag | This field, which is only present in the binary representation, signals the presence of the LegMuscles element. "1" means that the element shall be used. "0" means that the element shall not be used. |
| LegLengthFlag | This field, which is only present in the binary representation, signals the presence of the LegLength element. "1" means that the element shall be used. "0" means that the element shall not be used. |

TABLE 39-2-continued

| Names | Description |
| --- | --- |
| HipWidthFlag | This field, which is only present in the binary representation, signals the presence of the HipWidth element. "1" means that the element shall be used. "0" means that the element shall not be used. |
| HipLengthFlag | This field, which is only present in the binary representation, signals the presence of the HipLength element. "1" means that the element shall be used. "0" means that the element shall not be used. |
| ButtSizeFlag | This field, which is only present in the binary representation, signals the presence of the ButtSize element. "1" means that the element shall be used. "0" means that the element shall not be used. |
| PackageFlag | This field, which is only present in the binary representation, signals the presence of the Package element. "1" means that the element shall be used. "0" means that the element shall not be used. |
| SaddleBagsFlag | This field, which is only present in the binary representation, signals the presence of the SaddleBags element. "1" means that the element shall be used. "0" means that the element shall not be used. |
| KneeAngleFlag | This field, which is only present in the binary representation, signals the presence of the KneeAngle element. "1" means that the element shall be used. "0" means that the element shall not be used. |
| FootSizeFlag | This field, which is only present in the binary representation, signals the presence of the FootSize element. "1" means that the element shall be used. "0" means that the element shall not be used. |
| hapticIDRefFlag | This field, which is only present in the binary representation, signals the presence of the haptic property of the body type element. "1" means that the element shall be used. "0" means that the element shall not be used. |
| BodyHeight | Full height of the character (always in meter) |
| BodyThickness | This indicates the weight of the bounding box of the avatar (always in meter) |
| BodyFat | indicates the fatness of the body or the percent of body fat. |
| TorsoMuscles | indicates the average muscularity of the avatar's body |
| NeckThikness | The diameter of the neck (always in meter) |
| NeckLength | The height of the neck (always in meter) |
| Shoulders | The width of the shoulders (always in meter) |
| Pectorials | The size of the pectoral muscles (always in meter) |
| ArmLength | Length of complete arm (always in meter) |
| HeadSize | Size of the whole hand including fingers (always in meter) |
| TorsoLength | The length of torso(between pectorals and legs) (always in meter) |
| LoveHandles | Size of the love handles (always in meter) |
| LegMuscles | Diameter of the belly (always in meter) |
| LegLength | Size of all leg muscles (always in meter) |
| HipWidth | Length of complete leg (always in meter) |
| HipLength | The width of the hip area (always in meter) |
| ButtSize | The vertical size of the hip area (always in meter) |
| Package | Diameter of the butt's avatar (always in meter) |
| SaddleBags | Size of the package (small, medium, big) |
| KneeAngle | Volume of saddle bags (small, medium, big) |
| FootSize | The angle between the upper end lower leg, normally 0 when they are aligned (in degrees, from 0 to 360). |
| hapticIDRef | Refers to the identifier of the haptic property associated with the body type. |

Depending on embodiments, the head 1412 of the avatar appearance type 1410 may be expressed using the XML, for example, as shown below in Source 40. However, a program source shown in Source 40 is not limiting and is only an example embodiment.

Source 40

```
<complexType name="HeadType">
  <sequence>
    <element name="HeadSize" type="vwoc:measureUnitSMBType" minOccurs="0"/>
    <element name="HeadStretch" type="vwoc:unlimitedPercentageType" minOccurs="0"/>
```

-continued

Source 40

```
    <element name="HeadShape" minOccurs="0">
      <simpleType>
        <restriction base="string">
          <enumeration value="square"/>
          <enumeration value="round"/>
          <enumeration value="oval"/>
          <enumeration value="long"/>
        </restriction>
      </simpleType>
    </element>
    <element name="EggHead" type="boolean" minOccurs="0"/>
    <element name="HeadLength" type="float" minOccurs="0"/>
```

-continued

Source 40

```
<element name="FaceShear" type="float" minOccurs="0"/>
<element name="ForeheadSize" type="float" minOccurs="0"/>
<element name="ForeheadAngle" type="vwoc:angleType"
minOccurs="0"/>
<element name="BrowSize" type="float" minOccurs="0"/>
<element name="FaceSkin" minOccurs="0">
    <simpleType>
        <restriction base="string">
            <enumeration value="dry"/>
            <enumeration value="normal"/>
            <enumeration value="greassy"/>
        </restriction>
    </simpleType>
</element>
<element name="Cheeks" type="vwoc:measureUnitSMBType"
minOccurs="0"/>
<element name="CheeksDepth" type="float" minOccurs="0"/>
<element name="CheeksShape" minOccurs="0">
    <simpleType>
        <restriction base="string">
            <enumeration value="chubby"/>
            <enumeration value="high"/>
            <enumeration value="bone"/>
        </restriction>
    </simpleType>
</element>
<element name="UpperCheeks" type="vwoc:measureUnitSMBType"
minOccurs="0"/>
<element name="LowerCheeks" type="vwoc:measureUnitSMBType"
minOccurs="0"/>
<element name="CheekBones" type="vwoc:indicateOfDMUType"
minOccurs="0"/>
</sequence>
<attribute name="hapticIDRef" type="IDREF" use="optional"/>
</complexType>
```

Table 40-1 shows example binary representation syntax corresponding to the head 1412 of the avatar appearance type 1410, according to the example embodiments.

TABLE 40-1

| HeadType{ | Number of bits | Mnemonic |
|---|---|---|
| HeadSizeFlag | 1 | bslbf |
| HeadStrechFlag | 1 | bslbf |
| HeadShapeFlag | 1 | bslbf |
| EggHeadFlag | 1 | bslbf |
| HeadLengthFlag | 1 | bslbf |
| FaceShearFlag | 1 | bslbf |
| ForeheadSizeFlag | 1 | bslbf |
| ForeheadAngleFlag | 1 | bslbf |
| BrowSizeFlag | 1 | bslbf |
| FaceSkinFlag | 1 | bslbf |
| CheeksFlag | 1 | bslbf |
| CheeksDepthFlag | 1 | bslbf |
| CheeksShapeFlag | 1 | bslbf |
| UpperCheeksFlag | 1 | bslbf |

TABLE 40-1-continued

| HeadType{ | Number of bits | Mnemonic |
|---|---|---|
| LowerCheeksFlag | 1 | bslbf |
| CheekBonesFlag | 1 | bslbf |
| hapticIDRefFlag | 1 | bslbf |
| if(HeadSizeFlag){ | | |
|   HeadSize | | measureUnitSMBType |
| } | | |
| if(HeadStrechFlag){ | | |
|   HeadStrech | 32 | unlimitedPercentageType |
| } | | |
| if(HeadShapeFlag){ | | |
|   HeadShape | 3 | bslbf |
| } | | |
| if(EggHeadFlag){ | | |
|   EggHead | 1 | bslbf |
| } | | |
| if(HeadLengthFlag){ | | |
|   HeadLength | 32 | fsbf |
| } | | |
| if(FaceShearFlag){ | | |
|   FaceShear | 32 | fsbf |
| } | | |
| if(ForeheadSizeFlag){ | | |
|   ForeheadSize | 32 | fsbf |
| } | | |
| if(ForeheadAngleFlag){ | | |
|   ForeheadAngle | | angleType |
| } | | |
| if(BrowSizeFlag){ | | |
|   BrowSize | 32 | fsbf |
| } | | |
| if(FaceSkinFlag){ | | |
|   FaceSkin | 3 | bslbf |
| } | | |
| if(CheeksFlag){ | | |
|   Cheeks | | measureUnitSMBType |
| } | | |
| if(CheeksDepthFlag){ | | |
|   CheeksDepth | 32 | fsbf |
| } | | |
| if(CheeksShapeFlag){ | | |
|   CheeksShape | 3 | bslbf |
| } | | |
| if(UpperCheeksFlag){ | | |
|   UpperCheeks | | measureUnitSMBType |
| } | | |
| if(LowerCheeksFlag){ | | |
|   LowerCheeks | | measureUnitSMBType |
| } | | |
| if(CheekBonesFlag){ | | |
|   CheekBones | | indicateOfDMUType |
| } | | |
| if(hapticIDRefFlag){ | | |
|   hapticIDRef | See ISO 10646 | UTF-8 |
| } | | |
| } | | |

Table 40-2 shows example descriptor components semantics of the head 1412 of the avatar appearance type 1410, according to the example embodiments.

TABLE 40-2

| Names | Description |
|---|---|
| HeadType | Defines the type of head. |
| HeadSizeFlag | This field, which is only present in the binary representation, signals the presence of the HeadSize element. "1" means that the element shall be used. "0" means that the element shall not be used. |
| HeadStrechFlag | This field, which is only present in the binary representation, signals the presence of the HeadStrech element. "1" means that the element shall be used. "0" means that the element shall not be used. |

TABLE 40-2-continued

| Names | Description |
|---|---|
| HeadShapeFlag | This field, which is only present in the binary representation, signals the presence of the HeadShape element. "1" means that the element shall be used. "0" means that the element shall not be used. |
| EggHeadFlag | This field, which is only present in the binary representation, signals the presence of the EggHead element. "1" means that the element shall be used. "0" means that the element shall not be used. |
| HeadLengthFlag | This field, which is only present in the binary representation, signals the presence of the HeadLength element. "1" means that the element shall be used. "0" means that the element shall not be used. |
| FaceShearFlag | This field, which is only present in the binary representation, signals the presence of the FaceShear element. "1" means that the element shall be used. "0" means that the element shall not be used. |
| ForeheadSizeFlag | This field, which is only present in the binary representation, signals the presence of the ForeheadSize element. "1" means that the element shall be used. "0" means that the element shall not be used. |
| ForeheadAngleFlag | This field, which is only present in the binary representation, signals the presence of the ForeheadAngle element. "1" means that the element shall be used. "0" means that the element shall not be used. |
| BrowSizeFlag | This field, which is only present in the binary representation, signals the presence of the BrowSize element. "1" means that the the element shall be used. "0" means that element shall not be used. |
| FaceSkinFlag | This field, which is only present in the binary representation, signals the presence of the FaceSkin element. "1" means that the element shall be used. "0" means that the element shall not be used. |
| CheeksFlag | This field, which is only present in the binary representation, signals the presence of the Cheeks element. "1" means that the element shall be used. "0" means that the element shall not be used. |
| CheeksDepthFlag | This field, which is only present in the binary representation, signals the presence of the CheeksDepth element. "1" means that the element shall be used. "0" means that the element shall not be used. |
| CheeksShapeFlag | This field, which is only present in the binary representation, signals the presence of the CheeksShape element. "1" means that the element shall be used. "0" means that the element shall not be used. |
| UpperCheeksFlag | This field, which is only present in the binary representation, signals the presence of the UpperCheeks element. "1" means that the element shall be used. "0" means that the element shall not be used. |
| LowerCheeksFlag | This field, which is only present in the binary representation, signals the presence of the LowerCheeks element. "1" means that the element shall be used. "0" means that the element shall not be used. |
| CheekBonesFlag | This field, which is only present in the binary representation, signals the presence of the CheekBones element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| HeadSize | The size of the entire head (000: small, 001: medium, 010: big, 011-111: Reserved). |
| HeadStrech | Vertical stretch of the head in % The maximum value is 100, and the minimum value is 0. |
| HeadShape | The shape can be one of "square", "round", "oval", or "long". (000: square, 001: round, 010: oval, 011: long, 100-111: Reserved) |
| EggHead | Head is larger on the top than on the bottom or vice versa. This can be "yes" or "not" (1: yes, 0: not) |
| HeadLength | The distance between the face and the back of the head, flat head or long head, measured in meters |
| FaceShear | Changes the height difference beween the two sides of the face (always in meter) |
| ForeheadSize | The height of the forehead measured in meters |
| ForeheadAngle | The angle of the forehead measured in degrees |
| BrowSize | Measures how much the eyebrows are extruded from the face (in meter) |

TABLE 40-2-continued

| Names | Description |
|---|---|
| FaceSkin | Describe the type of face skin (000: dry, 001: normal, 010: greasy, 011-111: Reserved) |
| Cheeks | The size of the complete cheeks |
| CheeksDepth | The depth of the complete cheeks (always in meter) |
| CheeksShape | Different cheeks shapes (one of the following values: 000: chubby, 001: high, 010: bone, 011-111: Reserved) |
| UpperCheeks | The volume of the upper cheeks |
| LowerCheeks | The volume of the lower cheeks |
| CheekBones | The vertical position of the cheek bones |
| hapticIDRef | Identifier that refers to the haptic properties of the body. |

Depending on embodiments, the eyes 1413 of the avatar appearance type 1410 may be expressed using the XML, for example, as shown below in Source 41. However, a program source shown in Source 41 is not limiting and is only an example embodiment.

Source 41

```
<!-- ############################################## -->
<!-- Eyes Type                                      -->
<!-- ############################################## -->
<complexType name="EyesType">
  <sequence>
    <element name="EyeSize" type="float" minOccurs="0"/>
    <element name="EyeOpening" type="vwoc:unlimitedPercentageType" minOccurs="0"/>
    <element name="EyeSpacing" type="float" minOccurs="0"/>
    <element name="OuterEyeCorner" type="vwoc:indicateOfDMUType" minOccurs="0"/>
    <element name="InnerEyeCorner" type="vwoc:indicateOfDMUType" minOccurs="0"/>
    <element name="EyeDepth" type="float" minOccurs="0"/>
    <element name="UpperEyelidFold" type="float" minOccurs="0"/>
    <element name="EyeBags" type="float" minOccurs="0"/>
    <element name="PuffyEyeLids" type="vwoc:indicateOfSMBType" minOccurs="0"/>
    <element name="EyelashLength" type="float" minOccurs="0"/>
    <element name="EyePop" type="float" minOccurs="0"/>
    <element name="EyeColor" type="mpegvct:colorType" minOccurs="0"/>
    <element name="EyeLightness" type="vwoc:percentageType" minOccurs="0"/>
  </sequence>
  <attribute name="hapticIDRef" type="IDREF" use="optional"/>
</complexType>
```

Table 41-1 shows example binary representation syntax corresponding to the eyes 1413 of the avatar appearance type 1410, according to the example embodiments.

TABLE 41-1

| EyesType{ | Number of bits | Mnemonic |
|---|---|---|
| EyeSizeFlag | 1 | bslbf |
| EyeOpeningFlag | 1 | bslbf |
| EyeSpacingFlag | 1 | bslbf |
| OuterEyeCornerFlag | 1 | bslbf |
| InnerEyeCornerFlag | 1 | bslbf |
| EyeDepthFlag | 1 | bslbf |
| UpperEyelidFoldFlag | 1 | bslbf |
| EyeBagsFlag | 1 | bslbf |
| PuffyEyeLidsFlag | 1 | bslbf |
| EyelashLengthFlag | 1 | bslbf |
| EyePopFlag | 1 | bslbf |
| EyeColorFlag | 1 | bslbf |
| EyeLightnessFlag | 1 | bslbf |
| hapticIDRefFlag | 1 | bslbf |

TABLE 41-1-continued

| EyesType{ | Number of bits | Mnemonic |
|---|---|---|
| if(EyeSizeFlag){ | | |
|   EyeSize | 32 | fsbf |
| } | | |
| if(EyeOpeningFlag){ | | |
|   EyeOpening | | unlimitedPercentageType |
| } | | |
| if(EyeSpacingFlag){ | | |
|   EyeSpacing | 32 | fsbf |
| } | | |
| if(OuterEyeCornerFlag){ | | |
|   OuterEyeCorner | | indicateOfDMUType |
| } | | |
| if(InnerEyeCornerFlag){ | | |
|   InnerEyeCorner | | indicateOfDMUType |
| } | | |
| if(EyeDepthFlag){ | | |
|   EyeDepth | 32 | fsbf |
| } | | |
| if(UpperEyelidFoldFlag){ | | |
|   UpperEyelidFold | 32 | fsbf |
| } | | |
| if(EyeBagsFlag){ | | |
|   EyeBags | 32 | fsbf |
| } | | |
| if(PuffyEyeLidsFlag){ | | |
|   PuffyEyeLids | | indicateOfSMBType |
| } | | |
| if(EyelashLengthFlag){ | | |
|   EyelashLength | 32 | fsbf |
| } | | |
| if(EyePopFlag){ | | |
|   EyePop | 32 | fsbf |
| } | | |
| if(EyeColorFlag){ | | |
|   EyeColor | | colorType |
| } | | |
| if(EyeLightnessFlag){ | | |
|   EyeLightness | | percentageType |
| } | | |
| if(hapticIDRefFlag){ | | |
|   hapticIDRef | See ISO 10646 | UTF-8 |
| } | | |
| } | | |

Table 41-2 shows example descriptor components semantics of the eyes 1413 of the avatar appearance type 1410, according to the example embodiments.

TABLE 41-2

| Names | Description |
|---|---|
| EyesType | Defines the type of eyes. |
| EyeSizeFlag | This field, which is only present in the binary representation, signals the presence of the EyeSize element. "1" means that the element shall be used. "0" means that the element shall not be used. |
| EyeOpeningFlag | This field, which is only present in the binary representation, signals the presence of the EyeOpening element. "1" means that the element shall be used. "0" means that the element shall not be used. |
| EyeSpacingFlag | This field, which is only present in the binary representation, signals the presence of the EyeSpacing element. "1" means that the element shall be used. "0" means that the element shall not be used. |
| OuterEyeCornerFlag | This field, which is only present in the binary representation, signals the presence of the OuterEyeCorner element. "1" means that the element shall be used. "0" means that the element shall not be used. |
| InnerEyeCornerFlag | This field, which is only present in the binary representation, signals the presence of the InnerEyeCorner element. "1" means that the element shall be used. "0" means that the element shall not be used. |
| EyeDepthFlag | This field, which is only present in the binary representation, signals the presence of the EyeDepth element. "1" means that the element shall be used. "0" means that the element shall not be used. |
| UpperEyelidFoldFlag | This field, which is only present in the binary representation, signals the presence of the UpperEyelidFold element. "1" means that the element shall be used. "0" means that the element shall not be used. |
| EyeBagsFlag | This field, which is only present in the binary representation, signals the presence of the EyeBags element. "1" means that the element shall be used. "0" means that the element shall not be used. |
| PuffyEyeLidsFlag | This field, which is only present in the binary representation, signals the presence of the PuffyEyeLids element. "1" means that the element shall be used. "0" means that the element shall not be used. |
| EyelashLengthFlag | This field, which is only present in the binary representation, signals the presence of the EyelashLength element. "1" means that the element shall be used. "0" means that the element shall not be used. |
| EyePopFlag | This field, which is only present in the binary representation, signals the presence of the EyePop element. "1" means that the element shall be used. "0" means that the element shall not be used. |
| EyeColorFlag | This field, which is only present in the binary representation, signals the presence of the EyeColor element. "1" means that the element shall be used. "0" means that the element shall not be used. |
| EyeLightnessFlag | This field, which is only present in the binary representation, signals the presence of the EyeLightness element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| EyeSize | The size of the entire eyes (always in meter) |
| EyeOpening | How much the eyelids are opened (%, unsigned integer) |
| EyeSpacing | Distance between the eyes (always in meter) |
| OuterEyeCorner | Vertical position of the outer eye corner (000: down, 001: middle, 010: up, 001-111: Reserved) |
| InnerEyeCorner | Vertical position of the inner eye corner (000: down, 001: middle, 010: up, 011-111: Reserved) |
| EyeDepth | How much the eyes are inside the head (always in meter) |
| UpperEyelidFold | How much the upper eyelid covers the eye (always in meter) |
| EyeBags | The size of the eye bags (always in meter) |
| PuffyEyeLids | The volume of the eye bags (000: small, 001: medium, 010: big, 011-111: Reserved) |
| EyelashLength | The length of the eyelashes (always in meter) |
| EyePop | The size difference between the left and right eye (always in meter) |
| EyeColor | The eye colour (the color type is defined in ISO/IEC 23005-6.) |
| EyeLightness | The reflectivity of the eye in (%, unsigned integer) |
| hapitIDRef | Identifier that refers to the haptic properties of the body. |

Depending on embodiments, the ears 1414 of the avatar appearance type 1410 may be expressed using the XML, for example, as shown below in Source 42. However, a program source shown in Source 42 is not limiting and is only an example embodiment.

---
Source 42
---

```
<!-- ################################################## -->
<!-- Ears Type                                           -->
<!-- ################################################## -->
<complexType name="EarsType">
  <sequence>
    <element name="EarSize" type="float" minOccurs="0"/>
    <element name="EarPosition" type=vwoc:indicateOfDMUType" minOccurs="0"/>
    <element name="EarAngle" minOccurs="0">
      <simpleType>
        <restriction base="vwoc:angleType">
          <maxInclusive value="180"/>
        </restriction>
      </simpleType>
    </element>
    <element name="Attached Earlobes" type="float" minOccurs="0"/>
    <element name="EarTips" type="vwoc:indicateOfPMNType" minOccurs="0"/>
  </sequence>
  <attribute name"hapticIDRef" type="IDREF" use="optional"/>
</complexType>
```

Table 42-1 shows example binary representation syntax corresponding to the ears 1414 of the avatar appearance type 1410, according to the example embodiments.

TABLE 42-1

| EarsType{ | Number of bits | Mnemonic |
|---|---|---|
| EarSizeFlag | 1 | bslbf |
| EarPositionFlag | 1 | bslbf |
| EarAngleFlag | 1 | bslbf |
| AttachedEarlobesFlag | 1 | bslbf |
| EarTipsFlag | 1 | bslbf |
| if(EyeSizeFlag){ | | |
|   EarSize | 32 | fsbf |
| } | | |
| if(EarPositionFlag){ | | |
|   EarPosition | | indicateOfDMUType |
| } | | |
| if(EarAngleFlag){ | | |
|   EarAngle | | angleType |
| } | | |
| if(AttachedEarlobesFlag){ | | |
|   AttachedEarlobes | 32 | fsbf |
| } | | |
| if(EarTipsFlag){ | | |
|   EarTips | | indicateOfPMNType |
| } | | |
| if(hapticIDRefFlag){ | | |
|   hapticIDRef | | See ISO UTF-8 10646 |
| } | | |
| } | | |

Table 42-2 shows example descriptor components semantics of the ears 1414 of the avatar appearance type 1410, according to the example embodiments.

TABLE 42-2

| Names | Description |
|---|---|
| EarsType | Defines the type of ears. |
| EarSizeFlag | This field, which is only present in the binary representation, signals the presence of the EarSize element. "1" means that the element shall be used. "0" means that the element shall not be used. |
| EarPositionFlag | This field, which is only present in the binary representation, signals the presence of the EarPosition element. "1" means that the element shall be used. "0" means that the element shall not be used. |
| EarAngleFlag | This field, which is only present in the binary representation, signals the presence of the EarAngle element. "1" means that the element shall be used. "0" means that the element shall not be used. |
| AttachedEarlobesFlag | This field, which is only present in the binary representation, signals the presence of the AttachedEarlobes element. "1" means that the element shall be used. "0" means that the element shall not be used. |
| EarTipsFlag | This field, which is only present in the binary representation, signals the presence of the EarTips element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| EarSize | The size of the entire ears (always in meter) |
| EarPosition | Vertical ear position on the head |
| EarAngle | The angle between the ear and the head in degrees from 0 to 180 |
| AttachedEarlobes | The size of the earlobes (always in meter) |
| EarTips | How much the ear tips are pointed |
| hapticIDRef | Identifier that refers to the haptic properties of the body. |

Depending on embodiments, the nose 1415 of the avatar appearance type 1410 may be expressed using the XML, for example, as shown below in Source 43. However, a program source shown in Source 43 is not limiting and is only an example embodiment.

---

Source 43

---

```
<!-- ################################################# -->
<!-- Nose Type                                         -->
<!-- ################################################# -->
<complexType name="NoseType">
  <sequence>
    <element name="NoseSize" type="float" minOccurs="0"/>
    <element name="NoseWidth" type="float" minOccurs="0"/>
    <element name="NostrillWidth" type="float" minOccurs="0"/>
    <element name="NostrillDivision" type="float" minOccurs="0"/>
    <element name="NoseThickness" type="float" minOccurs="0"/>
    <element name="UpperBridge" type="float" minOccurs="0"/>
    <element name="LowerBridge" type="float" minOccurs="0"/>
    <element name="BridgeWidth" type="float" minOccurs="0"/>
    <element name="NoseTipAngle" type="vwoc:indicateOfDUType"
      minOccurs="0"/>
    <element name="NoseTipShape" minOccurs="0">
      <simpleType>
        <restriction base="string">
          <enumeration value="pointy"/>
          <enumeration value="bulbous"/>
        </restriction>
      </simpleType>
    </element>
    <element name="CrookedNose" type="vwoc:indicateOfLRType"
      minOccurs="0"/>
  </sequence>
  <attribute name="hapticIDRef" type="IDREF" use="optional"/>
</complexType>
```

Table 43-1 shows example binary representation syntax corresponding to the nose 1415 of the avatar appearance type 1410, according to the example embodiments.

TABLE 43-1

| NoseType{ | Number of bits | Mnemonic |
|---|---|---|
| NoseSizeFlag | 1 | bslbf |
| NoseWidthFlag | 1 | bslbf |
| NostrillWidthFlag | 1 | bslbf |
| NostrillDivisionFlag | 1 | bslbf |
| NoseThicknessFlag | 1 | bslbf |

TABLE 43-1-continued

| NoseType{ | Number of bits | Mnemonic |
|---|---|---|
| UpperBridgeFlag | 1 | bslbf |
| LowerBridgeFlag | 1 | bslbf |
| BridgeWidthFlag | 1 | bslbf |
| NoseTipAngleFlag | 1 | bslbf |
| NoseTipShapeFlag | 1 | bslbf |
| CrookedNoseFlag | 1 | bslbf |
| hapticIDRefFlag | 1 | bslbf |
| if(NoseSizeFlag){ | | |
|    NoseSize | 32 | fsbf |
| } | | |
| if(NoseWidthFlag){ | | |
|    NoseWidth | 32 | fsbf |
| } | | |
| if(NostrillWidthFlag){ | | |
|    NostrillWidth | 32 | fsbf |
| } | | |
| if(NostrillDivisionFlag){ | | |
|    NostrillDivision | 32 | fsbf |
| } | | |
| if(NoseThicknessFlag){ | | |
|    NoseThickness | 32 | fsbf |
| } | | |
| if(UpperBridgeFlag){ | | |
|    UpperBridge | 32 | fsbf |
| } | | |
| if(LowerBridgeFlag){ | | |
|    LowerBridge | 32 | fsbf |
| } | | |
| if(BridgeWidthFlag){ | | |
|    BridgeWidth | 32 | fsbf |
| } | | |
| if(NoseTipAngleFlag){ | | |
|    NoseTipAngle | | indicateOfDUType |
| } | | |
| if(NoseTipShapeFlag){ | | |
|    NoseTipShape | 2 | bslbf |
| } | | |
| if(CrookedNoseFlag){ | | |
|    CrookedNose | | indicateOfLRType |
| } | | |
| if(hapticIDRefFlag){ | | |
|    hapticIDRef | See ISO 10646 | UTF-8 |
| } | | |
| } | | |

Table 43-2 shows example descriptor components semantics of the nose 1415 of the avatar appearance type 1410, according to the example embodiments.

TABLE 43-2

| Names | Description |
|---|---|
| NoseType | Defines the type of nose. |
| NoseSizeFlag | This field, which is only present in the binary representation, signals the presence of the NoseSize element. "1" means that the element shall be used. "0" means that the element shall not be used. |
| NoseWidthFlag | This field, which is only present in the binary representation, signals the presence of the NoseWidth element. "1" means that the element shall be used. "0" means that the element shall not be used. |
| NostrillWidthFlag | This field, which is only present in the binary representation, signals the presence of the NostrillWidth element. "1" means that the element shall be used. "0" means that the element shall not be used. |
| NostrillDivisionFlag | This field, which is only present in the binary representation, signals the presence of the NostrillDivision element. "1" means that the element shall be used. "0" means that the element shall not be used. |

TABLE 43-2-continued

| Names | Description |
|---|---|
| NoseThicknessFlag | This field, which is only present in the binary representation, signals the presence of the NoseThickness element. "1" means that the element shall be used. "0" means that the element shall not be used. |
| UpperBridgeFlag | This field, which is only present in the binary representation, signals the presence of the UpperBridge element. "1" means that the element shall be used. "0" means that the element shall not be used. |
| LowerBridgeFlag | This field, which is only present in the binary representation, signals the presence of the LowerBridge element. "1" means that the element shall be used. "0" means that the element shall not be used. |
| BridgeWidthFlag | This field, which is only present in the binary representation, signals the presence of the BridgeWidth element. "1" means that the element shall be used. "0" means that the element shall not be used. |
| NoseTipAngleFlag | This field, which is only present in the binary representation, signals the presence of the NoseTipAngle element. "1" means that the element shall be used. "0" means that the element shall not be used. |
| NoseTipShapeFlag | This field, which is only present in the binary representation, signals the presence of the NoseTipShape element. "1" means that the element shall be used. "0" means that the element shall not be used. |
| CrookedNoseFlag | This field, which is only present in the binary representation, signals the presence of the CrookedNose element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| NoseSize | The height of the nose from its bottom (always in meter) |
| NoseWidth | The width of the complete nose (always in meter) |
| NostrillWidth | Width of only the nostrils (always in meter) |
| NostrillDivision | The size of the nostril division (always in meter) |
| NoseThickness | The size of the tip of the nose (always in meter) |
| UpperBridge | The height of the upper part of the nose (always in meter) |
| LowerBridge | The height of the lower part of the nose (always in meter) |
| BridgeWidth | The width of the upper part of the nose (always in meter) |
| NoseTipAngle | The angle of the nose tip, |
| NoseTipShape | The shape of the nose tip, (00: pointy, 01: bulbous, 10-11: Reserved) |
| CrookedNose | Displacement of the nose on the left or right side |
| hapticIDRef | Identifier that refers to the haptic properties of the body |

Depending on embodiments, the mouth lip 1416 of the avatar appearance type 1410 may be expressed using the XML, for example, as shown below in Source 44. However, a program source shown in Source 44 is not limiting and is only an example embodiment.

```
                    Source 44

<!-- ############################################## -->
<!-- MouthLip Type                                  -->
<!-- ############################################## -->
<complexType name="MouthLipType">
  <sequence>
    <element name="LipWidth" type="float" minOccurs="0"/>
    <element name="LipFullness" type="float" minOccurs="0"/>
    <element name="LipThickness" type="float" minOccurs="0"/>
    <element name="LipRatio" type="float" minOccurs="0"/>
    <element name="MouthSize" type="float" minOccurs="0"/>
    <element name="Mouth Position" type="float" minOccurs="0"/>
    <element name="MouthCorner" type="vwoc:indicateOfDMUType" minOccurs="0"/>
    <element name="LipCleftDepth" type="float" minOccurs="0"/>
    <element name="LipCleft" type="float" minOccurs="0"/>
    <element name="ShiftMouth" type="vwoc:indicateOfLMRType" minOccurs="0"/>
    <element name="ChinAngle" minOccurs="0">
      <simpleType>
```

```
                    -continued
                    Source 44

<restriction base="string">
          <enumeration value="inner"/>
          <enumeration value="outer"/>
        </restriction>
      </simpleType>
    </element>
    <element name="JawShape" type="vwoc:indicateOfPMNType" minOccurs="0"/>
    <element name="ChinDepth" type="float" minOccurs="0"/>
    <element name="JawAngle" type="float" minOccurs="0"/>
    <element name="JawJut" minOccurs="0">
      <simpleType>
        <restriction base="string">
          <enumeration value="inside"/>
          <enumeration value="outside"/>
        </restriction>
      </simpleType>
    </element>
    <element name="Jowls" type="float" minOccurs="0"/>
    <element name="ChinCleft" type=vwoc:indicateOfRCType minOccurs="0"/>
    <element name="UpperChinCleft" type="vwoc:indicateOfRCType" minOccurs="0"/>
    <element name="ChinNeck" type="float" minOccurs="0"/>
  </sequence>
```

-continued

Source 44

```
<attribute name="hapticIDRef" type="IDREF" use="optional"/>
</complexType>
```

Table 44-1 shows example binary representation syntax corresponding to the mouth lip 1416 of the avatar appearance type 1410, according to the example embodiments.

TABLE 44-1

| MouthType{ | Number of bits | Mnemonic |
|---|---|---|
| LipWidthFlag | 1 | bslbf |
| LipFullnessFlag | 1 | bslbf |
| LipThicknessFlag | 1 | bslbf |
| LipRatioFlag | 1 | bslbf |
| MouthSizeFlag | 1 | bslbf |
| MouthPositionFlag | 1 | bslbf |
| MouthCornerFlag | 1 | bslbf |
| LipCleftDepthFlag | 1 | bslbf |
| LipCleftFlag | 1 | bslbf |
| ShiftMouthFlag | 1 | bslbf |
| ChinAngleFlag | 1 | bslbf |
| JawShapeFlag | 1 | bslbf |
| ChinDepthFlag | 1 | bslbf |
| JawAngleFlag | 1 | bslbf |
| JawJutFlag | 1 | bslbf |
| JowlsFlag | 1 | bslbf |
| ChinCleftFlag | 1 | bslbf |
| UpperChinCleftFlag | 1 | bslbf |
| ChinNeckFlag | 1 | bslbf |
| hapticIDRefFlag | 1 | bslbf |
| if(LipWidthFlag){ | | |
| LipWidth | 32 | fsbf |
| } | | |
| if(LipFullnessFlag){ | | |
| LipFullness | 32 | fsbf |
| } | | |
| if(LipThicknessFlag){ | | |
| LipThickness | 32 | fsbf |
| } | | |
| if(LipRatioFlag){ | | |
| LipRatio | 32 | fsbf |
| } | | |
| if(MouthSizeFlag){ | | |
| MouthSize | 32 | fsbf |
| } | | |
| if(MouthPositionFlag){ | | |
| MouthPosition | 32 | fsbf |
| } | | |

TABLE 44-1-continued

| MouthType{ | Number of bits | Mnemonic |
|---|---|---|
| } | | |
| if(MouthCornerFlag){ | | |
| MouthCorner | | indicateOfDMUType |
| } | | |
| if(LipCleftDepthFlag){ | | |
| LipCleftDepth | 32 | fsbf |
| } | | |
| if(LipCleftFlag){ | | |
| LipCleft | 32 | fsbf |
| } | | |
| if(ShiftMouthFlag){ | | |
| ShiftMouth | | indicateOfLMRType |
| } | | |
| if(ChinAngleFlag){ | | |
| ChinAngle | 2 | bslbf |
| } | | |
| if(JawShapeFlag){ | | |
| JawShape | | indicateOfPMNType |
| } | | |
| if(ChinDepthFlag){ | | |
| ChinDepth | 32 | fsbf |
| } | | |
| if(JawAngleFlag){ | | |
| JawAngle | 32 | fsbf |
| } | | |
| if(JawJutFlag){ | | |
| JawJut | 2 | bslbf |
| { | | |
| if(JowlsFlag){ | | |
| Jowls | 32 | fsbf |
| } | | |
| if(ChinCleftFlag){ | | |
| ChinCleft | | indicateOfRCType |
| } | | |
| if(UpperChinCleftFlag){ | | |
| UpperChinCleft | | indicateOfRCType |
| } | | |
| if(ChinNeckFlag){ | | |
| ChinNeck | 32 | fsbf |
| } | | |
| if(hapticIDRefFlag){ | | |
| hapticIDRef | See ISO 10646 | UTF-8 |
| } | | |
| } | | |

Table 44-2 shows example descriptor components semantics of the mouth lip 1416 of the avatar appearance type 1410, according to the example embodiments.

TABLE 44-2

| Names | Description |
|---|---|
| MouseType | Defines the type of mouth. |
| LipWidthFlag | This field, which is only present in the binary representation, signals the presence of the LipWidth element. "1" means that the element shall be used. "0" means that the element shall not be used. |
| LipFullnessFlag | This field, which is only present in the binary representation, signals the presence of the LipFullness element. "1" means that the element shall be used. "0" means that the element shall not be used. |
| LipThicknessFlag | This field, which is only present in the binary representation, signals the presence of the LipThickness element. "1" means that the element shall be used. "0" means that the element shall not be used. |
| LipRatioFlag | This field, which is only present in the binary representation, signals the presence of the LipRatio element. "1" means that the element shall be used. "0" means that the element shall not be used. |

TABLE 44-2-continued

| Names | Description |
|---|---|
| MouthSizeFlag | This field, which is only present in the binary representation, signals the presence of the MouthSize element. "1" means that the element shall be used. "0" means that the element shall not be used. |
| MouthPositionFlag | This field, which is only present in the binary representation, signals the presence of the MouthPosition element. "1" means that the element shall be used. "0" means that the element shall not be used. |
| MouthCornerFlag | This field, which is only present in the binary representation, signals the presence of the MouthCorner element. "1" means that the element shall be used. "0" means that the element shall not be used. |
| LipCleftDepthFlag | This field, which is only present in the binary representation, signals the presence of the LipCleftDepth element. "1" means that the element shall be used. "0" means that the element shall not be used. |
| LipCleftFlag | This field, which is only present in the binary representation, signals the presence of the LipCleft element. "1" means that the element shall be used. "0" means that the element shall not be used. |
| ShiftMouthFlag | This field, which is only present in the binary representation, signals the presence of the ShiftMouth element. "1" means that the element shall be used. "0" means that the element shall not be used. |
| ChinAngleFlag | This field, which is only present in the binary representation, signals the presence of the ChinAngle element. "1" means that the element shall be used. "0" means that the element shall not be used. |
| JawShapeFlag | This field, which is only present in the binary representation, signals the presence of the JawShape element. "1" means that the element shall be used. "0" means that the element shall not be used. |
| ChinDepthFlag | This field, which is only present in the binary representation, signals the presence of the ChinDepth element. "1" means that the element shall be used. "0" means that the element shall not be used. |
| JawAngleFlag | This field, which is only present in the binary representation, signals the presence of the JawAngle element. "1" means that the element shall be used. "0" means that the element shall not be used. |
| JawJutFlag | This field, which is only present in the binary representation, signals the presence of the JawJut element. "1" means that the element shall be used. "0" means that the element shall not be used. |
| JowlsFlag | This field, which is only present in the binary representation, signals the presence of the Jowls element. "1" means that the element shall be used. "0" means that the element shall not be used. |
| ChinCleftFlag | This field, which is only present in the binary representation, signals the presence of the ChinCleft element. "1" means that the element shall be used. "0" means that the element shall not be used. |
| UpperChinCleftFlag | This field, which is only present in the binary representation, signals the presence of the UpperChinCleft element. "1" means that the element shall be used. "0" means that the element shall not be used. |
| ChinNeckFlag | This field, which is only present in the binary representation, signals the presence of the ChinNeck element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| LipWidth | The width of the lips (m) |
| LipFullness | The fullness of the lip (m) |
| LipThickness | The thickness of the lip (m) |
| LipRatio | Difference between the upper and lowerlip (m) |
| MouthSize | The size of the complete mouth (m) |
| MouthPosition | Vertical position of the mouth on the face (m) |
| MouthCorner | Vertical position of the mouth corner |
| LipCleftDepth | The height of the lip cleft (m) |
| LipCleft | The width of the lip cleft (m) |
| ShiftMouth | Horizontal position of mouth on the face |
| ChinAngle | The curvature of the chin. (00: outer, 01: inner, 10-11: Reserved) |
| JawShape | Pointy to Square jaw |
| ChinDepth | Vertical height of the chin (m) |

TABLE 44-2-continued

| Names | Description |
|---|---|
| JawAngle | The height of the jaw (m) |
| JawJut | Position of the jaw inside or out of the face (00: inside, 01: outside, 10-11: Reserved) |
| Jowls | The size of the jowls (m) |
| ChinCleft | The shape of the chin cleft. |
| UpperChinCleft | The shape of the upper chin cleft. |
| ChinNeck | The size of the chin neck (m) |
| hapticIDRef | Identifier that refers to the haptic properties of the body. |

Depending on embodiments, the skin 1417 of the avatar appearance type 1410 may be expressed using the XML, for example, as shown below in Source 45. However, a program source shown in Source 45 is not limiting and is only an example embodiment.

Source 45

```
<!-- ################################################## -->
<!-- Skin Type                                           -->
<!-- ################################################## -->
<complexType name="SkinType">
  <sequence>
    <element name="SkinPigment" type="mpegvct:colorType"
      minOccurs="0"/>
    <element name="SkinRuddiness" type="vwoc:percentageType"
      minOccurs="0"/>
    <element name="SkinRainbowColor" type="mpegvct:colorType"
      minOccurs="0"/>
  </sequence>
  <attribute name="hapticIDRef" type="IDREF" use="optional"/>
</complexType>
```

Table 45-1 shows example binary representation syntax corresponding to the skin 1417 of the avatar appearance type 1410, according to the example embodiments.

TABLE 45-1

| SkinType{ | Number of bits | Mnemonic |
|---|---|---|
| SkinPigmentFlag | 1 | bslbf |
| SkinRuddinessFlag | 1 | bslbf |
| SkinRainbowColorFlag | 1 | bslbf |
| hapticIDRefFlag | 1 | bslbf |
| if(SkinPigmentFlag){ | | |
|   SkinPigment | | colorType |
| } | | |
| if(SkinRuddinessFlag){ | | |
|   SkinRuddiness | | percentageType |
| } | | |
| if(SkinRainbowColorFlag){ | | |
|   SkinRainbowColor | | colorType |
| } | | |
| if(hapticIDRefFlag){ | | |
|   hapticIDRef | See ISO 10646 | UTF-8 |
| } | | |
| } | | |

Table 45-2 shows example descriptor components semantics of the skin 1417 of the avatar appearance type 1410, according to the example embodiments.

TABLE 45-2

| Names | Description |
|---|---|
| SkinType | Defines the type of skin. |
| SkinPigmentFlag | This field, which is only present in the binary representation, signals the presence of the SkinPigment element. "1" means that the element shall be used. "0" means that the element shall not be used. |
| SkinRuddinessFlag | This field, which is only present in the binary representation, signals the presence of the SkinRuddiness element. "1" means that the element shall be used. "0" means that the element shall not be used. |
| SkinRainbowColorFlag | This field, which is only present in the binary representation, signals the presence of the SkinRainbowColor element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| SkinPigment | Skin Pigment |
| SkinRuddiness | Skin Ruddiness |
| SkinRainbowColor | Skin Rainbow color |
| hapticIDRef | Identifier that refers to the haptic properties of the body. |

Depending on embodiments, the facial 1418 of the avatar appearance type 1410 may be expressed using the XML, for example, as shown below in Source 46. However, a program source shown in Source 46 is not limiting and is only an example embodiment.

---
Source 46
---

```xml
<!-- ################################################## -->
<!-- Facial Type                                        -->
<!-- ################################################## -->
<complexType name="FacialType">
  <sequence>
    <element name="FacialDefinition" type="vwoc:levelOf5Type" minOccurs="0"/>
    <element name="Freckles" type="vwoc:levelOf5Type" minOccurs="0"/>
    <element name="Wrinkles" type="boolean" minOccurs="0"/>
    <element name="RosyComplexion" type="boolean" minOccurs="0"/>
    <element name="LipPinkness" type="vwoc:levelOf5Type" minOccurs="0"/>
    <element name="Lipstick" type="boolean" minOccurs="0"/>
    <element name="LipstickColor" type="mpegvct:colorType" minOccurs="0"/>
    <element name="LipGloss" type="vwoc:levelOf5Type" minOccurs="0"/>
    <element name="Blush" type="boolean" minOccurs="0"/>
    <element name="BlushColor" type="mpegvct:colorType" minOccurs="0"/>
    <element name="BlushOpacity" type="vwoc:percentageType" minOccurs="0"/>
    <element name="InnerShadow" type="boolean" minOccurs="0"/>
    <element name="InnerShadowColor" type="mpegvct:colorType" minOccurs="0"/>
    <element name="InnerShadowOpacity" type="vwoc:percentageType" minOccurs="0"/>
    <element name="OuterShadow" type="boolean" minOccurs="0"/>
    <element name="OuterShadowOpacity" type="vwoc:percentageType" minOccurs="0"/>
    <element name="EyeLiner" type="boolean" minOccurs="0"/>
    <element name="EyeLinerColor" type="mpegvct:colorType" minOccurs="0"/>
  </sequence>
  <attribute name="hapticIDRef" type="IDREF" use="optional"/>
</complexType>
```

Table 46-1 shows example binary representation syntax corresponding to the facial 1418 of the avatar appearance type 1410, according to the example embodiments.

TABLE 46-1

| FacialType{ | Number of bits | Mnemonic |
|---|---|---|
| FacialDefinitionFlag | 1 | bslbf |
| FrecklesFlag | 1 | bslbf |
| WrinklesFlag | 1 | bslbf |
| RosyComplexionFlag | 1 | bslbf |
| LipPinknessFlag | 1 | bslbf |
| LipstickFlag | 1 | bslbf |
| LipstickColorFlag | 1 | bslbf |
| LipGlossFlag | 1 | bslbf |
| BlushFlag | 1 | bslbf |
| BlushColorFlag | 1 | bslbf |
| BlushOpacityFlag | 1 | bslbf |
| InnerShadowFlag | 1 | bslbf |
| InnerShadowColorFlag | 1 | bslbf |
| InnerShadowOppacityFlag | 1 | bslbf |
| OuterShadowFlag | 1 | bslbf |
| OuterShadowOppacityFlag | 1 | bslbf |
| EyeLinerFlag | 1 | bslbf |
| EyeLinerColorFlag | 1 | bslbf |
| if(FacialDefinitionFlag){ | | |
|   FacialDefinition | | levelOf5Type |
| } | | |
| if(FrecklesFlag){ | | |
|   Freckles | | levelOf5Type |
| } | | |
| if(WrinklesFlag){ | | |
|   Wrinkles | 1 | bslbf |
| } | | |
| if(RosyComplexionFlag){ | | |
|   RosyComplexion | 1 | bslbf |
| } | | |

TABLE 46-1-continued

| FacialType{ | Number of bits | Mnemonic |
|---|---|---|
| if(LipPinknessFlag){ | | |
|   LipPinkness | 1 | levelOf5Type |
| } | | |
| if(LipstickFlag){ | | |
|   Lipstick | 1 | bslbf |
| } | | |
| if(LipstickColorFlag){ | | |
|   LipstickColor | | colorType |
| } | | |
| if(LipGlossFlag){ | | |
|   LipGloss | | levelOf5Type |
| } | | |
| if(BlushFlag){ | | |
|   Blush | 1 | bslbf |
| } | | |
| if(BlushColorFlag){ | | |
|   BlushColor | | colorType |
| } | | |
| if(BlushOpacityFlag){ | | |
|   BlushOpacity | | percentageType |
| } | | |
| if(InnerShadowFlag){ | | |
|   InnerShadow | 1 | bslbf |
| } | | |
| if(InnerShadowColorFlag){ | | |
|   InnerShadowColor | | colorType |
| } | | |
| if(InnerShadowOppacityFlag){ | | |
|   InnerShadowOppacity | | percentageType |
| } | | |
| if(OuterShadowFlag){ | | |
|   OuterShadow | 1 | bslbf |
| } | | |

TABLE 46-1-continued

| FacialType{ | Number of bits | Mnemonic |
|---|---|---|
| if(OuterShadowOppacityFlag){ | | |
|   OuterShadowOppacity | | percentageType |
| } | | |
| if(EyeLinerFlag){ | | |
|   EyeLiner | 1 | bslbf |
| } | | |
| if(EyeLinerColorFlag){ | | |
|   EyeLinerColor | | colorType |
| } | | |

Table 46-2 shows example descriptor components semantics of the facial 1418 of the avatar appearance type 1410, according to the example embodiments.

TABLE 46-2

| Names | Description |
|---|---|
| FacialType | Defines the type of face. |
| FacialDefinitionFlag | This field, which is only present in the binary representation, signals the presence of the FacialDefinition element. "1" means that the element shall be used. "0" means that the element shall not be used. |
| FrecklesFlag | This field, which is only present in the binary representation, signals the presence of the Freckles element. "1" means that the element shall be used. "0" means that the element shall not be used. |
| WrinklesFlag | This field, which is only present in the binary representation, signals the presence of the Wrinkles element. "1" means that the element shall be used. "0" means that the element shall not be used. |
| RosyComplexionFlag | This field, which is only present in the binary representation, signals the presence of the RosyComplexion element. "1" means that the element shall be used. "0" means that the element shall not be used. |
| LipPinknessFlag | This field, which is only present in the binary representation, signals the presence of the LipPinkness element. "1" means that the element shall be used. "0" means that the element shall not be used. |
| LipstickFlag | This field, which is only present in the binary representation, signals the presence of the Lipstick element. "1" means that the element shall be used. "0" means that the element shall not be used. |
| LipstickColorFlag | This field, which is only present in the binary representation, signals the presence of the LipstickColor element. "1" means that the element shall be used. "0" means that the element shall not be used. |
| LipGlossFlag | This field, which is only present in the binary representation, signals the presence of the LipGloss element. "1" means that the element shall be used. "0" means that the element shall not be used. |
| BlushFlag | This field, which is only present in the binary representation, signals the presence of the Blush element. "1" means that the element shall be used. "0" means that the element shall not be used. |
| BlushColorFlag | This field, which is only present in the binary representation, signals the presence of the BlushColor element. "1" means that the element shall be used. "0" means that the element shall not be used. |
| BlushOpacityFlag | This field, which is only present in the binary representation, signals the presence of the BlushOpacity element. "1" means that the element shall be used. "0" means that the element shall not be used. |
| InnerShadowFlag | This field, which is only present in the binary representation, signals the presence of the InnerShadow element. "1" means that the element shall be used. "0" means that the element shall not be used. |
| InnerShadowColorFlag | This field, which is only present in the binary representation, signals the presence of the InnerShadowColor element. "1" means that the element shall be used. "0" means that the element shall not be used. |
| InnerShadowOppacityFlag | This field, which is only present in the binary representation, signals the presence of the InnerShadowOppacity element. "1" means that the element shall be used. "0" means that the element shall not be used. |
| OuterShadowFlag | This field, which is only present in the binary representation, signals the presence of the OuterShadow element. "1" means that the element shall be used. "0" means that the element shall not be used. |
| OuterShadowOppacityFlag | This field, which is only present in the binary representation, signals the presence of the OuterShadowOppacity element. "1" |

TABLE 46-2-continued

| Names | Description |
|---|---|
| | means that the element shall be used. "0" means that the element shall not be used. |
| EyeLinerFlag | This field, which is only present in the binary representation, signals the presence of the EyeLiner element. "1" means that the element shall be used. "0" means that the element shall not be used. |
| EyeLinerColorFlag | This field, which is only present in the binary representation, signals the presence of the EyeLinerColor element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| FacialDefinition | Level of brightness of the face from 1-lighted to 5 dark |
| Freckles | Freckles (5 levels, 1 = smallest, 5 = biggest) |
| Wrinkles | Wrinkles (1: yes, or 0: no) |
| RosyComplexion | Rosy Complexion (1: yes, or 0: no) |
| LipPinkness | Lip Pinkness (5 levels, 1 = smallest, 5 = biggest) |
| Lipstick | Lipstick (1: yes, or 0: no) |
| LipstickColor | Lipstick Color |
| LipGloss | Lipgloss (5 levels, 1 = smallest, 5 = biggest) |
| Blush | Blush (1: yes, or 0: no) |
| BlushColor | Blush Color |
| BlushOpacity | Blush Opacity (%) |
| InnerShadow | Inner Shadow (1: yes, or 0: no) |
| InnerShadowColor | Inner Shadow Color |
| InnerShadowOppacity | Inner Shadow Opacity (%) |
| OuterShadow | Outer Shadow (1: yes, or 0: no) |
| OuterShadowOppacity | Outer Shadow Opacity (%) |
| EyeLiner | Eyeliner (1: yes, or 0: no) |
| EyeLinerColor | Eyeliner Color |
| hapticIDRef | Identifier that refers to the haptic properties of the body. |

Depending on embodiments, the nail 1419 of the avatar appearance type 1410 may be expressed using the XML, for example, as shown below in Source 47. However, a program source shown in Source 47 is not limiting and is only an example embodiment.

| Source 47 |
|---|
| <!-- ################################################## --> |
| <!-- Nail Type                                          --> |
| <!-- ################################################## --> |
| <complexType name="NailType"> |
|   <sequence> |
|     <element name="NailPolish" type="boolean" minOccurs="0"/> |
|     <element name="NailPolishColor" type="mpegvct:colorType" minOccurs="0"/> |
|   </sequence> |
|   <attribute name="hapticIDRef" type="IDREF" use="optional"/> |
| </complexType> |

Table 47-1 shows example binary representation syntax corresponding to the nail 1419 of the avatar appearance type 1410, according to the example embodiments.

TABLE 47-1

| NailType{ | Number of bits | Mnemonic |
|---|---|---|
| NailPolishFlag | 1 | bslbf |
| NailPolishColorFlag | 1 | bslbf |
| hapticIDRefFlag | 1 | bslbf |
| if(NailPolishFlag){ | | |
|   NailPolish | 1 | bslbf |
| } | | |
| if(NailPolishColorFlag){ | | |
|   NailPolishColor | | RGB |
| } | | |
| if(hapticIDRefFlag){ | | |
|   hapticIDRef | See ISO 10646 | UTF-8 |
| } | | |
| } | | |

Table 47-2 shows example descriptor components semantics of the nail 1419 of the avatar appearance type 1410, according to the example embodiments.

TABLE 47-2

| Names | Description |
|---|---|
| NailType | Defines the type of nail. |
| NailPolishFlag | This field, which is only present in the binary representation, signals the presence of the NailPolish element. "1" means that the element shall be used. "0" means that the element shall not be used. |
| NailPolishColorFlag | This field, which is only present in the binary representation, signals the presence of the NailPolishColor element. "1" means that the element shall be used. "0" means that the element shall not be used. |

TABLE 47-2-continued

| Names | Description |
|---|---|
| hapticIDRefFlag | This field, which is only present in the binary representation, signals the presence of the hapticIDRef attribute. "1" means that the attribute shall be used. "0" means that the attribute shall not be used. |
| NailPolish | Nail Polish (1: yes or 0: no) |
| NailPolishColor | Nail Polish Color |
| hapticIDRef | Identifier that refers to the haptic properties of the body. |

Depending on embodiments, the body look 1420 of the avatar appearance type 1410 may be expressed using the XML, for example, as shown below in Source 48. However, a program source shown in Source 48 is not limiting and is only an example embodiment.

Source 48

```
<!-- ################################################## -->
<!-- Body Look Type                                      -->
<!-- ################################################## -->
<complexType name="BodyLookType">
    <sequence>
        <element name="BodyDefinition"
type="vwoc:indicateOfSMLType" minOccurs="0"/>
        <element name="BodyFreckles" type="vwoc:levelOf5Type"
            minOccurs="0"/>
    </sequence>
</complexType>
```

Table 48-1 shows example binary representation syntax corresponding to the body look 1420 of the avatar appearance type 1410, according to the example embodiments.

TABLE 48-1

| BodyLookType{ | Number of bits | Mnemonic |
|---|---|---|
| BodyDefinitionFlag | 1 | bslbf |
| BodyFrecklesFlag | 1 | bslbf |
| if(BodyDefinitionFlag){ | | |
|   BodyDefinition | 3 | bslbf |
| } | | |
| if(BodyFrecklesFlag){ | | |
|   BodyFreckles | 3 | bslbf |
| } | | |
| } | | |

Table 48-2 shows example descriptor components semantics of the body look 1420 of the avatar appearance type 1410 according to the example embodiments.

TABLE 48-2

| Names | Description |
|---|---|
| BodyLookType | Defines the type of body look. |
| BodyDefinitionFlag | This field, which is only present in the binary representation, signals the presence of the BodyDefinition element. "1" means that the element shall be used. "0" means that the element shall not be used. |
| BodyFrecklesFlag | This field, which is only present in the binary representation, signals the presence of the BodyFreckles element "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| BodyDefinition | Body Definition (short, medium, or long) |
| BodyFreckles | Body Freckles (5 levels, 1 = smallest, 5 = biggest) |
| hapticIDRef | Identifier that refers to the haptic properties of the body. |

Depending on embodiments, the hair 1421 of the avatar appearance type 1410 may be expressed using the XML, for example, as shown below in Source 49. However, a program source shown in Source 49 is not limiting and is only an example embodiment.

Source 49

```
<!-- ################################################## -->
<!-- Hair Type                                           -->
<!-- ################################################## -->
<complexType name="HairType">
    <sequence>
        <element name="HairSize" type="vwoc:indicateOfSMLType" minOccurs="0"/>
        <element name="HairStyle" type="mpeg7:termReferenceType" minOccurs="0"/>
        <element name="HairColor" type="mpegvct:colorType" minOccurs="0"/>
        <element name="WhiteHair" type="vwoc:percentageType" minOccurs="0"/>
```

-continued

Source 49

```
        <element name="RainbowColor" type="mpegvct:colorType" minOccurs="0"/>
        <element name="BlondeHair" type="vwoc:percentageType" minOccurs="0"/>
        <element name="RedHair" type="vwoc:percentageType" minOccurs="0"/>
        <element name="HairVolume" type="vwoc:indicateOfSMBType"
minOccurs="0"/>
        <element name="HairFront" type="vwoc:indicateOfSMLType" minOccurs="0"/>
        <element name="HairSides" type="vwoc:indicateOfSMLType" minOccurs="0"/>
        <element name="HairBack" type="vwoc:indicateOfSMLType" minOccurs="0"/>
        <element name="BigHairFront" type="vwoc:indicateOfSMLType"
minOccurs="0"/>
        <element name="BigHairTop" type="vwoc:indicateOfSMLType" minOccurs="0"/>
        <element name="BigHairBack" type="vwoc:indicateOfSMLType"
minOccurs="0"/>
        <element name="FrontFrindge" type="vwoc:indicateOfSMLType"
minOccurs="0"/>
        <element name="SideFrindge" type="vwoc:indicateOfSMLType"
minOccurs="0"/>
        <element name="BackFrindge" type="vwoc:indicateOfSMLType"
minOccurs="0"/>
        <element name="FullHairSides" type="vwoc:indicateOfSMLType"
minOccurs="0"/>
        <element name="HairSweep" type="vwoc:indicateOfSMLType" minOccurs="0"/>
        <element name="ShearFront" type="vwoc:indicateOfLMRType" minOccurs="0"/>
        <element name="ShearBack" type="vwoc:indicateOfSMLType" minOccurs="0"/>
        <element name="TuperFront" type="vwoc:indicateOfSMLType" minOccurs="0"/>
        <element name="TuperBack" type="vwoc:indicateOfSMLType" minOccurs="0"/>
        <element name="RumpledHair" minOccurs="0">
            <simpleType>
                <restriction base="string">
                    <enumeration value="low"/>
                    <enumeration value="moderate"/>
                    <enumeration value="high"/>
                </restriction>
            </simpleType>
        </element>
        <element name="PigTails" type="vwoc:indicateOfSMLType" minOccurs="0"/>
        <element name="PonyTail" type="vwoc:indicateOfSMLType" minOccurs="0"/>
        <element name="SprikedHair" type="vwoc:indicateOfSMLType" minOccurs="0"/>
        <element name="HairTilt" type="float" minOccurs="0"/>
        <element name="HairMiddlePart" type="vwoc:indicateOfLHType"
minOccurs="0"/>
        <element name="HairRightPart" type="vwoc:indicateOfLHType" minOccurs="0"/>
        <element name="HairLeftPart" type="vwoc:indicateOfLHType" minOccurs="0"/>
        <element name="HairPartsBangs" type="vwoc:indicateOfLHType"
minOccurs="0"/>
    </sequence>
    <attribute name="hapticIDRef" type="IDREF" use="optional"/>
</complexType>
```

Table 49-1 shows example binary representation syntax corresponding to the hair 1421 of the avatar appearance type 1410, according to the example embodiments.

TABLE 49-1

| HairType{ | Number of bits | Mnemonic |
|---|---|---|
| HairSizeFlag | 1 | bslbf |
| HairStyleFlag | 1 | bslbf |
| HairColorFlag | 1 | bslbf |
| WhiteHairFlag | 1 | bslbf |
| RainbowColorFlag | 1 | bslbf |
| BlondeHairFlag | 1 | bslbf |
| RedHairFlag | 1 | bslbf |
| HairVolumeFlag | 1 | bslbf |
| HairFrontFlag | 1 | bslbf |
| HairSidesFlag | 1 | bslbf |
| HairBackFlag | 1 | bslbf |
| BigHairFrontFlag | 1 | bslbf |
| BigHairTopFlag | 1 | bslbf |
| BigHairBackFlag | 1 | bslbf |
| FrontFringeFlag | 1 | bslbf |
| SideFringeFlag | 1 | bslbf |
| BackFringeFlag | 1 | bslbf |
| FullHairSidesFlag | 1 | bslbf |
| HairSweepFlag | 1 | bslbf |
| ShearFrontFlag | 1 | bslbf |
| ShearBackFlag | 1 | bslbf |
| TuperFrontFlag | 1 | bslbf |
| TuperBackFlag | 1 | bslbf |
| RumpledhairFlag | 1 | bslbf |
| PigtailsFlag | 1 | bslbf |
| PonytailFlag | 1 | bslbf |
| SpikedHairFlag | 1 | bslbf |
| HairTiltFlag | 1 | bslbf |
| HairMiddlePartFlag | 1 | bslbf |
| HairRightPartFlag | 1 | bslbf |
| HairLeftPartFlag | 1 | bslbf |
| HairPartBangsFlag | 1 | bslbf |
| hapticIDRefFlag | 1 | bslbf |
| if(HairSizeFlag){ | | |
| HairSize | | indicateOfSMLType |
| } | | |
| if(HairStyleFlag){ | | |

TABLE 49-1-continued

| HairType{ | Number of bits | Mnemonic |
|---|---|---|
| HairStyle | 4 | bslbf |
| } | | |
| if(HairColorFlag){ | | |
| HairColor | | colorType |
| } | | |
| if(WhiteHairFlag){ | | |
| WhiteHair | | percentageType |
| } | | |
| if(RainbowColorFlag){ | | |
| RainbowColor | | colorType |
| } | | |
| if(BlondeHairFlag){ | | |
| BlondeHair | | percentageType |
| } | | |
| if(RedHairFlag){ | | |
| RedHair | | percentageType |
| } | | |
| if(HairVolumeFlag){ | | |
| HairVolume | | indicateOfSMBType |
| } | | |
| if(HairFrontFlag){ | | |
| HairFront | | indicateOfSMLType |
| } | | |
| if(HairSidesFlag){ | | |
| HairSides | | indicateOfSMLType |
| } | | |
| if(HairBackFlag){ | | |
| HairBack | | indicateOFSMLType |
| } | | |
| if(BigHairFrontFlag){ | | |
| BigHairFron | | indicateOfSMLType |
| } | | |
| if(BigHairTopFlag){ | | |
| BigHairTop | | indicateOfSMLType |
| } | | |
| if(BigHairBackFlag){ | | |
| BigHairBack | | indicateOfSMLType |
| } | | |
| if(FrontFringeFlag){ | | |
| FrontFringe | | indicateOfSMLType |
| } | | |
| if(SideFringeFlag){ | | |
| SideFringe | | indicateOfSMLType |
| } | | |
| if(BackFringeFlag){ | | |
| BackFringe | | indicateOfSMLType |
| } | | |
| if(FullHairSidesFlag){ | | |
| FullHairSides | | indicateOfSMLType |
| } | | |
| if(HairSweepFlag){ | | |
| HairSweep | | indicateOfSMLType |
| } | | |
| if(ShearFrontFlag){ | | |
| ShearFront | | indicateOfLMRType |
| } | | |
| if(ShearBackFlag){ | | |
| ShearBack | | indicateOfSMLType |
| } | | |
| if(TuperFrontFlag){ | | |
| TuperFront | | indicateOfSMLType |
| } | | |
| if(TuperBackFlag){ | | |
| TuperBack | | indicateOfSMLType |
| } | | |
| if(RumpledhairFlag){ | | |
| Rumpledhair | 3 | bslbf |
| } | | |
| if(PigtailsFlag){ | | |
| Pigtails | | indicateOfSMLType |
| } | | |
| if(PonytailFlag){ | | |
| Ponytail | | indicateOfSMLType |
| } | | |
| if(SpikedHairFlag){ | | |
| SpikedHair | | indicateOfSMLType |
| } | | |
| if(HairTiltFlag){ | | |
| HairTilt | 32 | fsbf |
| } | | |
| if(HairMiddlePartFlag){ | | |
| HairMiddlePart | | indicateOfLHType |
| } | | |
| if(HairRightPartFlag){ | | |
| HairRightPart | | indicateOfLHType |
| } | | |
| if(HairLeftPartFlag){ | | |
| HairLeftPart | | indicateOfLHType |
| } | | |
| if(HairPartBangsFlag){ | | |
| HairPartBangs | | indicateOfLHType |
| } | | |
| if(hapticIDRefFlag){ | | |
| hapticIDRef | See ISO 10646 | UTF-8 |
| } | | |
| } | | |

Table 49-2 shows example descriptor components semantics of the hair 1421 of the avatar appearance type 1410, according to the example embodiments.

TABLE 49-2

| Names | Description |
|---|---|
| HairType | Defines the type of hair. |
| HairSizeFlag | This field, which is only present in the binary representation, signals the presence of the HairSize element. "1" means that the element shall be used. "0" means that the element shall not be used. |
| HairStyleFlag | This field, which is only present in the binary representation, signals the presence of the HairStyleFlag element. "1" means that the element shall be used. "0" means that the element shall not be used. |
| HairColorFlag | This field, which is only present in the binary representation, signals the presence of the HairColorFlag element. "1" means that the element shall be used. "0" means that the element shall not be used. |
| WhiteHairFlag | This field, which is only present in the binary representation, signals the presence of the WhiteHairFlag element. "1" means that the element shall be used. "0" means that the element shall not be used. |

TABLE 49-2-continued

| Names | Description |
|---|---|
| RainbowColorFlag | This field, which is only present in the binary representation, signals the presence of the RainbowColorFlag element. "1" means that the element shall be used. "0" means that the element shall not be used. |
| BlondeHairFlag | This field, which is only present in the binary representation, signals the presence of the BlondeHairFlag element. "1" means that the element shall be used. "0" means that the element shall not be used. |
| RedHairFlag | This field, which is only present in the binary representation, signals the presence of the RedHairFlag element. "1" means that the element shall be used. "0" means that the element shall not be used. |
| HairVolumeFlag | This field, which is only present in the binary representation, signals the presence of the HairVolumeFlag element. "1" means that the element shall be used. "0" means that the element shall not be used. |
| HairFrontFlag | This field, which is only present in the binary representation, signals the presence of the HairFrontFlag element. "1" means that the element shall be used. "0" means that the element shall not be used. |
| HairSidesFlag | This field, which is only present in the binary representation, signals the presence of the HairSidesFlag element. "1" means that the element shall be used. "0" means that the element shall not be used. |
| HairBackFlag | This field, which is only present in the binary representation, signals the presence of the HairBackFlag element. "1" means that the element shall be used. "0" means that the element shall not be used. |
| BigHairFrontFlag | This field, which is only present in the binary representation, signals the presence of the BigHairFrontFlag element. "1" means that the element shall be used. "0" means that the element shall not be used. |
| BigHairTopFlag | This field, which is only present in the binary representation, signals the presence of the BigHairTopFlag element. "1" means that the element shall be used. "0" means that the element shall not be used. |
| BigHairBackFlag | This field, which is only present in the binary representation, signals the presence of the BigHairBackFlag element. "1" means that the element shall be used. "0" means that the element shall not be used. |
| FrontFringeFlag | This field, which is only present in the binary representation, signals the presence of the FrontFringeFlag element. "1" means that the element shall be used. "0" means that the element shall not be used. |
| SideFringeFlag | This field, which is only present in the binary representation, signals the presence of the SideFringeFlag element. "1" means that the element shall be used. "0" means that the element shall not be used. |
| BackFringeFlag | This field, which is only present in the binary representation, signals the presence of the BackFringeFlag element. "1" means that the element shall be used. "0" means that the element shall not be used. |
| FullHairSidesFlag | This field, which is only present in the binary representation, signals, the presence of the FullHairSidesFlag element. "1" means that the element shall be used. "0" means that the element shall not be used. |
| HairSweepFlag | This field, which is only present in the binary representation, signals the presence of the HairSweepFlag element. "1" means that the element shall be used. "0" means that the element shall not be used. |
| ShearFrontFlag | This field, which is only present in the binary representation, signals the presence of the ShearFrontFlag element. "1" means that the element shall be used. "0" means that the element shall not be used. |
| ShearBackFlag | This field, which is only present in the binary representation, signals the presence of the ShearBackFlag element. "1" means that the element shall be used. "0" means that the element shall not be used. |
| TuperFrontFlag | This field, which is only present in the binary representation, signals the presence of the TuperFrontFlag element. "1" means that the element shall be used. "0" means that the element shall not be used. |
| TuperBackFlag | This field, which is only present in the binary representation, signals the presence of the TuperBackFlag element. "1" means that the element shall be used. "0" means that the element shall not be used. |

TABLE 49-2-continued

| Names | Description |
|---|---|
| RumpledhairFlag | This field, which is only present in the binary representation, signals the presence of the RumpledhairFlag element. "1" means that the element shall be used. "0" means that the element shall not be used. |
| PigtailsFlag | This field, which is only present in the binary representation, signals the presence of the PigtailsFlag element. "1" means that the element shall be used. "0" means that the element shall not be used. |
| PonytailFlag | This field, which is only present in the binary representation, signals the presence of the PonytailFlag element. "1" means that the element shall be used. "0" means that the element shall not be used. |
| SpikedHairFlag | This field, which is only present in the binary representation, signals the presence of the SpikedHairFlag element. "1" means that the element shall be used. "0" means that the element shall not be used. |
| HairTiltFlag | This field, which is only present in the binary representation, signals the presence of the HairTiltFlag element. "1" means that the element shall be used. "0" means that the element shall not be used. |
| HairMiddlePartFlag | This field, which is only present in the binary representation, signals the presence of the HairMiddlePartFlag element. "1" means that the element shall be used. "0" means that the element shall not be used. |
| HairRightPartFlag | This field, which is only present in the binary representation, signals the presence of the HairRightPartFlag element. "1" means that the element shall be used. "0" means that the element shall not be used. |
| HairLeftPartFlag | This field, which is only present in the binary representation, signals the presence of the HairLeftPartFlag element. "1" means that the element shall be used. "0" means that the element shall not be used. |
| HairPartBangsFlag | This field, which is only present in the binary representation, signals the presence of the HairPartBangsFlag element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| HairSize | The length of the hair (can be one of short, medium or long) |
| HairStyle | The style of the hair (0000: afro, 0001: bun, 0010: combover, 0011: crewcut, 0100: Mohawk, 0101: odando, 0110: pigtails, 0111: pompadour, or 1000: ponytail, 1001-1111: Reserved) |
| HairColor | The hair color |
| WhiteHair | Amount of white hair (%) |
| RainbowColor | The color of the hair |
| BlondeHair. | How much blond is the hair (%) |
| RedHair | How much red is the hair (%) |
| HairVolume | The volume of the complete hair |
| HairFront | How much the hair goes toward front |
| HairSides | The height of the sides of the hair |
| HairBack | How long is the hair at the back |
| BigHairFront | How high is the hair at the front of the skull |
| BigHairTop | How high is the hair at the top of the skull |
| BigHairBack | How high is the hair at the back of the skull |
| FrontFringe | The length of the front fringe of the hair |
| SideFringe | The length of the side fringe of the hair |
| BackFringe | The length of the back fringe of the hair |
| FullHairSides | The width of the hair |
| HairSweep | How much the hair is turned towards the front |
| ShearFront | How much the hair extends towards front |
| ShearBack | How much the hair extends towards back |
| TuperFront | The width of the hair at the front |
| TuperBack | The width of the hair on the back |
| Rumpledhair | How much the hair is rumpled |
| Pigtails | The length of the pigtails |
| Ponytail | The length of the ponytail |
| SpikedHair | The length or the spikes in the hair |
| HairTilt | The vertical position of the hair from the top of the head (m) |
| HairMiddePart | How much the hair is parted at the middle front |
| HairRightPart | How much the hair is parted at the right side |
| HairLeftPart | How much the hair is parted at the left side |
| HairPartBangs | How much the hair is parted at the middle |
| hapticIDRef. | Identifier that refers to the haptic properties of the hair. |

Depending on embodiments, the eyebrows 1422 of the avatar appearance type 1410 may be expressed using the XML, for example, as shown below in Source 50. However, a program source shown in Source 50 is not limiting and is only an example embodiment.

| Source 50 |
|---|
| <!-- ################################################## --> |
| <!-- Eye Brows Type                                      --> |
| <!-- ################################################## --> |
| <complexType name="EyebrowsType"> |
|     <sequence> |
|         <element name="EyebrowSize" type="vwoc:indicateOfSMLType" minOccurs="0"/> |
|         <element name="EyebrowDensity" minOccurs="0"> |
|             <simpleType> |
|                 <restriction base="string"> |
|                       <enumeration value="low"/> |
|                       <enumeration value="moderate"/> |
|                       <enumeration value="high"/> |
|                 </restriction> |
|             </simpleType> |
|         </element> |
|         <element name="EyebrowHeight" type="vwoc:measureUnitLMHType" minOccurs="0"/> |
|         <element name="EyebrowArc" minOccurs="0"> |
|             <simpleType> |
|                 <restriction base="string"> |
|                       <enumeration value="flat"/> |
|                       <enumeration value="middle"/> |
|                       <enumeration value="arched"/> |
|                 </restriction> |
|             </simpleType> |
|         </element> |
|         <element name="EyebrowPoints" type="vwoc:indicateOfDMUType" minOccurs="0"/> |
|     </sequence> |
|     <attribute name="hapticIDRef" type="IDREF" use="optional"/> |
| </complexType> |

Table 50-1 shows example binary representation syntax corresponding to the eyebrows 1422 of the avatar appearance type 1410, according to the example embodiments.

TABLE 50-1

| EyebrowsType{ | Number of bits | Mnemonic |
|---|---|---|
| EyebrowSizeFlag | 1 | bslbf |
| EyebrowDensityFlag | 1 | bslbf |
| EyebrowHeightFlag | 1 | bslbf |
| EyebrowArcFlag | 1 | bslbf |
| EyebrowPointsFlag | 1 | bslbf |
| hapticIDRefFlag | 1 | bslbf |
| if(EyebrowSizeFlag){ | | |
|   EyebrowSize | | indicateOfSMLType |
| } | | |
| if(EyebrowDensityFlag){ | | |
|   EyebrowDensity | 3 | bslbf |
| } | | |
| if(EyebrowHeightFlag){ | | |
|   EyebrowHeight | | measureUnitLMHType |
| } | | |
| if(EyebrowArcFlag){ | | |
|   EyebrowArc | 3 | bslbf |
| } | | |
| if(EyebrowPointsFlag){ | | |
|   EyebrowPoints | | indicateOfDMUType |
| } | | |
| if(hapticIDRefFlag){ | | |
|   hapticIDRef | See ISO 10646 | UTF-8 |
| } | | |
| } | | |

Table 50-2 shows example descriptor components semantics of the eyebrows 1422 of the avatar appearance type 1410, according to the example embodiments.

TABLE 50-2

| Names | Description |
|---|---|
| EyebrowsType | Defines the type of eyebrows. |
| EyebrowSizeFlag | This field, which is only present in the binary representation, signals the presence of the EyebrowSize element. "1" means that the element shall be used. "0" means that the element shall not be used. |
| EyebrowDensityFlag | This field, which is only present in the binary representation, signals the presence of the EyebrowDensity element. "1" means that the element shall be used. "0" means that the element shall not be used. |
| EyebrowHeightFlag | This field, which is only present in the binary representation, signals the presence of the EyebrowHeight element. "1" means that the element shall be used. "0" means that the element shall not be used. |
| EyebrowArcFlag | This field, which is only present in the binary representation, signals the presence of the EyebrowArc element. "1" means that the element shall be used. "0" means that the element shall not be used. |
| EyebrowPointsFlag | This field, which is only present in the binary representation, signals the presence of the EyebrowPoints element. "1" means that the element Shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| EyebrowSize | The length of the eyebrow |
| EyebrowDensity | The density (low, moderate, high) (000: low, 001: moderate, 010: high, 011-111: Reserved) |
| EyebrowHeight | The vertical eyebrow position on the face |
| EyebrowArc | The curvature of the Eyebrow. It can be low (flat), middle or high (arced) (000: flat, 001: middle, 010: arched, 011-111: Reserved) |

TABLE 50-2-continued

| Names | Description |
|---|---|
| EyebrowPoints | The direction of the eyebrows, towards up or down |
| hapticIDRef | Identifier that refers to the haptic properties of the eyebrows |

Depending on embodiments, the facial hair 1423 of the avatar appearance type 1410 may be expressed using the XML, for example, as shown below in Source 51. However, a program source shown in Source 51 is not limiting and is only an example embodiment.

Source 51

```
<!-- ################################################## -->
<!-- Facial Hair Type                                    -->
<!-- ################################################## -->
<complexType name="FacialHairType">
    <sequence>
        <element name="FacialHairThickness"
            type="vwoc:measureUnitLMHType" minOccurs="0"/>
        <element name="FacialSideburns" type="mpegvct:colorType"
            minOccurs="0"/>
        <element name="FacialMustache" type="boolean"
            minOccurs="0"/>
        <element name="FacialChinCurtains" type="boolean"
            minOccurs="0"/>
        <element name="FacialsoulPatch" type="boolean"
            minOccurs="0"/>
    </sequence>
    <attribute name="hapticIDRef" type="IDREF" use="optional"/>
</complexType>
```

Table 51-1 shows example binary representation syntax corresponding to the facial hair 1423 of the avatar appearance type 1410, according to the example embodiments.

TABLE 51-1

| FacialHairType{ | Number of bits | Mnemonic |
|---|---|---|
| FacialHairThicknessFlag | 1 | bslbf |
| FacialSideburnsFlag | 1 | bslbf |
| FacialMustacheFlag | 1 | bslbf |
| FacialChinCurtainsFlag | 1 | bslbf |
| FacialSoulPatchFlag | 1 | bslbf |
| hapticIDRefFlag | 1 | bslbf |
| if(FacialHairThicknessFlag){ | | |
|   FacialHairThickness | 3 | bslbf |
| } | | |
| if(FacialSideburnsFlag){ | | |
|   FacialSideburns | | RGB |
| } | | |
| if(FacialMustacheFlag){ | | |
|   FacialMustache | 1 | bslbf |
| } | | |
| if(FacialChinCurtainsFlag){ | | |
|   FacialChinCurtains | 1 | Bslbf |
| } | | |
| if(FacialSoulPatchFlag){ | | |
|   FacialSoulPatch | 1 | bslbf |
| } | | |
| if(hapticIDRefFlag){ | | |
|   hapticIDRef | See ISO 10646 | UTF-8 |
| } | | |
| } | | |

Table 51-2 shows example descriptor components semantics of the facial hair 1423 of the avatar appearance type 1410, according to the example embodiments.

TABLE 51-2

| Names | Description |
|---|---|
| FacialHairType | Defines the type of eyebrows. |
| FacialHairThicknessFlag | This field, which is only present in the binary representation, signals the presence of the FacialHairThickness element. "1" means that the element shall be used. "0" means that the element shall not be used. |
| FacialSideburnsFlag | This field, which is only present in the binary representation, signals the presence of the FacialSideburns element. "1" means that the element shall be used. "0" means that the element shall not be used. |
| FacialMustacheFlag | This field, which is only present in the binary representation, signals the presence of the FacialMustache element. "1" means that the element shall be used. "0" means that the element shall not be used. |
| FacialChinCurtainsFlag | This field, which is only present in the binary representation, signals the presence of the FacialChinCurtains element. "1" means that the element shall be used. "0" means that the element shall not be used. |
| FacialSoulPatchFlag | This field, which is only present in the binary representation, signals the presence of the FacialSoulPatch element. "1" means that the element shall be used. "0" means that the element shall not be used. |
| hapticIDRefFlag | This field, which is only present in the binary representation, signals the presence of the hapticIDRef attribute. "1" means that the attribute shall be used. "0" means that the attribute shall not be used. |
| FacialHairThickness | The thick of the facial hair |
| FacialSideburns | The color of the facial side |
| FacialMustache | The facial moustache (1: yes or 0: no) |
| FacialChinCurtains | Facial chin curtains (1: yes or 0: no) |

TABLE 51-2-continued

| Names | Description |
|---|---|
| FacialSoulPatch | Facial soul patch (1: yes or 0: no) |
| hapticIDRef | Identifier that refers to the haptic properties of the facial hair. |

Depending on embodiments, the facial calibration points 1425 of the avatar appearance type 1410 may be expressed using the XML, for example, as shown below in Source 52. However, a program source shown in Source 52 is not limiting and is only an example embodiment.

Source 52

```
<!-- ################################################## -->
<!-- Facial Calibration Points Type                     -->
<!-- ################################################## -->
<complexType name="FacialCalibrationPointsType">
    <sequence>
        <element name="Sellion" type="vwoc:PointType"
        minOccurs="0"/>
        <element name="RInfraorbitale" type="vwoc:PointType"
        minOccurs="0"/>
        <element name="LInfraorbitale" type="vwoc:PointType"
        minOccurs="0"/>
        <element name="Supramenton" type="vwoc:PointType"
        minOccurs="0"/>
        <element name="RTragion" type="vwoc:PointType"
        minOccurs="0"/>
        <element name="RGonion" type="vwoc:PointType"
        minOccurs="0"/>
        <element name="LTragion" type="vwoc:PointType"
        minOccurs="0"/>
        <element name="LGonion" type="vwoc:PointType"
        minOccurs="0"/>
    </sequence>
</complexType>
```

Table 52-1 shows example binary representation syntax corresponding to the facial calibration points 1425 of the avatar appearance type 1410, according to the example embodiments.

TABLE 52-1

| FacialCalibrationPointsType{ | Number of bits | Mnemonic |
|---|---|---|
| SellionFlag | 1 | bslbf |
| RInfraorbitaleFlag | 1 | bslbf |
| LinfraorbitaleFlag | 1 | bslbf |
| SupramentonFlag | 1 | bslbf |
| RtragionFlag | 1 | bslbf |
| RgonionFlag | 1 | bslbf |
| LtragionFlag | 1 | bslbf |
| LgonionFlag | 1 | bslbf |
| if(SellionFlag){ | | |
| Sellion | | PointType |
| } | | |
| if(RinfraorbitaleFlag){ | | |
| Rinfraorbitale | | PointType |
| } | | |
| if(LinfraorbitaleFlag){ | | |
| Linfraorbitale | | PointType |
| } | | |
| if(SupramentonFlag){ | | |
| Supramenton | | PointType |
| } | | |
| if(RtragionFlag){ | | |
| Rtragion | | PointType |
| } | | |
| if(RgonionFlag){ | | |
| Rgonion | | PointType |
| } | | |
| if(LtragionFlag){ | | |
| Ltragion | | PointType |
| } | | |
| if(LgonionFlag){ | | |
| Lgonion | | PointType |
| } | | |
| } | | |

Table 52-2 shows example descriptor components semantics of the facial calibration points 1425 of the avatar appearance type 1410, according to the example embodiments.

TABLE 52-2

| Names | Description |
|---|---|
| FacialCalibrationPointsType | Defines the facial calibration points. |
| SellionFlag | This field, which is only present in the binary representation, signals the presence of the Sellion element. "1" means that the element shall be used. "0" means that the element shall not be used. |
| RInfraorbitaleFlag | This field, which is only present in the binary representation, signals the presence of the RInfraorbitale element. "1" means that the element shall be used. "0" means that the element shall not be used. |
| LinfraorbitaleFlag | This field, which is only present in the binary representation, signals the presence of the Linfraorbitale element. "1" means that the element shall be used. "0" means that the element shall not be used. |
| SupramentonFlag | This field, which is only present in the binary representation, signals the presence of the Supramenton element. "1" means that the element shall be used. "0" means that the element shall not be used. |
| RtragionFlag | This field, which is only present in the binary representation, signals the presence of the Rtragion element. "1" means that the element shall be used. "0" means that the element shall not be used. |

TABLE 52-2-continued

| Names | Description |
|---|---|
| RgonionFlag | This field, which is only present in the binary representation, signals the presence of the Rgonion element. "1" means that the element shall be used. "0" means that the element shall not be used. |
| LtragionFlag | This field, which is only present in the binary representation, signals the presence of the Ltragion element. "1" means that the element shall be used. "0" means that the element shall not be used. |
| LgonionFlag | This field, which is only present in the binary representation, signals the presence of the Lgonion element. "1" means that the element shall be used. "0" means that the element shall not be used. |
| Sellion | point 1 in the figure at the bottom (point type) |
| RInfraorbitale | point 2 in the figure at the bottom (point type) |
| Linfraorbitale | point 3 in the figure at the bottom (point type) |
| Supramenton | point 4 in the figure at the bottom (point type) |
| Rtragion | point 5 in the figure at the bottom (point type) |
| Rgonion | point 6 in the figure at the bottom (point type) |
| Ltragion | point 7 in the figure at the bottom (point type) |
| Lgonion | point 8 in the figure at the bottom (point type) |

Depending on embodiments, the physical condition type 1426 of the avatar appearance type 1410 may be expressed using the XML, for example, as shown below in Source 53. However, a program source shown in Source 53 is not limiting and is only an example embodiment.

Source 53

```
<!-- ################################################## -->
<!-- Physical Condition Type                           -->
<!-- ################################################## -->
<complexType name="PhysicalConditionType">
    <sequence>
        <element name="BodyStrength"
type="vwoc:unlimitedPercentageType" minOccurs="0"/>
        <element name="BodyFlexibility"
type="vwoc:indicateOfLMHType" minOccurs="0"/>
    </sequence>
</complexType>
```

Table 53-1 shows example binary representation syntax corresponding to the physical condition type 1426 of the avatar appearance type 1410, according to the example embodiments.

TABLE 53-1

| PhysicalConditionType{ | Number of bits | Mnemonic |
|---|---|---|
| BodyStrengthFlag | 1 | bslbf |
| BodyFlexibilityFlag | 1 | bslbf |
| if(BodyStrengthFlag){ | | |
| BodyStrength | | unlimitedPercentageType |
| } | | |
| if(BodyStrengthFlag){ | | |
| BodyStrength | | indicateOfLMHType |
| } | | |
| } | | |

Table 53-2 shows example descriptor components semantics of the physical condition type 1426 of the avatar appearance type 1410, according to the example embodiments.

TABLE 53-2

| Names | Description |
|---|---|
| PhysicalConditionType | Defines the physical condition of avatar. |
| BodyStrengthFlag | This field, which is only present in the binary representation, signals the presence of the BodyStrength element. "1" means that the element shall be used. "0" means that the element shall not be used. |
| BodyFlexibilityFlag | This field, which is only present in the binary representation, signals the presence of the BodyFlexibility element. "1" means that the element shall be used. "0" means that the element shall not be used. |
| BodyStrength | This element describes the body strength (%) |
| BodyFlexibility | This element describes the body flexibility. Values for this element can be either low, middle, or high. |

Figure 20:
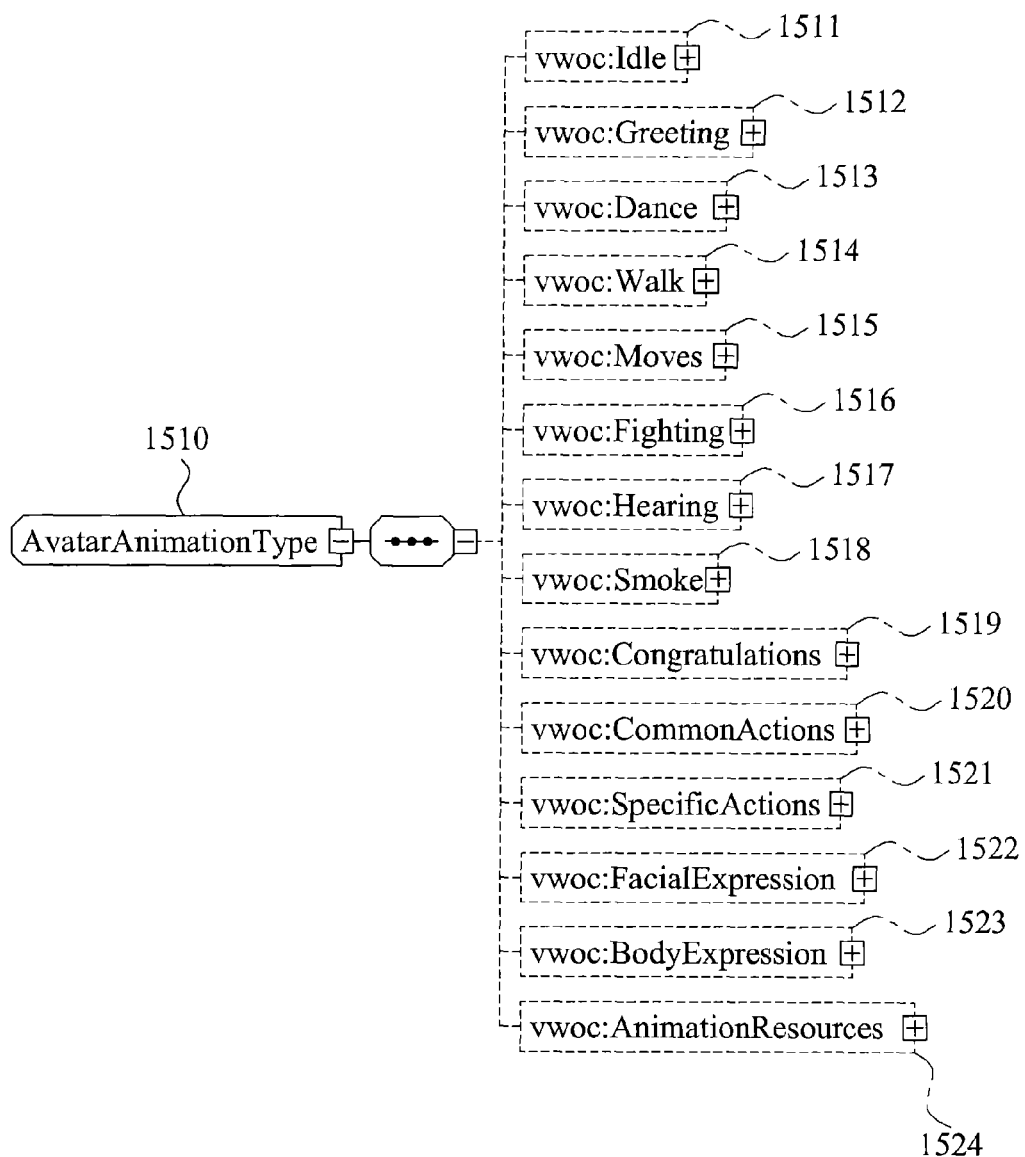
FIG. 20 illustrates a data structure of an avatar animation type, according to example embodiments.

FIG. 20 illustrates a data structure of an avatar animation type 1510, according to example embodiments.

Referring to FIG. 20, the avatar animation type 1510 may include a plurality of elements 1511 to 1524, however, the present disclosure is not limited thereto.

According to the example embodiments, the elements of the avatar animation type 1510 may include idle 1511, greeting 1512, dance 1513, walk 1514, moves 1515, fighting 1516, hearing 1517, smoke 1518, congratulations 1519, common actions 1520, specific actions 1521, facial expression 1522, body expression 1523, and animation resources 1524. The described elements of the avatar animation type are exemplary, and thus, the present disclosure is not limited thereto.

Depending on embodiments, the avatar animation type 1510 may be expressed using the XML, for example, as shown below in Source 54. However, a program source shown in Source 54 is not limiting and is only an example embodiment.

Source 54

```xml
<!-- ############################################# -->
<!-- Avatar Animation Type                         -->
<!-- ############################################# -->
<complexType name="AvatarAnimationType">
    <sequence>
        <element name="Idle" type="vwoc:AnimationDescriptionType" minOccurs="0" maxOccurs="unbounded"/>
        <element name="Greeting" type="vwoc:AnimationDescriptionType" minOccurs="0" maxOccurs="unbounded"/>
        <element name="Dance" type="vwoc:AnimationDescriptionType" minOccurs="0" maxOccurs="unbounded"/>
        <element name="Walk" type="vwoc:AnimationDescriptionType" minOccurs="0" maxOccurs="unbounded"/>
        <element name="Moves" type="vwoc:AnimationDescriptionType" minOccurs="0" maxOccurs="unbounded"/>
        <element name="Fighting" type="vwoc:AnimationDescriptionType" minOccurs="0" maxOccurs="unbounded"/>
        <element name="Hearing" type="vwoc:AnimationDescriptionType" minOccurs="0" maxOccurs="unbounded"/>
        <element name="Smoke" type="vwoc:AnimationDescriptionType" minOccurs="0" maxOccurs="unbounded"/>
        <element name="Congratulations" type="vwoc:AnimationDescriptionType" minOccurs="0" maxOccurs="unbounded"/>
        <element name="CommonActions" type="vwoc:AnimationDescriptionType" minOccurs="0" maxOccurs="unbounded"/>
        <element name="SpecificActions" type="vwoc:AnimationDescriptionType" minOccurs="0" maxOccurs="unbounded"/>
        <element name="FacialExpression" type="vwoc:AnimationDescriptionType" minOccurs="0" maxOccurs="unbounded"/>
        <element name="BodyExpression" type="vwoc:AnimationDescriptionType" minOccurs="0" maxOccurs="unbounded"/>
        <element name="AnimationResources" type="vwoc:AnimationResourcesDescriptionType" minOccurs="0" maxOccurs="unbounded"/>
    </sequence>
</complexType>
<!-- #f########################################### -->
<!-- Animation Description Type                    -->
<!-- ############################################# -->
<complexType name="AnimationDescriptionType">
    <sequence>
        <element name="Name" type="mpeg7:termReferenceType" minOccurs="0"/>
        <element name="Uri" type="anyURI" minOccurs="0"/>
    </sequence>
    <attribute name="animationID" type="ID" use="optional"/>
    <attribute name="duration" type="unsignedInt" use="optional"/>
    <attribute name="loop" type="unsignedInt" use="optional"/>
</complexType>
<!-- ############################################# -->
<!-- Animation Resources Description Type          -->
<!-- ############################################# -->
<complexType name="AnimationResourcesDescriptionType">
    <sequence>
        <element name="Description" type="string" minOccurs="0"/>
        <element name="Uri" type="anyURI" minOccurs="0"/>
    </sequence>
    <attribute name="animationID" type="ID" use="optional"/>
    <attribute name="duration" type="unsignedInt" use="optional"/>
    <attribute name="loop" type="unsignedInt" use="optional"/>
</complexType>
```

Table 54-1 shows example binary representation syntax corresponding to the avatar appearance type 1510, according to the example embodiments.

TABLE 54-1

| AvatarAnimationType{ | Number of bits | Mnemonic |
|---|---|---|
| NumIdle | | vluimsbf5 |
| NumGreeting | | vluimsbf5 |
| NumDance | | vluimsbf5 |
| NumWalk | | vluimsbf5 |
| NumMoves | | vluimsbf5 |
| NumFighting | | vluimsbf5 |
| NumHearing | | vluimsbf5 |

TABLE 54-1-continued

| AvatarAnimationType{ | Number of bits | Mnemonic |
|---|---|---|
| NumSmoke | | vluimsbf5 |
| NumCongratulations | | vluimsbf5 |
| NumCommonActions | | vluimsbf5 |
| NumSpecificActions | | vluimsbf5 |
| NumFacialExpression | | vluimsbf5 |
| NumBodyExpression | | vluimsbf5 |
| NumAnimationResources | | vluimsbf5 |
| for(k=0; k< NumIdle; k++){ | | |
|     Idle | | AnimationDescriptionType |
| } | | |
| for(k=0; k< NumGreeting; k++){ | | |
|     Greeting | | AnimationDescriptionType |
| } | | |
| for(k=0; k< NumDance; k++){ | | |
|     Dance | | AnimationDescriptionType |
| } | | |
| for(k=0; k< NumWalk; k++){ | | |
|     Walk | | AnimationDescriptionType |
| } | | |
| for(k=0; k< NumMoves; k++){ | | |
|     Moves | | AnimationDescriptionType |
| } | | |
| for(k=0; k< NumFighting; k++){ | | |
|     Fighting | | AnimationDescriptionType |
| } | | |
| for(k=0; k< NumHearing; k++){ | | |
|     Hearing | | AnimationDescriptionType |
| } | | |
| for(k=0; k< NumSmoke; k++){ | | |
|     Smoke | | AnimationDescriptionType |
| } | | |
| for(k=0; k< NumCongratulations; k++){ | | |
|     Congratulations | | AnimationDescriptionType |
| } | | |
| for(k=0; k< NumCommonActions; k++){ | | |
|     CommonActions | | AnimationDescriptionType |
| } | | |
| for(k=0; k< NumSpecificActions; k++){ | | |
|     SpecificActions | | AnimationDescriptionType |
| } | | |
| for(k=0; k< NumFacialExpression; k++){ | | |
|     FacialExpression | | AnimationDescriptionType |
| } | | |
| for(k=0; k< NumBodyExpression; k++){ | | |
|     BodyExpression | | AnimationDescriptionType |
| } | | |
| for(k=0; k< NumAnimationResources; k++){ | | |
|     AnimationResources | | AnimationResourcesDescriptionType |
| } | | |
| } | | |
| AnimationDescriptionType{ | | |
| animationIDFlag | 1 | bslbf |
| durationFlag | 1 | bslbf |
| loopFlag | 1 | bslbf |
| DescriptionFlag | 1 | bslbf |
| UriFlag | 1 | bslbf |
| if(animationIDFlag){ | | |
|     animationID | See ISO 10646 | UTF-8 |
| } | | |
| if(durationFlag){ | | |
|     duration | 8 | uimsbf |
| } | | |
| if(loopFlag){ | | |
|     loop | 8 | uimsbf |
| } | | |
| if(DescriptionFlag){ | | |
|     Name | Number of bits are defined by the type of animation | bslbf |
| } | | |
| if(UriFlag){ | | |
|     Uri | See ISO 10646 | UTF-8 |

TABLE 54-1-continued

| AvatarAnimationType{ | Number of bits | Mnemonic |
|---|---|---|
| } | | |
| } | | |
| AnimationResourcesDescriptionType{ | | |
| animationIDFlag | 1 | bslbf |
| durationFlag | 1 | bslbf |
| loopFlag | 1 | bslbf |
| DescriptionFlag | 1 | bslbf |
| UriFlag | 1 | bslbf |
| if(animationIDFlag){ | | |
|     animationID | See ISO 10646 | UTF-8 |
| } | | |
| if(durationFlag){ | | |
|     duration | 8 | uimsbf |
| } | | |
| if(loopFlag){ | | |
|     loop | 8 | uimsbf |
| } | | |
| if(DescriptionFlag){ | | |
|     Description | See ISO 10646 | UTF-8 |
| } | | |
| if(UriFlag){ | | |
|     Uri | See ISO 10646 | UTF-8 |
| } | | |
| } | | |

Table 54-2 shows example descriptor components semantics of the avatar animation type 1510, according to the example embodiments.

TABLE 54-2

| Names | Description | | |
|---|---|---|---|
| AvatarAnimationType | Defines the animation of avatar. | | |
| NumIdle | This field, which is only present in the binary representation, signals the number of the Idle elements. | | |
| NumGreeting | This field, which is only present in the binary representation, signals the number of the Greeing elements. | | |
| NumDance | This field, which is only present in the binary representation, signals the number of the Dance elements. | | |
| NumWalk | This field, which is only present in the binary representation, signals the number of the Walk elements. | | |
| NumMoves | This field, which is only present in the binary representation, signals the number of the Moves elements. | | |
| NumFighting | This field, which is only present in the binary representation, signals the number of the Fighting elements. | | |
| NumHearing | This field, which is only present in the binary representation, signals the number of the Hearing elements. | | |
| NumSmoke | This field, which is only present in the binary representation, signals the number of the Smoke elements. | | |
| NumCongratulations | This field, which is only present in the binary representation, signals the number of the Congratulations elements. | | |
| NumCommonActions | This field, which is only present in the binary representation, signals the number of the CommonActions elements. | | |
| NumSpecificActions | This field, which is only present in the binary representation, signals the number of the SpecificActions elements. | | |
| NumFacialExpression | This field, which is only present in the binary representation, signals the number of the FacialExpression elements. | | |
| NumBodyExpression | This field, which is only present in the binary representation, signals the number of the BodyExpression elements. | | |
| NumAnimationResources | This field, which is only present in the binary representation, signals the number of the AnimationResources elements. | | |
| Idle | Set of Idle animations. | | |
| | Binary representation (4 bits) | description | |
| | 1 | Default idle | |
| | 2 | Rest pose | |
| | 3 | Breathe | |
| | 4 | Body noise | |
| | 0.5-15 | Reserved | |

TABLE 54-2-continued

| Names | Description | | |
|---|---|---|---|
| Greeting | Set of greeting animation | | |
| | Binary representation (4 bits) | description | |
| | 1 | Salute | |
| | 2 | Cheer | |
| | 3 | Greet | |
| | 4 | Hello | |
| | 5 | Bow | |
| | 6 | Court bow | |
| | 7 | Flourish | |
| | 0.8-15 | Reserved | |
| Dance | Set of dance animations. | | |
| | Binary representation (5 bits) | description | |
| | 1 | Body pop dance | |
| | 2 | Break dance | |
| | 3 | Cabbage patch dance | |
| | 4 | Casual dance | |
| | 5 | Dance | |
| | 6 | Rave dance | |
| | 7 | Robot dance | |
| | 8 | Rock dance | |
| | 9 | Rock and roll dance | |
| | 10 | Running man dance | |
| | 11 | Salsa dance | |
| | 0.12-31 | Reserved | |
| Walk | Set of walk animations. | | |
| | Binary representation (5 bits) | description | |
| | 1 | Slow walk | |
| | 2 | Default walk | |
| | 3 | Fast walk | |
| | 4 | Slow run | |
| | 5 | Default run | |
| | 6 | Fast run | |
| | 7 | Crouch | |
| | 8 | Crouch walk | |
| | 0.9-31 | Reserved | |
| Moves | Set of animations for simply body moves. | | |
| | Binary representation (5 bits) | description | |
| | 1 | Move down | |
| | 2 | Move left | |
| | 3 | Move right | |
| | 4 | Move up | |
| | 5 | Point me | |
| | 6 | Point you | |
| | 7 | Turn 180 | |
| | 8 | Turn back 180 | |
| | 9 | Turn left | |
| | 10 | Turn right | |
| | 11 | Turn 360 | |
| | 12 | Turn back 360 | |
| | 13 | Free direction | |
| | 0.14-31 | Reserved | |
| Fighting | Set of animations characteristic for fighting. | | |
| | Binary representation (5 bits) | description | |
| | 1 | Aim | |
| | 2 | Aim left | |
| | 3 | Aim right | |
| | 4 | Aim bow | |
| | 5 | Aim left bow | |
| | 6 | Aim right bow | |
| | 7 | Aim left rifle | |
| | 8 | Aim right rifle | |
| | 9 | Aim bazooka | |
| | 10 | Aim left bazooka | |
| | 11 | Aim right bazooka | |
| | 12 | Aim handgun | |
| | 13 | Aim left handgun | |
| | 14 | Aim right handgun | |
| | 15 | Hold weapon | |
| | 16 | Hold weapon left | |
| | 17 | Hold weapon right | |
| | 18 | Hold bow | |
| | 19 | Hold bow left | |
| | 20 | Hold bow right | |

TABLE 54-2-continued

| Names | Description | |
|---|---|---|
| | 21 | Hold rifle |
| | 22 | Hold rifle left |
| | 23 | Hold rifle right |
| | 24 | Hold bazooka |
| | 25 | Hold bazooka left |
| | 26 | Hold bazooka right |
| | 27 | Hold handgun |
| | 28 | Hold handgun left |
| | 29 | Hold handgun right |
| | 30 | Hold weapon throw |
| | 31 | Hold weapon throw left |
| | 32 | Hold weapon throw right |
| | 33 | shoot |
| | 34 | shoot left |
| | 35 | shoot right |
| | 36 | Shoot bow |
| | 37 | Shoot bow left |
| | 38 | Shoot bow right |
| | 39 | Shoot rifle |
| | 40 | Shoot rifle left |
| | 41 | Shoot rifle right |
| | 42 | Shoot bazooka |
| | 43 | Shoot bazooka left |
| | 44 | Shoot bazooka right |
| | 45 | Shoot handgun |
| | 46 | Shoot handgun left |
| | 47 | Shoot handgun right |
| | 48 | Strike |
| | 49 | Strike sword |
| | 50 | Strike sword left |
| | 51 | Strike sword right |
| | 52 | Punch |
| | 53 | Punch left |
| | 54 | Punch right |
| | 55 | Throw |
| | 56 | Throw weapon left |
| | 57 | Throw weapon right |
| | 58-127 | Reserved |
| Hearing | Set of animations for movements make during try to hear. | |
| | Binary representation (5 bits) | description |
| | 1 | Start hearing |
| | 2 | Stop hearing |
| | 3 | Ears extend |
| | 4 | Turn head left |
| | 5 | Turn head right |
| | 6 | Holds tip hand |
| | 7 | Tilts head right |
| | 8 | Tilts head left |
| | 9 | Cocks head left |
| | 10 | Default hear |
| | 0.11-31 | Reserved |
| Smoke | Set of animations for movements make while smoking. | |
| | Binary representation (5 bits) | description |
| | 1 | Smoke idle |
| | 2 | Smoke inhale |
| | 3 | Smoke throw down |
| | 0.4-15 | Reserved |
| Congratulations | Set of animations for movements make while congratulating. | |
| | Binary representation (5 bits) | description |
| | 1 | Applaud |
| | 2 | Clap |
| | 0.3-15 | Reserved |
| CommonActions | Set of animations for simply body moves. | |
| | Binary representation (5 bits) | description |
| | 1 | Appear |
| | 2 | Away |
| | 3 | Blow kiss |
| | 4 | Brush |
| | 5 | Busy |
| | 6 | Crazy |
| | 7 | Dead |
| | 8 | Disappear |
| | 9 | Drink |
| | 10 | Eat |

TABLE 54-2-continued

| Names | Description | | | |
|---|---|---|---|---|
| | 11 | | Explain | |
| | 12 | | Fall down | |
| | 13 | | Flip | |
| | 14 | | Fly | |
| | 15 | | Gag | |
| | 16 | | Get attention | |
| | 17 | | Impatient | |
| | 18 | | Jump | |
| | 19 | | Kick | |
| | 20 | | Land | |
| | 21 | | Prejump | |
| | 22 | | Puke | |
| | 23 | | Read | |
| | 24 | | Sit | |
| | 25 | | Sleep | |
| | 26 | | Stand | |
| | 27 | | Stand up | |
| | 28 | | Stretch | |
| | 29 | | Stride | |
| | 30 | | Suggest | |
| | 31 | | Surf | |
| | 32 | | Talk | |
| | 33 | | Think | |
| | 34 | | Type | |
| | 35 | | Whisper | |
| | 36 | | Whistle | |
| | 37 | | Write | |
| | 38 | | Yawn | |
| | 39 | | Yeah | |
| | 40 | | Yoga | |
| | 0.40-127 | | Reserved | |
| SpecificActions | Set of animations characteristic for fighting | | | |
| | Binary representation(5 bits) | description | | |
| | 1 | | air guitar | |
| | 2 | | angry_fingerwag | |
| | 3 | | angry_tantrum | |
| | 4 | | back flip | |
| | 5 | | beck on | |
| | 6 | | big yawn | |
| | 7 | | boo | |
| | 8 | | burp | |
| | 9 | | candlestick | |
| | 10 | | come again | |
| | 11 | | decline | |
| | 12 | | Dismissive | |
| | 13 | | don't recognize | |
| | 14 | | fart Arm | |
| | 15 | | fist pump | |
| | 16 | | fly slow | |
| | 17 | | guns | |
| | 18 | | ha | |
| | 19 | | hide | |
| | 20 | | hmmm | |
| | 21 | | hover | |
| | 22 | | hover down | |
| | 23 | | hover up | |
| | 24 | | Huh | |
| | 25 | | jump for joy | |
| | 26 | | kick roundhouse | |
| | 27 | | kiss my butt | |
| | 28 | | laught short | |
| | 29 | | lol | |
| | 30 | | loser | |
| | 31 | | motorcycle sit | |
| | 32 | | muscle beach | |
| | 33 | | no way | |
| | 34 | | no head | |
| | 35 | | no unhappy | |
| | 36 | | nod | |
| | 37 | | Nope | |
| | 38 | | nyanya | |
| | 39 | | okay | |
| | 40 | | oooh | |
| | 41 | | peace | |
| | 42 | | point | |
| | 43 | | pose | |
| | 44 | | punch one two | |

TABLE 54-2-continued

| Names | Description | | |
|---|---|---|---|
| | 45 | rps countdown | |
| | 46 | rps paper | |
| | 47 | rps rock | |
| | 48 | rps scissors | |
| | 49 | score | |
| | 50 | shake fists | |
| | 51 | show | |
| | 52 | sit generic | |
| | 53 | sit ground | |
| | 54 | sit ground constrained | |
| | 55 | sit to stand | |
| | 56 | slow fly | |
| | 57 | snapshot | |
| | 58 | soft land | |
| | 59 | spin | |
| | 60 | tantrum | |
| | 61 | thumbs_down | |
| | 62 | thumbs_up | |
| | 63 | tongue | |
| | 64 | tryon_shirt | |
| | 65 | uncertain | |
| | 66 | wassamatta | |
| | 67 | what | |
| | 68 | yay | |
| | 69 | yes happy | |
| | 70 | yes head | |
| | 0.70-255 | Reserved | |
| FacialExpression | Set of facial animations expressing emotions | | |
| | Binary representation(5 bits) | description | |
| | 1 | air guitar | |
| | 2 | angry_fingerwag | |
| | 3 | angry_tantrum | |
| | 4 | back flip | |
| | 5 | beck on | |
| | 6 | big yawn | |
| | 7 | boo | |
| | 8 | burp | |
| | 9 | candlestick | |
| | 10 | come again | |
| | 11 | decline | |
| | 12 | Dismissive | |
| | 13 | don't recognize | |
| | 14 | fart Arm | |
| | 15 | fist pump | |
| | 16 | fly slow | |
| | 17 | guns | |
| | 18 | ha | |
| | 19 | hide | |
| | 20 | hmmm | |
| | 21 | hover | |
| | 22 | hover down | |
| | 23 | hover up | |
| | 24 | Huh | |
| | 25 | jump for joy | |
| | 26 | kick roundhouse | |
| | 27 | kiss my butt | |
| | 28 | laught short | |
| | 29 | lol | |
| | 30 | loser | |
| | 31 | motorcycle sit | |
| | 32 | muscle beach | |
| | 33 | no way | |
| | 34 | no head | |
| | 35 | no unhappy | |
| | 36 | nod | |
| | 37 | Nope | |
| | 38 | nyanya | |
| | 39 | okay | |
| | 40 | oooh | |
| | 41 | peace | |
| | 42 | point | |
| | 43 | pose | |
| | 44 | punch one two | |
| | 45 | rps countdown | |
| | 46 | rps paper | |
| | 47 | rps rock | |
| | 48 | rps scissors | |

TABLE 54-2-continued

| Names | Description | |
|---|---|---|
| 49 | score | |
| 50 | shake fists | |
| 51 | show | |
| 52 | sit generic | |
| 53 | sit ground | |
| 54 | sit ground constrained | |
| 55 | sit to stand | |
| 56 | slow fly | |
| 57 | snapshot | |
| 58 | soft land | |
| 59 | spin | |
| 60 | tantrum | |
| 61 | thumbs_down | |
| 62 | thumbs_up | |
| 63 | tongue | |
| 64 | tryon_shirt | |
| 65 | uncertain | |
| 66 | wassamatta | |
| 67 | what | |
| 68 | yay | |
| 69 | yes happy | |
| 70 | yes head | |
| 71 | contempt face | |
| 72 | content face | |
| 73 | courage face | |
| 74 | cry face | |
| 75 | dazed face | |
| 76 | Default-emotion | |
| 77 | delight face | |
| 78 | despair face | |
| 79 | disagree face | |
| 80 | disappointed face | |
| 81 | disdain face | |
| 82 | disgusted face | |
| 83 | doubt face | |
| 84 | elation face | |
| 85 | embarrassed face | |
| 86 | empathy face | |
| 87 | envy face | |
| 88 | excitement face | |
| 89 | fear face | |
| 90 | friendliness face | |
| 91 | frown face | |
| 92 | frustrated face | |
| 93 | grin face | |
| 94 | guilt face | |
| 95 | happy face | |
| 96 | helplessness face | |
| 97 | hoping face | |
| 98 | hurt face | |
| 99 | interested face | |
| 100 | irritiated face | |
| 101 | joy face | |
| 102 | kiss | |
| 103 | laughing face | |
| 104 | Look down | |
| 105 | Look down blink | |
| 106 | Look Down Left | |
| 107 | Look down Left Blink | |
| 108 | Look Down Left Return | |
| 109 | Look Down Return | |
| 110 | Look Down Right | |
| 111 | Look down Right Blink | |
| 112 | Look Down Right Return | |
| 113 | Look Left | |
| 114 | Look Left Blink | |
| 115 | Look Left Return | |
| 116 | Look Right | |
| 117 | Look Right Blink | |
| 118 | Look Right Return | |
| 119 | Look Up | |
| 120 | Look Up Blink | |
| 121 | Look Up Left | |
| 122 | Look Up Left Blink | |
| 123 | Look Up Left Return | |
| 124 | Look Up Return | |
| 125 | Look Up Right | |
| 126 | Look Up Right Blink | |

TABLE 54-2-continued

| Names | Description | | |
|---|---|---|---|
| | 127 | Look Up Right Return | |
| | 128 | love face | |
| | 129 | mad face | |
| | 130 | neutral face | |
| | 131 | Open Mouth | |
| | 132 | pleasure face | |
| | 133 | politeness face | |
| | 134 | powerlessness face | |
| | 135 | pride face | |
| | 136 | puckering | |
| | 137 | relaxed face | |
| | 138 | relieved face | |
| | 139 | repulsed face | |
| | 140 | sad face | |
| | 141 | satisfied face | |
| | 142 | screaming | |
| | 143 | serene face | |
| | 144 | shame face | |
| | 145 | shocked face | |
| | 146 | shrug face | |
| | 147 | sigh face | |
| | 148 | smiling face | |
| | 149 | stressed face | |
| | 150 | surprised face | |
| | 151 | tension face | |
| | 152 | Tongue Out | |
| | 153 | Tooth Smile | |
| | 154 | tired | |
| | 155 | Trust | |
| | 156 | Wink | |
| | 157 | worried face | |
| | 158 | Gesture right | |
| | 159 | Gesture left | |
| | 160 | Gesture up | |
| | 161 | Gesture down | |
| BodyExpression | Set of body animations expressing emotions | | |
| | Binary representation (5 bits) | description | |
| | 1 | affected pose | |
| | 2 | afraid pose | |
| | 3 | agree pose | |
| | 4 | amuse pose | |
| | 5 | angry pose | |
| | 6 | annoyance pose | |
| | 7 | anxiety pose | |
| | 8 | bored pose | |
| | 9 | calm pose | |
| | 10 | concentrate pose | |
| | 11 | confused pose | |
| | 12 | contempt pose | |
| | 13 | content pose | |
| | 14 | courage pose | |
| | 15 | cry pose | |
| | 16 | dazed pose | |
| | 17 | delight pose | |
| | 18 | despair pose | |
| | 19 | disagree pose | |
| | 20 | disappointed pose | |
| | 21 | disdain pose | |
| | 22 | disgusted pose | |
| | 23 | doubt pose | |
| | 24 | elation pose | |
| | 25 | embarrassed pose | |
| | 26 | empathy pose | |
| | 27 | envy pose | |
| | 28 | excitement pose | |
| | 29 | fear pose | |
| | 30 | friendliness pose | |
| | 31 | frown pose | |
| | 32 | frustrated pose | |
| | 33 | grin pose | |
| | 34 | guilt pose | |
| | 35 | happy pose | |
| | 36 | helplessness pose | |
| | 37 | hoping pose | |
| | 38 | hurt pose | |
| | 39 | interested pose | |
| | 40 | irritated pose | |

TABLE 54-2-continued

| Names | Description | |
|---|---|---|
| | 41 | joy pose |
| | 42 | laughing pose |
| | 43 | love pose |
| | 44 | mad pose |
| | 45 | neutral pose |
| | 46 | pleasure pose |
| | 47 | politeness pose |
| | 48 | powerlessness pose |
| | 49 | pride pose |
| | 50 | puckering |
| | 51 | relaxed pose |
| | 52 | relieved pose |
| | 53 | repulsed pose |
| | 54 | sad pose |
| | 55 | satisfied pose |
| | 56 | screaming |
| | 57 | serene pose |
| | 58 | shame pose |
| | 59 | shocked pose |
| | 60 | shrug pose |
| | 61 | sigh pose |
| | 62 | smiling pose |
| | 63 | stressed pose |
| | 64 | surprised pose |
| | 65 | tension pose |
| | 66 | tired pose |
| | 67 | worried pose |
| AnimationResources | Element that contains, if exist, one or more link(s) to animation(s)file(s). | |

Figure 21:
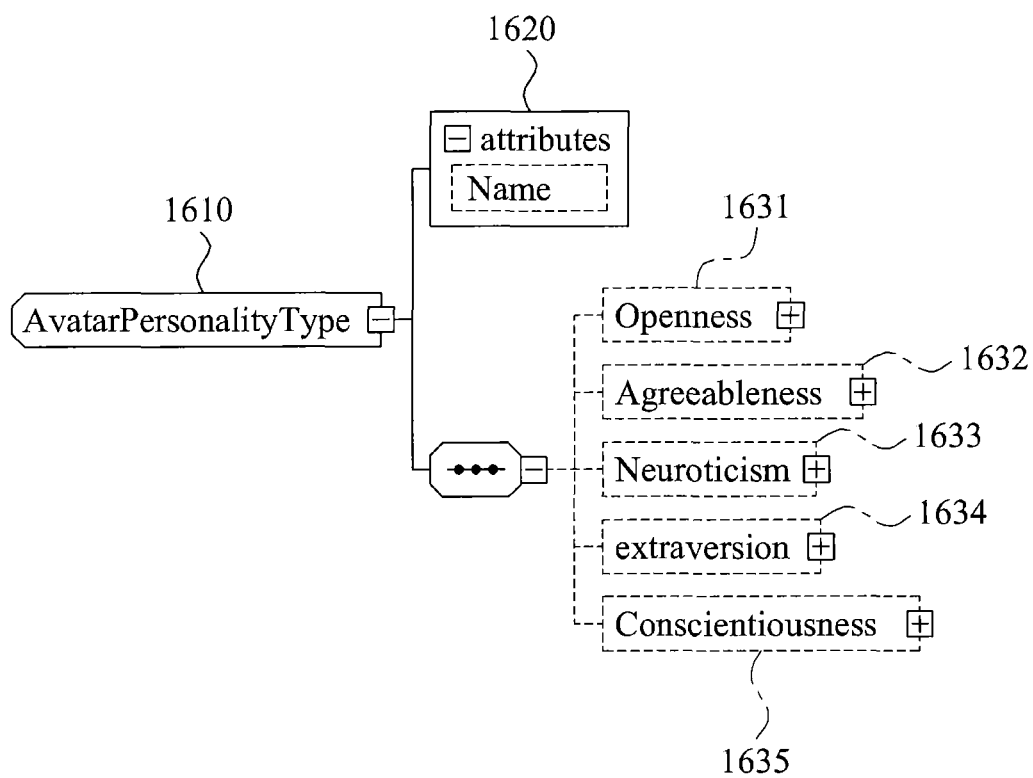
FIG. 21 illustrates a data structure of an avatar personality type, according to example embodiments.

FIG. 21 illustrates a data structure of an avatar personality type 1610, according to example embodiments.

Referring to FIG. 21, the avatar personality type 1610 may include attributes 1620 including name and a plurality of elements 1631 to 1635, however, the present disclosure is not limited thereto.

The elements of the avatar personality type 1610 may include openness 1631, agreeableness 1632, neuroticism 1633, extraversion 1634, and conscientiousness 1635, however, the present disclosure is not limited thereto.

Depending on embodiments, the avatar personality type 1610 may be expressed using the XML, for example, as shown below in Source 55. However, a program source shown in Source 55 is not limiting and is only an example embodiment.

Source 55

```
<!-- ################################################## -->
<!-- Avatar Personality Type                             -->
<!-- ################################################## -->
<complexType name="AvatarPersonalityType">
    <sequence>
        <element name="Openness"
type="mpeg7:minusOneToOneType" minOccurs="0"/>
        <element name="Neuroticism"
type="mpeg7:minusOneToOneType" minOccurs="0"/>
        <element name="Extraversion"
type="mpeg7:minusOneToOneType" minOccurs="0"/>
        <element name="Conscientiousness"
type="mpeg7:minusOneToOneType" minOccurs="0"/>
    </sequence>
    <attribute name="name" type="string"/>
</complexType>
```

Table 55-1 shows example binary representation syntax corresponding to the avatar personality type 1610, according to the example embodiments.

TABLE 55-1

| AvatarPersonaltyType{ | Number of bits | Mnemonic |
|---|---|---|
| OpennessFlag | 1 | bslbf |
| AgreeablenessFlag | 1 | bslbf |
| NeuroticismFlags | 1 | bslbf |
| ExtraversionFlag | 1 | bslbf |
| ConscientiousnessFlag | 1 | bslbf |
| if(OpennessFlag){ | | |
| Openness | 32 | minusOneToOneType |
| } | | |
| if(AgreeablenessFlag){ | | |
| Agreeableness | 32 | minusOneToOneType |
| } | | |
| if(NeuroticismFlag){ | | |
| Neuroticism | 32 | minusOneToOneType |
| } | | |
| if(ExtraversionFlag){ | | |
| Extraversion | 32 | minusOneToOneType |
| } | | |
| if(ConscientiousnessFlag){ | | |
| Conscientiousness | 32 | minusOneToOneType |
| Names | See ISO 10646 | UTF-8 |
| } | | |

Table 55-2 shows descriptor components semantics of the avatar personality type 1610, according to the example embodiments.

TABLE 55-2

| Names | Description |
|---|---|
| AvatarPersonalityType | Defines the avatar personality. |
| OpennessFlag | This field, which is only present in the binary representation, signals the presence of the Openness element. "1" means that the element shall be used. "0" means that the element shall not be used. |
| AgreeablenessFlag | This field, which is only present in the binary representation, signals the presence of the Agreeableness element. "1" means that the element shall be used. "0" means that the element shall not be used. |
| NeurcoticismFlag | This field, which is only present in the binary representation, signals the presence of the Neuroticism element. "1" means that the element shall, be used. "0" means that the element shall not be used. |
| ExtraversionFlag | This field, which is only present in the binary representation, signals the presence of the Extraversion element. "1" means that the element shall be used. "0" means that the element shall not be used. |
| ConscientiousnessFlag | This field, which is only present in the binary representation, signals the presence of the Conscientiousness element. "1" means that the element shall be used. "0" means that the element shall not be used. |
| Openness | A value between −1 and 1 specifying the openness level of the personality |
| Agreeableness | A value between −1 and 1 specifying the agreeableness level of the personality |
| Neuroticism | A value between −1 and 1 specifying the neuroticism level of the personality |
| Extraversior | A value between −1 and 1 specifying the extraversion level of the personality |
| Conscientiousness | A value between −1 and 1 specifying the conscientiousness level of the personality |
| Name | string that specifies the name of personality. |

Figure 22:
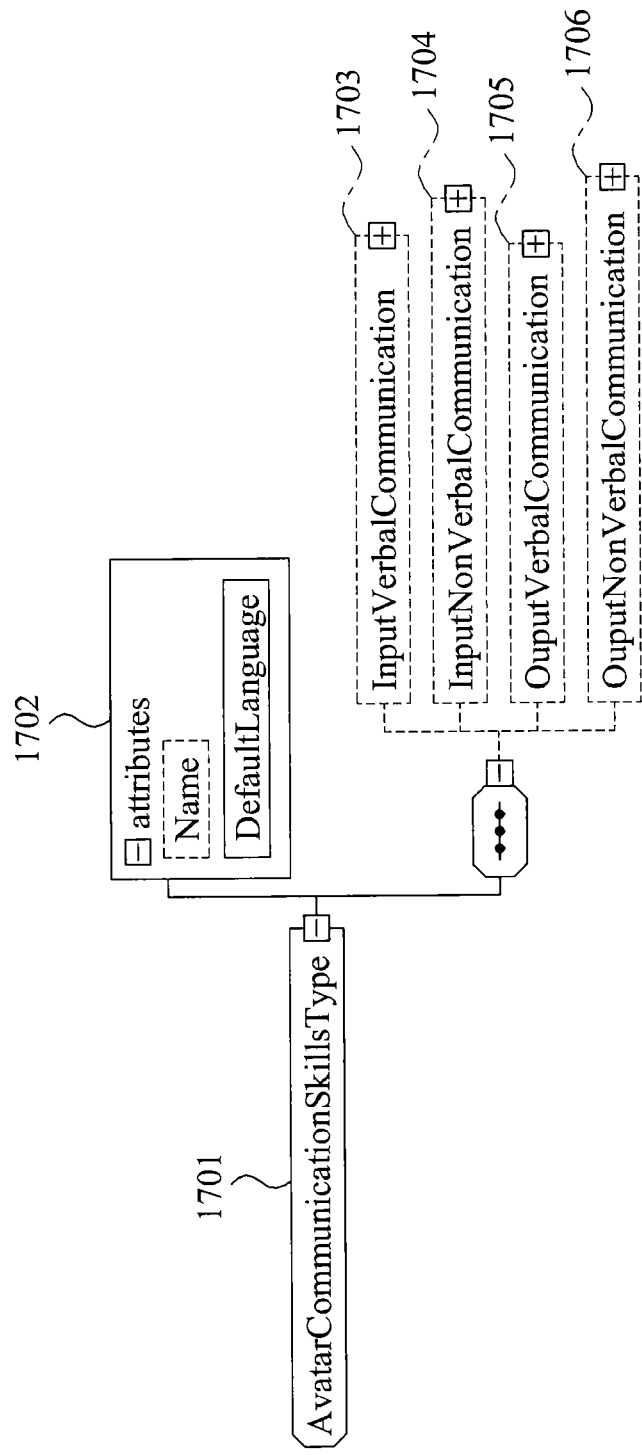
FIG. 22 illustrates a data structure of an avatar personality type, according to example embodiments.

FIG. 22 illustrates a data structure of an avatar communication skills type 1710, according to example embodiments.

Referring to FIG. 22, the avatar communication skills type 1701 may include attributes 1702 including name and default language and a plurality of elements 1703 to 1706, however, the present disclosure is not limited thereto.

The elements of the avatar communication skills type 1701 may include input verbal communication 1703, input nonverbal communication 1704, output verbal communication 1705, and output nonverbal communication 1706, however, the present disclosure is not limited thereto.

Depending on embodiments, the avatar communication skills type 1701 may be expressed using the XML, for example, as shown below in Source 56. However, a program source shown in Source 56 is not limiting and is only an example embodiment.

Source 56

```
<xsd:complexType name="AvatarCommunicationSkillsType">
<xsd:complexType name="AvatarCommunicationSkillsType">
    <xsd:sequence>
        <xsd:element name="InputVerbalCommunication" type="VerbalCommunicationType" minOccurs="0"/>
        <xsd:element name="InputNonVerbalCommmunication" type="NonVerbalCommunicationType" minOccurs="0"/>
        <xsd:element name="OutputVerbalCommunication" type="VerbalCommunicationType" minOccurs="0"/>
        <xsd:element name="OutputNonVerbalCommaunication" type="NonVerbalCommunicationType" minOccurs="0"/>
    </xsd:sequence>
    <xsd:attribute name="Name" type="xsd:string"/>
    <xsd:attribute name="DefaultLanguage" use="required" type="xsd:string"/>
</xsd:complexType>
    <xsd:sequence>
        <xsd:element name="InputVerbalCommunication" type="VerbalCommunicationType" minOccurs="0"/>
        <xsd:element name="InputNonVerbalCommunication" type="NonVerbalCommunicationType" minOccurs="0"/>
        <xsd:element name="OutputVerbalCommunication" type="VerbalCommunicationType" minOccurs="0"/>
        <xsd:element name="OutputNonVerbalCommaunication" type="NonVerbalCommunicationType" minOccurs="0"/>
    </xsd:sequence>
    <xsd:attribute name="Name" type="xsd:string"/>
```

-continued

| Source 56 |
|---|
| <xsd:attribute name="DefaultLanguage" type="xsd:string" use="required"/><br></xsd:complexType> |

Table 56-1 shows example binary representation syntax corresponding to the avatar communication skills type 1701, according to the example embodiments.

TABLE 56-1

| AvatarCommunicationSkillsType{ | Number of bits | Mnemonic |
|---|---|---|
| InputVerbalCommunicationFlag | 1 | bslbf |
| InputNonVerbalCommunicationFlag | 1 | bslbf |
| OutputVerbalCommunicationFlag | 1 | bslbf |
| OutputNotVerbalCommaunicationFlag | 1 | bslbf |
| NameFlag | 1 | bslbf |
| if(InputVerbalCommunicationFlag){ | | |
| InputVerbalCommunication | | InputVerbalCommunicationType |
| } | | |
| if(InputNonVerbalCommunicationFlag){ | | |
| InputNonVerbalCommunication | | InputNonVerbalCommunicationType |
| } | | |
| if(OutputVerbalCommunicationFlag){ | | |
| OutputVerbalCommunication | | OutputVerbalCommunicationType |
| } | | |
| if(OutputNonVerbalCommaunicationFlag){ | | |
| OutputNonVerbalCommaunication | | OutputNonVerbalCommaunicationType |
| } | | |
| if(NameFlag ){ | | |
| NameLength | | vluimsbf5 |
| Name | 8" | bslbf |
| | NameLength | |
| } | | |
| DefaultLanguageLength | | vluimsbf5 |
| DefaultLanguage | 8" | bslbf |
| | DefaultLanguageLength | |
| } | | |

Table 56-2 shows example descriptor components semantics of the avatar communication skills type 1701, according to the example embodiments.

TABLE 56-2

| Names | Description |
|---|---|
| AvatarCommunicationSkillsType | Defines the avatar communication skills. |
| InputVerbalCommunicationFlag | This field, which is only present in the binary representation signals the presence of the InputVerbalCommunication element. "1" means that the element shall be used. "0" means that the element shall not be used. |
| InputNonVerbalCommunicationFlag | This field, which is only present in the binary representation, signals the presence of the InputNonVerbalCommunication element. "1" means that the element shall be used. "0" means that the element shall not be used. |
| OutputVerbalCommunicationFlag | This field, which is only present in the binary representation sigials the presence of the OutputVerbalCommunication element. "1" means that the element shall be used. "0" means that the element shall not be used. |
| OutputNonVerbalCommaunicationFlag | This field, which is only present in the binary representation signals the presence of the OutputNonVerbalCommaunication element. "1" means that the element shall be used. "0" means that the element shall not be used. |
| NameFlag | This field, which is only present in the binary representation signals the presence of the Name element. "1" means that the element shall be used. "0" means that the element shall not be used. |

TABLE 56-2-continued

| Names | Description |
|---|---|
| InputVerbalCommunication | Defines the input verbal (voice and text) communication skills of the avatar |
| InputNonVerbalCommunication | Defines the input non-verbal (body gesture) communication skills of the avatar |
| OutputVerbalCommunication | Defines the output verbal (voice and text) communication skills of the avatar |
| OutputNonVerbalCommaunication | Defines the output non-verbal (body gesture) communication skills of the avatar |
| NameLength | This field, which is only present in the binary representation, specifies the length of the following Name element. |
| Name | A user defined chain of characters used for addressing the CommunicationType element. |
| DefaultLanguageLength | This field, which is only present in the binary representation, specifies the length of the following DefaultLanguage element. |
| DefaultLanguage | The native language of the avatar (e.g. English, French). |

Figure 23:
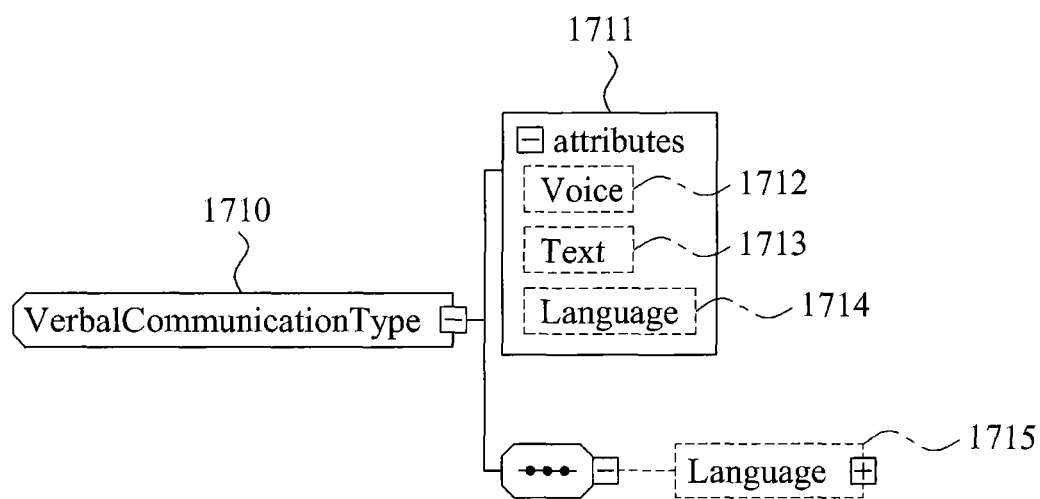
FIG. 23 illustrates a data structure of a verbal communication type, according to example embodiments.

FIG. 23 illustrates a data structure of a verbal communication type 1710, according to example embodiments.

Referring to FIG. 23, the verbal communication type 1710 may include attributes 1711 including voice 1712, text 1713, and language 1714, and elements of language 1715.

Depending on embodiments, the verbal communication type 1710 may be expressed using the XML, for example, as shown below in Source 57. However, a program source shown in Source 57 is not limiting and is only an example embodiment.

Source 57

```
<xsd:complexType name="VerbalCommunicationType">
<xsd:sequence>
```

-continued

Source 57

```
<xsd:element name="Language" type="LanguageType" minOccurs="0"/>
</xsd:sequence>
<xsd:attribute name="Voice" type="CommunicationPreferenceLevelType"/>
<xsd:attribute name="Text" type="CommunicationPreferenceLevelType"/>
<xsd:attribute name="PreferredLanguage" type="xsd:string"/>
</xsd:complexType>
```

Table 57-1 shows example binary representation syntax corresponding to the verbal communication type 1710, according to the example embodiments.

TABLE 57-1

| VerbalCommunicationType{ | Number of bits | Mnemonic |
|---|---|---|
| VoiceFlag | 1 | bslbf |
| TextFlag | 1 | bslbf |
| PreferredLanguageFlag | 1 | bslbf |
| LanguageFlag | 1 | bslbf |
| if(VoiceFlag){ | | |
| Voice | | CommunicationPreferenceLevelType |
| } | | |
| if(TextFlag){ | | |
| Text | | CommunicationPreferenceLevelType |
| } | | |
| if(PreferredLanguageFlag){ | | |
| PreferredLanguageLength | | vluimsbf5 |
| PreferredLanguage | 8* PreferredLanguageLength | bslbf |
| } | | |
| if(LanguageFlag){ | | |
| Language | | LanguageType |
| } | | |
| } | | |

Table 57-2 shows example descriptor components semantics of the verbal communication type 1710, according to the example embodiments.

TABLE 57-2

| Names | Description |
|---|---|
| VerbalCommunicationType | Defines the avatar personality. |
| VoiceFlag | This field, which is only present in the binary representation, sigials the presence of the Voice element. "1" means that the element shall be used. "0" means that the element shall not be used. |
| TextFlag | This field, which is only present in the binary representation, sigials the presence of the Text element. "1" means that the element shall be used. "0" means that the element shall not be used. |
| PreferredLanguageFlag | This field, which is only present in the binary representation, signals the presence of the PreferredLanguage element. "1" means that the element shall be used. "0" means that the element shall not be used. |
| LanguageFlag | This field, which is only present in the binary representation, signals the presence of the Language element. "1" means that the element shall be used. "0" means that the element shall not be used. |
| Voice | Defines if the avatar is able or prefers to speak when used for OutputVerbalCommunication and understand when used for InputVerbalCommunication. |
| Text | Defines if the avatar is able or prefers to write when used for OutputVerbalCommunication and read when used for InputVerbalCommunication. |
| PreferredLanguageLength | This field, which is only present in the binary representation, specifies the length of the following PreferredLanguage element. |
| PreferredLanguage | Defines the preferred language for verbal communication |
| Language | Defines the preferred language for verbal communication |

Figure 24:
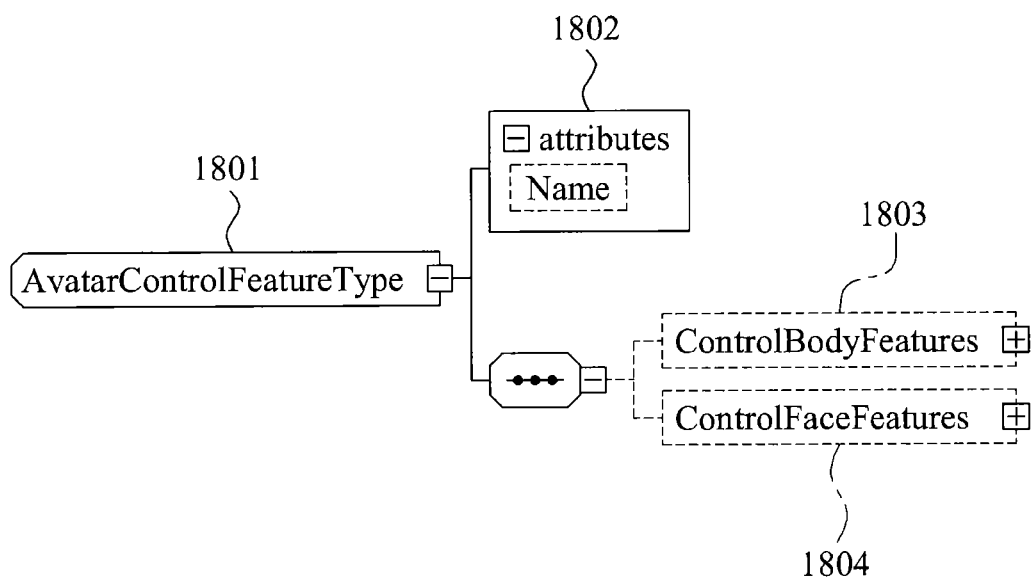
FIG. 24 illustrates a data structure of an avatar control features type, according to example embodiments.

FIG. 24 illustrates a data structure of an avatar control features type 1801, according to example embodiments.

Referring to FIG. 24, the avatar control features type 1801 may include attributes 1802 including name and elements including control body features 1803 and control face features 1804, however, the present disclosure is not limited thereto.

Depending on embodiments, the avatar control features type 1801 may be expressed using the XML, for example, as shown below in Source 58. However, a program source shown in Source 58 is not limiting and is only an example embodiment.

```
Source 58

<!-- ############################################## -->
<!-- Avatar Control Features Type                   -->
<!-- ############################################## -->
<complexType name="AvatarControlFeaturesType">
    <sequence>
        <element name="ControlBodyFeatures"
type="vwoc:ControlBodyFeaturesType" minOccurs="0"/>
        <element name="ControlFaceFeatures"
type="vwoc:ControlFaceFeaturesType" minOccurs="0"/>
    </sequence>
    <attribute name="name" type="string"/>
</complexType>
```

Table 58-1 shows example binary representation syntax corresponding to the avatar control features type 1801, according to the example embodiments.

TABLE 58-1

| AvatarControlFeaturesType { | Number of bits | Mnemonic: |
|---|---|---|
| ControlBodyFeaturesFlag | 1 | bslbf |
| ControlFaceFeaturesFlag | 1 | bslbf |
| if(ControlBodyFeaturesFlag){ | | |
| ControlBodyFeatures | | ControlBodyFeaturesType |
| } | | |
| if(ControlFaceFeaturesFlag){ | | |
| ControlFaceFeatures | | ControlFaceFeaturesType |
| } | | |
| Name | See ISO 10646 | UTF-8 |
| } | | |

Table 58-2 shows example descriptor components semantics of the avatar control features type 1801, according to the example embodiments.

TABLE 58-2

| Names | Description |
|---|---|
| AvatarControlFeaturesType | Contains a set of descriptors defining possible place-holders for sensors on body skeleton and face feature points. |

TABLE 58-2-continued

| Names | Description |
|---|---|
| ControlBodyFeaturesFlag | This field, which is only present in the binary representation, signals the presence of the ControlBodyFeatures element. "1" means that the element shall be used. "0" means that the element shall not be used. |
| ControlFaceFeaturesFlag | This field, which is only present in the binary representation, signals the presence of the ControlFaceFeatures element. "1" means that the element shall be used. "0" means that the element shall not be used. |
| ControlBodyFeatures | Set of elements that control moves of the body (bones) |
| ControlFaceFeatures | Set of elements that control moves of the face |
| Name | String that specifies the name of control features |

Figure 25:
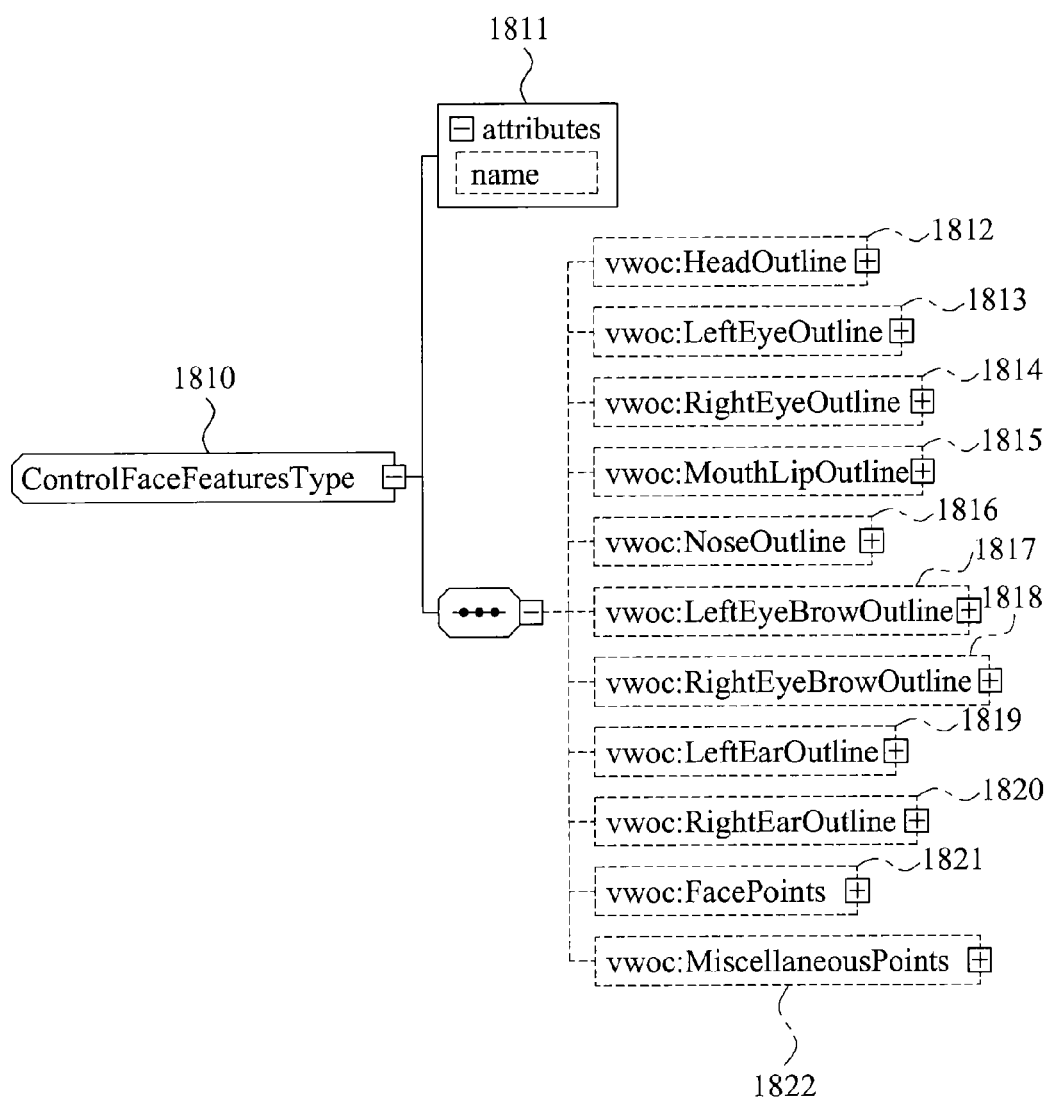
FIG. 25 illustrates a data structure of a control face features type, according to example embodiments.

FIG. 25 illustrates a data structure of a control face features type 1810, according to example embodiments.

Referring to FIG. 25, the control face features type 1810 may include attributes 1811 including name and a plurality of elements 1812 to 1822, however, the present disclosure is not limited thereto.

The elements of the control face features type 1810 may include head outline 1812, left eye outline 1813, right eye outline 1814, mouth lip outline 1815, nose outline 1816, left eye brow outline 1817, right eye brow outline 1818, left ear outline 1819, right ear outline 1820, face points 1821, and miscellaneous points 1822; however, the present disclosure is not limited thereto.

Depending on embodiments, the control face features type 1810 may be expressed using the XML, for example, as shown below in Source 59. However, a program source shown in Source 59 is not limiting and is only an example embodiment.

Source 59

```
<!-- ################################################## -->
<!-- Control Face Features Type                         -->
<!-- ################################################## -->
<complexType name="ControlFaceFeaturesType">
    <sequence>
        <element name="HeadOutline" type="vwoc:OutlineType"
```

-continued

Source 59

```
minOccurs="0"/>
        <element name="LeftEyeOutline" type="vwoc:OutlineType"
minOccurs="0"/>
        <element name="RightEyeOutline" type="vwoc:OutlineType"
minOccurs="0"/>
        <element name="MouthLipOutline" type="vwoc:OutlineType"
minOccurs="0"/>
        <element name="NoseOutline" type="vwoc:OutlineType"
minOccurs="0"/>
        <element name="LeftEyeBrowOutline"
type="vwoc:Outline4PointsType" minOccurs="0"/>
        <element name="RightEyeBrowOutline"
type="vwoc:Outline4PointsType" minOccurs="0"/>
        <element name="LeftEarOutline"
type="vwoc:Outline4PointsType" minOccurs="0"/>
        <element name="RightEarOutline"
type="vwoc:Outline4PointsType" minOccurs="0"/>
        <element name="FacePoints" type="vwoc:OutlineType"
minOccurs="0"/>
        <element name="MiscellaneousPoints" type="vwoc:PointType"
minOccurs="0" maxOccurs="unbounded"/>
    </sequence>
    <attribute name="name" type="string"/>
</complexType>
```

Table 59-1 shows example binary representation syntax corresponding to the control face features type 1810, according to the example embodiments.

TABLE 59-1

| ControlFaceFeaturesType { | Number of bits | Mnemonic |
|---|---|---|
| HeadOutlineFlag | 1 | bslbf |
| LeftEyeOutlineFlag | 1 | bslbf |
| RightEyeOutlineFlag | 1 | bslbf |
| MouthLipOutlineFlag | 1 | bslbf |
| NoseOutlineFlag | 1 | bslbf |
| LeftEyeBrowOutlineFlag | 1 | bslbf |
| RightEyeBrowOutlineFlag | 1 | bslbf |
| LeftEarOutlineFlag | 1 | bslbf |
| RightEarOutlineFlag | 1 | bslbf |
| FacePointsFlag | 1 | bslbf |
| MiscellaneousPointsFlag | 1 | bslbf |
| NameFlag | 1 | bslbf |
| if(HeadOutlineFlag){ | | |
| HeadOutline | | OutlineType |
| } | | |
| if(LeftEyeOutlineFlag){ | | |
| LeftEyeOutline | | OutlineType |
| } | | |
| if(RightEyeOutlineFlag){ | | |
| RightEyeOutline | | OutlineType |
| } | | |
| if(MouthLipOutlineFlag){ | | |
| MouthLipOutline | | OutlineType |
| } | | |
| if(NoseOutlineFlag){ | | |
| NoseOutline | | OutlineType |

TABLE 59-1-continued

| ControlFaceFeaturesType { | Number of bits | Mnemonic |
|---|---|---|
| } | | |
| if(LeftEyeBrowOutlineFlag){ | | |
| LeftEyeBrowOutline | | Outline4PointsType |
| } | | |
| if(RightEyeBrowOutlineFlag){ | | |
| RightEyeBrowOutline | | Outline4PointsType |
| } | | |
| if(LeftEarOutlineFlag){ | | |
| LeftEarOutline) | | Outline4PointsType |
| } | | |
| if(RightEarOutlineFlag){ | | |
| RightEarOutline | | Outline4PointsType |
| } | | |
| if(FacePointsFlag){ | | |
| FacePoints | | OutlineType |
| } | | |
| if(MiscellaneousPointsFlag){ | | |
| LoopMiscellaneousPoints | | vluimsbf5 |
| for(k = 0; k < LoopMiscellaneousPoints; k++){ | | |
| MiscellaneousPoints[k] | | PointType |
| } | | |
| } | | |
| if(NameFlag){ | | |
| Name | See ISO 10646 | UTF-8 |
| } | | |
| } | | |

Table 59-2 shows example descriptor components semantics of the control face features type 1810, according to the example embodiments.

TABLE 59-2

| Names | Description |
|---|---|
| ControlFaceFeaturesType | Defines the control points of face animation. |
| HeadOutlineFlag | This field, which is only present in the binary representation, signals the presence of the HeadOutline element. "1" means that the element shall be used. "0" means that the element shall not be used. |
| LeftEyeOutlineFlag | This field, which is only present in the binary representation, signals the presence of the LeftEyeOutline element. "1" means that the element shall be used. "0" means that the element shall not be used. |
| RightEyeOutlineFlag | This field, which is only present in the binary representation, signals the presence of the RightEyeOutline element. "1" means that the element shall be used. "0" means that the element shall not be used. |
| MouthLipOutlineFlag | This field, which is only present in the binary representation, signals the presence of the MouthLipOutline element. "1" means that the element shall be used, "0" means that the element shall not be used. |
| NoseOutlineFlag | This field, which is only present in the binary representation, signals the presence of the NoseOutline element. "1" means that the element shall be used. "0" means that the element shall not be used. |
| LeftEyeBrowOutlineFlag | This field, which is only present in the binary representation, signals the presence of the LeftEyeBrowOutline element. "1" means that the element shall be used. "0" means that the element shall not be used. |
| RightEyeBrowOutlineFlag | This field, which is only present in the binary representation, signals the presence of the RightEyeBrowOutline element, "1" means that the element shall be used. "0" means that the element shall not be used. |
| LeftEarOutlineFlag | This field, which is only present in the binary representation, signals the presence of the LeftEarOutline element. "1" means that the element shall be used. "0" means that the element shall not be used. |
| RightEarOutlineFlag | This field, which is only present in the binary representation, signals the presence of the RightEarOutline element. "1" means that the element shall be used. "0" means that the element shall not be used. |
| FacePointsFlag | This field, which is only present in the binary representation, signals the presence of the FacePoints element, "1" means that the element shall be used. "0" means that the element shall not be used. |
| MiscellaneousPointsFlag | This field, which is only present in the binary representation, signals the presence of the MiscellaneousPoints element, "1" means that the element shall be used. "0" means that the element shall not be used. |
| NameFlag | This field, which is only present in the binary representation, signals the presence of the Name attribute. "1" means that the element shall be used. "0" means that the element shall not be used. |
| HeadOutline | Describes the outline of the head. |
| LeftEyeOutline | Describes the outline of the left eye. |

TABLE 59-2-continued

| Names | Description |
|---|---|
| RightEyeOutline | Describes the outline of the right eye. |
| MouthLipOutline | Describes the outline of the mouth lips. |
| NoseOutline | Describes the outline of the nose. |
| LeftEyeBrowOutline | Describes the outline of the left eyebrow. |
| RightEyeBrowOutline | Describes the outline of the right eyebrow. |
| LeftEarOutline | Describes the outline of the left ears |
| RightEarOutline | Describes the outline of the right ears |
| FacePoints | Describes the facial points for a high resolution facial expression |
| LoopMiscellaneousPoints | This field, which is only present in the binary representation specifies the number of miscellaneous points. |
| MiscellaneousPoints | Describes the any arbitrary feature points can be placed and defined for an advanced facial feature control. |
| Name | Name of the Face Control configuration. |

Figure 26:
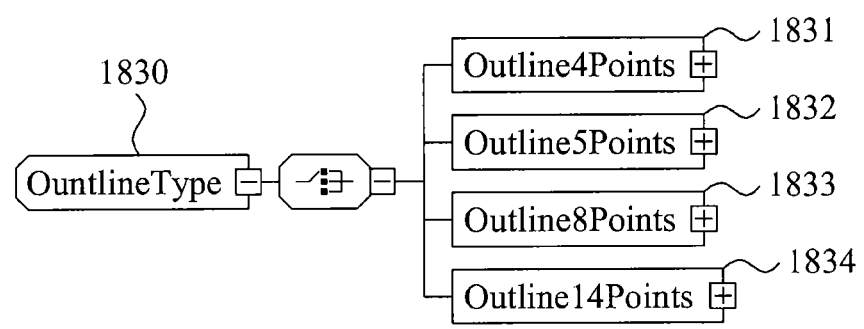
FIG. 26 illustrates a data structure of an outline type, according to example embodiments.

FIG. 26 illustrates a data structure of an outline type 1830, according to example embodiments.

Referring to FIG. 26, the outline type 1830 may include outline 4 points 1831, outline 5 points 1832, outline 8 points 1833, and outline 14 points 1834, however, the present disclosure is not limited thereto.

Depending on embodiments, the outline type 1830 may be expressed using the XML, for example, as shown below in Source 60. However, a program source shown in Source 60 is not limiting and is only an example embodiment.

Source 60

```
<!-- ################################################ -->
<!-- Outline Type                                     -->
<!-- ################################################ -->
<complexType name="OutlineType">
    <choice>
        <element name="Outline4Points"
            type="vwoc:Outline4PointsType"/>
        <element name="Outline5Points"
            type="vwoc:Outline5PointsType"/>
        <element name="Outline8Points"
            type="vwoc:Outline8PointsType"/>
        <element name="Outline14Points"
            type="vwoc:Outline14PointsType"/>
    </choice>
</complexType>
```

Table 60-1 shows example binary representation syntax corresponding to the outline type 1830, according to the example embodiments.

TABLE 60-1

| OutlineType { | Number of bits | Mnemonic |
|---|---|---|
| OutlineTypeSelect | | bslbf |
| if(OutlineTypeSelect ==0){ | | |
| Outline4Points | | Outline4PointsType |
| }else if(OutlineTypeSelect ==1){ | | |
| Outline5Points | | Outline5PointsType |
| }else if(OutlineTypeSelect ==2){ | | |
| Outline8Points | | Outline8PointsType |
| }else if(OutlineTypeSelect ==3){ | | |
| Outline14Points | | Outline14PointsType |
| } | | |
| } | | |

Table 60-2 shows example descriptor components semantics of the outline type 1830, according to the example embodiments.

TABLE 60-2

| Names | Description |
|---|---|
| OutlineType | contains 4 different types of outline dependent upon the number of points forming the outline |
| OutlineTypeSelect | Determines the outline type with the number of points (0: Outline4Points, 1: Outline5Points, 2: Outline8Points, 3: Outline14Points, 4-7: reserved) |
| Outline4Points | The outline with 4 points |
| Outline5Points | The outline with 5 points |
| Outline8Points | The outline with 8 points |
| Outline14Points | The outline with 14 points |

Depending on embodiments, the outline 4 points 1832 of the outline type 1830 may be expressed using the XML, for example, as shown below in Source 61. However, a program source shown in Source 61 is not limiting and is only an example embodiment.

Source 61

```
<!-- ################################################ -->
<!-- Outline 4 Points Type                            -->
<!-- ################################################ -->
<complexType name="Outline4PointsType">
    <sequence>
        <element name="Point1" type="vwoc:PointType"/>
        <element name="Point2" type="vwoc:PointType"/>
        <element name="Point3" type="vwoc:PointType"/>
        <element name="Point4" type="vwoc:PointType"/>
    </sequence>
</complexType>
```

Table 61-1 shows example binary representation syntax corresponding to the outline 4 points 1832 of the outline 1830, according to the example embodiments.

TABLE 61-1

| Outline4PointsType{ | Number of bits | Mnemonic |
|---|---|---|
| Point1 | | PointType |
| Point2 | | PointType |
| Point3 | | PointType |
| Point4 | | PointType |
| } | | |

Table 61-2 shows example descriptor components semantics of the outline 4 points 1832 of the outline 1830, according to the example embodiments.

TABLE 61-2

| Names | Description |
|---|---|
| Outline4PointsType | The points are numbered from the leftmost point by the counter-clockwise. For example, if there are 4 points at the left, top, right, bottom of the outline, they are Point1, Point2, Point3, Point4, respectively |
| Point1 | The 1st point of the outline |
| Point2 | The 2nd point of the outline |
| Point3 | The 3rd point of the outline |
| Point4 | The 4th point of the outline |

Depending on embodiments, the outline 5 points 1832 of the outline type 1830 may be expressed using the XML, for example, as shown below in Source 62. However, a program source shown in Source 62 is not limiting and is only an example embodiment.

Source 62

```
<!-- ################################################## -->
<!-- Outline 5 Points Type                               -->
<!-- ################################################## -->
<complexType name="Outline5PointsType">
    <sequence>
        <element name="Point1" type="vwoc:PointType"/>
        <element name="Point2" type="vwoc:PointType"/>
        <element name="Point3" type="vwoc:PointType"/>
        <element name="Point4" type="vwoc:PointType"/>
        <element name="Point5" type="vwoc:PointType"/>
    </sequence>
</complexType>
```

Table 62-1 shows example binary representation syntax corresponding to the outline 5 points 1832 of the outline 1830, according to the example embodiments.

TABLE 62-1

| Outline5PointsType{ | Number of bits | Mnemonic |
|---|---|---|
| Point1 | | PointType |
| Point2 | | PointType |
| Point3 | | PointType |
| Point4 | | PointType |
| Point5 | | PointType |
| } | | |

Table 62-2 shows example descriptor components semantics of the outline 5 points 1832 of the outline 1830, according to the example embodiments.

TABLE 62-2

| Names | Description |
|---|---|
| Outline5PointsType z,319 | |
| Point1 | The 1st point of the outline |
| Point2 | The 2nd point of the outline |
| Point3 | The 3rd point of the outline |
| Point4 | The 4th point of the outline |
| Point5 | The 5th point of the outline |

Depending on embodiments, the outline 8 points 1833 of the outline 1830 may be expressed using the XML, for example, as shown below in Source 63. However, a program source shown in Source 63 is not limiting and is only an example embodiment.

Source 63

```
<!-- ################################################## -->
<!-- Outline 8 Points Type                               -->
<!-- ################################################## -->
<complexType name="Outline8PointsType">
    <sequence>
        <element name="Point1" type="vwoc:PointType"/>
        <element name="Point2" type="vwoc:PointType"/>
        <element name="Point3" type="vwoc:PointType"/>
        <element name="Point4" type="vwoc:PointType"/>
        <element name="Point5" type="vwoc:PointType"/>
        <element name="Point6" type="vwoc:PointType"/>
        <element name="Point7" type="vwoc:PointType"/>
        <element name="Point8" type="vwoc:PointType"/>
    </sequence>
</complexType>
```

Table 63-1 shows example binary representation syntax corresponding to the outline 8 points 1833 of the outline 1830, according to the example embodiments.

TABLE 63-1

| Outline8PointsType{ | Number of bits | Mnemonic |
|---|---|---|
| Point1 | | PointType |
| Point2 | | PointType |
| Point3 | | PointType |
| Point4 | | PointType |
| Point5 | | PointType |
| Point6 | | PointType |
| Point7 | | PointType |
| Point8 | | PointType |
| } | | |

Table 63-2 shows example descriptor components semantics of the outline 8 points 1833 of the outline 1830, according to the example embodiments.

TABLE 63-2

| Names | Description |
|---|---|
| Outline8PointsType | |
| Point1 | The 1st point of the outline |
| Point2 | The 2nd point of the outline |
| Point3 | The 3rd point of the outline |
| Point4 | The 4th point of the outline |
| Point5 | The 5th point of the outline |
| Point6 | The 6th point of the outline |
| Point7 | The 7th point of the outline |
| Point8 | The 8th point of the outline |

Depending on embodiments, the outline 14 points 1834 of the outline 1830 may be expressed using the XML, for example, as shown below in Source 64. However, a program source shown in Source 64 is not limiting and is only an example embodiment.

Source 64

```
<!-- ################################################## -->
<!-- Outline 14 Points Type                              -->
<!-- ################################################## -->
<complexType name="Outline14PointsType">
    <sequence>
        <element name="Point1" type="vwoc:PointType"/>
        <element name="Point2" type="vwoc:PointType"/>
        <element name="Point3" type="vwoc:PointType"/>
        <element name="Point4" type="vwoc:PointType"/>
        <element name="Point5" type="vwoc:PointType"/>
```

-continued

| Source 64 |
|---|
| <element name="Point6" type="vwoc:PointType"/><br><element name="Point7" type="vwoc:PointType"/><br><element name="Point8" type="vwoc:PointType"/><br><element name="Point9" type="vwoc:PointType"/><br><element name="Point10" type="vwoc:PointType"/><br><element name="Point11" type="vwoc:PointType"/><br><element name="Point12" type="vwoc:PointType"/><br><element name="Point13" type="vwoc:PointType"/><br><element name="Point14" type="vwoc:PointType"/><br>    </sequence><br></complexType> |

Table 64-1 shows example binary representation syntax corresponding to the outline 14 points 1834 of the outline 1830, according to the example embodiments.

TABLE 64-1

| Outline14PointsType{ | Number of bits | Mnemonic |
|---|---|---|
| Point1 |  | PointType |
| Point2 |  | PointType |
| Point3 |  | PointType |
| Point4 |  | PointType |
| Point5 |  | PointType |
| Point6 |  | PointType |
| Point7 |  | PointType |
| Point8 |  | PointType |
| Point9 |  | PointType |
| Point10 |  | PointType |
| Point11 |  | PointType |
| Point12 |  | PointType |
| Point13 |  | PointType |
| Point14 |  | PointType |
| } |  |  |

Table 64-2 shows example descriptor components semantics of the outline 14 points 1834 of the outline 1830, according to the example embodiments.

TABLE 64-2

| Names | Description |
|---|---|
| Outline14PointsType |  |
| Point1 | The 1st point of the outline |
| Point2 | The 2nd point of the outline |

TABLE 64-2-continued

| Names | Description |
|---|---|
| Point3 | The 3rd point of the outline |
| Point4 | The 4th point of the outline |
| Point5 | The 5th point of the outline |
| Point6 | The 6th point of the outline |
| Point7 | The 7th point of the outline |
| Point8 | The 8th point of the outline |
| Point9 | The 9rd point of the outline |
| Point10 | The 10th point of the outline |
| Point11 | The 11th point of the outline |
| Point12 | The 12th point of the outline |
| Point13 | The 13th point of the outline |
| Point14 | The 14th point of the outline |

Figure 27:
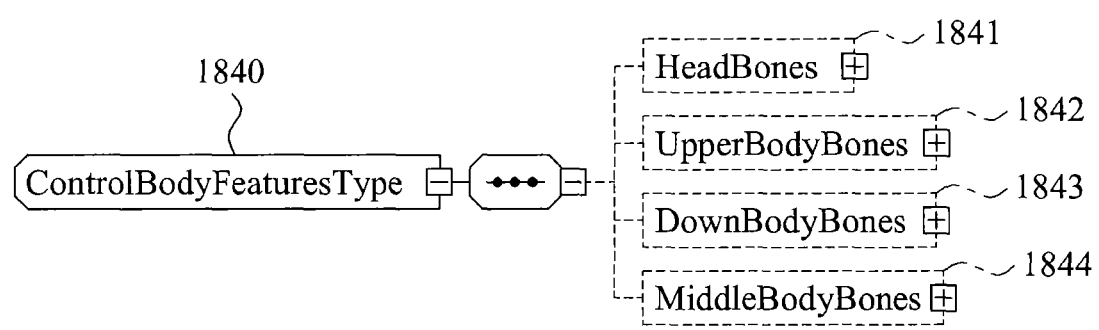
FIG. 27 illustrates a data structure of a control body features type, according to example embodiments.

FIG. 27 illustrates a data structure of a control body features type 1840, according to example embodiments.

Referring to FIG. 27, the control body features type 1840 may include head bones 1841, upper body bones 1842, down body bones 1843, and middle body bones 1844, however, the present disclosure is not limited thereto.

Depending on embodiments, the control body features type 1840 may be expressed using the XML, for example, as shown below in Source 65. However, a program source shown in Source 65 is not limiting and is only an example embodiment.

| Source 65 |
|---|
| <!-- ################################################# --><br><!-- Control Body Features Type                        --><br><!-- ################################################# --><br><complexType name="ControlBodyFeaturesType"><br>    <sequence><br>        <element name="HeadBones"<br>        type="vwoc:HeadBonesType" minOccurs="0"/><br>        <element name="UpperBodyBones"<br>type="vwoc:UpperBodyBonesType" minOccurs="0"/><br>        <element name="DownBodyBones"<br>type="vwoc:DownBodyBonesType" minOccurs="0"/><br>        <element name="MiddleBodyBones"<br>type="vwoc:MiddleBodyBonesType" minOccurs="0"/><br>    </sequence><br></complexType> |

Table 65-1 shows example binary representation syntax corresponding to the control body features type 1840, according to the example embodiments.

TABLE 65-1

| ControlBodyFeaturesType{ | Number of bits | Mnemonic |
|---|---|---|
| HeadBonesFlag | 1 | bslbf |
| UpperBodyBonesFlag | 1 | bslbf |
| DownBodyBonesFlag | 1 | bslbf |
| MiddleBodyBonesFlag | 1 | bslbf |
| If(HeadBonesFlag){ |  |  |
|   HeadBones |  | HeadBonesType |
| } |  |  |
| If(UpperBodyBonesFlag){ |  |  |
|   UpperBodyBones |  | UpperBodyBonesType |
| } |  |  |
| If(DownBodyBonesFlag){ |  |  |
|   DownBodyBones |  | DownBodyBonesType |
| } |  |  |
| If(MiddleBodyBonesFlag){ |  |  |
|   MiddleBodyBones |  | MiddleBodyBonesType |
| } |  |  |
| } |  |  |

Table 65-2 shows example descriptor components semantics of the control body features type 1840, according to the example embodiments.

TABLE 65-2

| Names | Description |
|---|---|
| ControlBodyFeaturesType | Defines the body features for Controlling avatar |
| HeadBonesFlag | This field, which is only present in the binary representation, signals the presence of the HeadBones element. "1" means that the element shall be used. "0" means that the element shall not be used. |
| UpperBodyBonesFlag | This field, which is only present in the binary representation, signals the presence of the UpperBodyBones element. "1" means that the element shall be used. "0" means that the element shall not be used. |
| DownBodyBonesFlag | This field, which is only present in the binary representation, signals the presence of the DownBodyBones element. "1" means that the element shall be used. "0" means that the element shall not be used. |
| MiddleBodyBonesFlag | This field, which is only present in the binary representation, signals the presence of the MiddleBodyBones element. "1" means that the element shall be used. "0" means that the element shall not be used. |
| HeadBones | Set of bones on the head. |
| UpperBodyBones | Set of bones on the upper part of the body, mainly arms and hands bones. |
| DownBodyBones | Set of bones on the down part of the body, mainly legs and foot bones. |
| MiddleBodyBones | Set of bones on the middle body, torso. |

Depending on embodiments, the head bones 1841 of the control body features type 1840 may be expressed using the XML, for example, as shown below in Source 66. However, a program source shown in Source 66 is not limiting and is only an example embodiment.

```
Source 66

<!-- ################################################### -->
<!-- Head Bones Type                                      -->
<!-- ################################################### -->
<complexType name="HeadBonesType">
    <sequence>
        <element name="CervicalVerbae7" type="string"
            minOccurs="0"/>
        <element name="CervicalVerbae6" type="string"
            minOccurs="0"/>
        <element name="CervicalVerbae5" type="string"
            minOccurs="0"/>
        <element name="CervicalVerbae4" type="string"
            minOccurs="0"/>
        <element name="CervicalVerbae3" type="string"
            minOccurs="0"/>
        <element name="CervicalVerbae2" type="string"
            minOccurs="0"/>
        <element name="CervicalVerbae1" type="string"
            minOccurs="0"/>
        <element name="Skull" type="string" minOccurs="0"/>
        <element name="LEyelid" type="string" minOccurs="0"/>
        <element name="REyelid" type="string" minOccurs="0"/>
        <element name="LEyeball" type="string" minOccurs="0"/>
        <element name="REyeball" type="string" minOccurs="0"/>
        <element name="LEyebrow" type="string" minOccurs="0"/>
        <element name="REyebrow" type="string" minOccurs="0"/>
        <element name="Jaw" type="string" minOccurs="0"/>
    </sequence>
</complexType>
```

Table 66-1 shows example binary representation syntax corresponding to the head bones 1841 of the control body features type 1840, according to the example embodiments.

TABLE 66-1

| HeadBonesType{ | Number of bits | Mnemonic |
|---|---|---|
| CervicalVerbae7Flag | 1 | bslbf |
| CervicalVerbae6Flag | 1 | bslbf |
| CervicalVerbae5Flag | 1 | bslbf |
| CervicalVerbae4Flag | 1 | bslbf |
| CervicalVerbae3Flag | 1 | bslbf |
| CervicalVerbae2Flag | 1 | bslbf |
| CervicalVerbae1Flag | 1 | bslbf |
| SkullFlag | 1 | bslbf |
| LEyelidFlag | 1 | bslbf |
| REyelidFlag | 1 | bslbf |
| LEyeballFlag | 1 | bslbf |
| REyeballFlag | 1 | bslbf |
| LEyebrowFlag | 1 | bslbf |
| REyebrowFlag | 1 | bslbf |
| JawFlag | 1 | bslbf |
| If(CervicalVerbae7Flag){ | | |
|    CervicalVerbae7 | See ISO 10646 | UTF-8 |
| } | | |
| If(CervicalVerbae6Flag){ | | |
|    CervicalVerbae6 | See ISO 10646 | UTF-8 |
| } | | |
| If(CervicalVerbae5Flag){ | | |
|    CervicalVerbae5 | See ISO 10646 | UTF-8 |
| } | | |
| If(CervicalVerbae4Flag){ | | |
|    CervicalVerbae4 | See ISO 10646 | UTF-8 |
| } | | |
| If(CervicalVerbae3Flag){ | | |
|    CervicalVerbae3 | See ISO 10646 | UTF-8 |
| } | | |
| If(CervicalVerbae2Flag){ | | |
|    CervicalVerbae2 | See ISO 10646 | UTF-8 |
| } | | |
| If(CervicalVerbae1Flag){ | | |
|    CervicalVerbae1 | See ISO 10646 | UTF-8 |
| } | | |
| If(SkullFlag){ | | |
|    Skull | See ISO 10646 | UTF-8 |
| } | | |
| If(LEyelidFlag){ | | |
|    LEyelid | See ISO 10646 | UTF-8 |
| } | | |
| If(REyelidFlag){ | | |
|    REyelid | See ISO 10646 | UTF-8 |
| } | | |
| If(LEyeballFlag){ | | |
|    LEyeball | See ISO 10646 | UTF-8 |
| } | | |
| If(REyeballFlag){ | | |

TABLE 66-1-continued

| HeadBonesType{ | Number of bits | Mnemonic |
|---|---|---|
| REyeball | See ISO 10646 | UTF-8 |
| } | | |
| If(LEyebrowFlag){ | | |
| LEyebrow | See ISO 10646 | UTF-8 |
| } | | |
| If(REyebrowFlag){ | | |
| REyebrow | See ISO 10646 | UTF-8 |
| } | | |

TABLE 66-1-continued

| HeadBonesType{ | Number of bits | Mnemonic |
|---|---|---|
| If(JawFlag){ | | |
| Jaw | See ISO 10646 | UTF-8 |
| } | | |
| } | | |

Table 66-2 shows example descriptor components semantics of the head bones 1841 of the control body features type 1840, according to the example embodiments.

TABLE 66-2

| Names | Description |
|---|---|
| ControlBodyFeaturesType | Defines the body features for controlling avatar |
| CervicalVerbae7Flag | This field, which is only present in the binary representation, signals the presence of the CervicalVerbae7 element. "1" means that the element shall be used. "0" means that the element shall not be used. |
| CervicalVerbae6Flag | This field, which is only present in the binary representation, signals the presence of the CervicalVerbae6 element. "1" means that the element shall be used. "0" means that the element shall not be used. |
| CervicalVerbae5Flag | This field, which is only present in the binary representation, signals the presence of the CervicalVerbae5 element. "1" means that the element shall be used. "0" means that the element shall not be used. |
| CervicalVerbae4Flag | This field, which is only present in the binary representation, signals the presence of the CervicalVerbae4 element. "1" means that the element shall be used. "0" means that the element shall not be used. |
| CervicalVerbae3Flag | This field, which is only present in the binary representation, signals the presence of the CervicalVerbae3 element. "1" means that the element shall be used. "0" means that the element shall not be used. |
| CervicalVerbae2Flag | This field, which is only present in the binary representation, signals the presence of the CervicalVerbae2 element. "1" means that the element shall be used. "0" means that the element shall not be used. |
| CervicalVerbae1Flag | This field, which is only present in the binary representation, signals the presence of the CervicalVerbae1 element. "1" means that the element shall be used. "0" means that the element shall not be used. |
| SkullFlag | This field, which is only present in the binary representation, signals the presence of the Skull element. "1" means that the element shall be used. "0" means that the element shall not be used. |
| LEyelidFlag | This field, which is only present in the binary representation, signals the presence of the LEyelid element. "1" means that the element shall be used. "0" means that the element shall not be used. |
| REyelidFlag | This field, which is only present in the binary representation, signals the presence of the REyelid element. "1" means that the element shall be used. "0" means that the element shall not be used. |
| LEyeballFlag | This field, which is only present in the binary representation, signals the presence of the LEyeball element. "1" means that the element shall be used. "0" means that the element shall not be used. |
| REyeballFlag | This field, which is only present in the binary representation, signals the presence of the REyeball element. "1" means that the element shall be used. "0" means that the element shall not be used. |
| LEyebrowFlag | This field, which is only present in the binary representation, signals the presence of the LEyebrow element. "1" means that the element shall be used. "0" means that the element shall not be used. |
| REyebrowFlag | This field, which is only present in the binary representation, signals the presence of the REyebrow element. "1" means that the element shall be used. "0" means that the element shall not be used. |
| JawFlag | This field, which is only present in the binary representation, signals the presence of the Jaw element. "1" means that the element shall be used. "0" means that the element shall not be used. |
| CervicalVerbae7 | cervical vertebrae 7 |
| CervicalVerbae6 | cervical vertebrae 6 |
| CervicalVerbae5 | cervical vertebrae 5 |
| CervicalVerbae4 | cervical vertebrae 4 |
| CervicalVerbae3 | cervical vertebrae 3 |
| CervicalVerbae2 | cervical vertebrae 2 |
| CervicalVerbae1 | cervical vertebrae 1 |
| Skull | Skull |
| LEyelid | Left Eyelid |
| REyelid | Right Eyelid |
| LEyeball | Left Eyeball |
| REyeball | Right Eyeball |
| LEyebrow | Left Eyebrow |

TABLE 66-2-continued

| Names | Description |
|---|---|
| REyebrow | Right Eyebrow |
| Jaw | Jaw |

Depending on embodiments, the upper body bones 1842 of the control body features type 1840 may be expressed using the XML, for example, as shown below in Source 67. However, a program source shown in Source 67 is not limiting and is only an example embodiment.

---
Source 67
---

```
<!-- ################################################## -->
<!-- Upper Body Bones Type                               -->
<!-- ################################################## -->
<complexType name="UpperBodyBonesType">
    <sequence>
        <element name="LClavicle" type="string" minOccurs="0"/>
        <element name="LScapulae" type="string" minOccurs="0"/>
        <element name="LHumerus" type="string" minOccurs="0"/>
        <element name="LRadius" type="string" minOccurs="0"/>
        <element name="LWrist" type="string" minOccurs="0"/>
        <element name="LHand" type="string" minOccurs="0"/>
        <element name="LThumb" type="string" minOccurs="0"/>
        <element name="LPhalanges1" type="string" minOccurs="0"/>
        <element name="LThumb2" type="string" minOccurs="0"/>
        <element name="LPhalanges2" type="string" minOccurs="0"/>
        <element name="LIndex" type="string" minOccurs="0"/>
        <element name="LPhalanges3" type="string" minOccurs="0"/>
        <element name="LPhalanges4" type="string" minOccurs="0"/>
        <element name="LPhalanges5" type="string" minOccurs="0"/>
        <element name="LMiddle" type="string" minOccurs="0"/>
        <element name="LPhalanges6" type="string" minOccurs="0"/>
        <element name="LPhalanges7" type="string" minOccurs="0"/>
        <element name="LPhalanges8" type="string" minOccurs="0"/>
        <element name="LRing" type="string" minOccurs="0"/>
        <element name="LPhalanges9" type="string" minOccurs="0"/>
        <element name="LPhalanges10" type="string" minOccurs="0"/>
        <element name="LPhalanges11" type="string" minOccurs="0"/>
        <element name="LPinky" type="string" minOccurs="0"/>
        <element name="LPhalanges12" type="string" minOccurs="0"/>
        <element name="LPhalanges13" type="string" minOccurs="0"/>
        <element name="LPhalanges14" type="string" minOccurs="0"/>
        <element name="RClavicle" type="string" minOccurs="0"/>
        <element name="RScapulae" type="string" minOccurs="0"/>
        <element name="RHumerus" type="string" minOccurs="0"/>
        <element name="RRadius" type="string" minOccurs="0"/>
        <element name="RWrist" type="string" minOccurs="0"/>
        <element name="RHand" type="string" minOccurs="0"/>
        <element name="RThumb" type="string" minOccurs="0"/>
        <element name="RPhalanges1" type="string" minOccurs="0"/>
        <element name="RThumb2" type="string" minOccurs="0"/>
        <element name="RPhalanges2" type="string" minOccurs="0"/>
        <element name="RIndex" type="string" minOccurs="0"/>
        <element name="RPhalanges3" type="string" minOccurs="0"/>
        <element name="RPhalanges4" type="string" minOccurs="0"/>
        <element name="RPhalanges5" type="string" minOccurs="0"/>
        <element name="RMiddle" type="string" minOccurs="0"/>
        <element name="RPhalanges6" type="string" minOccurs="0"/>
        <element name="RPhalanges7" type="string" minOccurs="0"/>
        <element name="RPhalanges8" type="string" minOccurs="0"/>
        <element name="RRing" type="string" minOccurs="0"/>
        <element name="RPhalanges9" type="string" minOccurs="0"/>
        <element name="RPhalanges10" type="string" minOccurs="0"/>
        <element name="RPhalanges11" type="string" minOccurs="0"/>
        <element name="RPinky" type="string" minOccurs="0"/>
        <element name="RPhalanges12" type="string"
```

---
-continued

Source 67
---

```
            minOccurs="0"/>
        <element name="RPhalanges13" type="string" minOccurs="0"/>
        <element name="RPhalanges14" type="string" minOccurs="0"/>
    </sequence>
</complexType>
```

Table 67-1 shows example binary representation syntax corresponding to the upper body bones 1842 of the control body features type 1840, according to the example embodiments.

TABLE 67-1

| UpperBodyBonesType{ | Number of bits | Mnemonic |
|---|---|---|
| LClavicleFlag | 1 | bslbf |
| LScapulaeFlag | 1 | bslbf |
| LHumerusFlag | 1 | bslbf |
| LRadiusFlag | 1 | bslbf |
| LWristFlag | 1 | bslbf |
| LHandFlag | 1 | bslbf |
| LThumbFlag | 1 | bslbf |
| LPhalanges1Flag | 1 | bslbf |
| LThumb2Flag | 1 | bslbf |
| LPhalanges2Flag | 1 | bslbf |
| LIndexFlag | 1 | bslbf |
| LPhalanges3Flag | 1 | bslbf |
| LPhalanges4Flag | 1 | bslbf |
| LPhalanges5Flag | 1 | bslbf |
| LMiddleFlag | 1 | bslbf |
| LPhalanges6Flag | 1 | bslbf |
| LPhalanges7Flag | 1 | bslbf |
| LPhalanges8Flag | 1 | bslbf |
| LRingFlag | 1 | bslbf |
| LPhalanges9Flag | 1 | bslbf |
| LPhalanges10Flag | 1 | bslbf |
| LPhalanges11Flag | 1 | bslbf |
| LPinkyFlag | 1 | bslbf |
| LPhalanges12Flag | 1 | bslbf |
| LPhalanges13Flag | 1 | bslbf |
| LPhalanges14Flag | 1 | bslbf |
| RClavicleFlag | 1 | bslbf |
| RScapulaeFlag | 1 | bslbf |
| RHumerusFlag | 1 | bslbf |
| RRadiusFlag | 1 | bslbf |
| RWristFlat | 1 | bslbf |
| RHandFlag | 1 | bslbf |
| RThumbFlag | 1 | bslbf |
| RPhalanges1Flag | 1 | bslbf |
| RThumb2Flag | 1 | bslbf |
| RPhalanges2Flag | 1 | bslbf |
| RIndexFlag | 1 | bslbf |
| RPhalanges3Flag | 1 | bslbf |
| RPhalanges4Flag | 1 | bslbf |
| RPhalanges5Flag | 1 | bslbf |
| RMiddleFlag | 1 | bslbf |
| RPhalanges6Flag | 1 | bslbf |
| RPhalanges7Flag | 1 | bslbf |
| RPhalanges8Flag | 1 | bslbf |
| RRingFlag | 1 | bslbf |
| RPhalanges9Flag | 1 | bslbf |
| RPhalanges10Flag | 1 | bslbf |

TABLE 67-1-continued

UpperBodyBonesType{

| | Number of bits | Mnemonic |
|---|---|---|
| RPhalanges11Flag | 1 | bslbf |
| RPinkyFlag | 1 | bslbf |
| RPhalanges12Flag | 1 | bslbf |
| RPhalanges13Flag | 1 | bslbf |
| RPhalanges14Flag | 1 | bslbf |
| If(LClavicleFlag){ | | |
|   LClavicle | See ISO 10646 | UTF-8 |
| } | | |
| If(LScapulaeFlag){ | | |
|   LScapulae | See ISO 10646 | UTF-8 |
| } | | |
| If(LHumerusFlag){ | | |
|   LHumerus | See ISO 10646 | UTF-8 |
| } | | |
| If(LRadiusFlag){ | | |
|   LRadius | See ISO 10646 | UTF-8 |
| } | | |
| If(LWristFlag){ | | |
|   LWrist | See ISO 10646 | UTF-8 |
| } | | |
| If(LHandFlag){ | | |
|   LHand | See ISO 10646 | UTF-8 |
| } | | |
| If(LThumbFlag){ | | |
|   LThumb | See ISO 10646 | UTF-8 |
| } | | |
| If(LPhalanges1Flag){ | | |
|   LPhalanges1 | See ISO 10646 | UTF-8 |
| } | | |
| If(LThumb2Flag){ | | |
|   LThumb2 | See ISO 10646 | UTF-8 |
| } | | |
| If(LPhalanges2Flag) { | | |
| | See ISO 10646 | UTF-8 |
|   LPhalanges2 | | |
| } | | |
| If(LIndexFlag){ | | |
|   LIndex | See ISO 10646 | UTF-8 |
| } | | |
| If(LPhalanges3Flag){ | | |
|   LPhalanges3 | See ISO 10646 | UTF-8 |
| } | | |
| If(LPhalanges4Flag){ | | |
|   LPhalanges4 | See ISO 10646 | UTF-8 |
| } | | |
| If(LPhalanges5Flag){ | | |
|   LPhalanges5 | See ISO 10646 | UTF-8 |
| } | | |
| If(LMiddleFlag){ | | |
|   LMiddle | See ISO 10646 | UTF-8 |
| } | | |
| If(LPhalanges6Flag){ | | |
|   LPhalanges6 | See ISO 10646 | UTF-8 |
| } | | |
| If(LPhalanges7Flag){ | | |
|   LPhalanges7 | See ISO 10646 | UTF-8 |
| } | | |
| If(LPhalanges8Flag) { | | |
|   LPhalanges8 | See ISO 10646 | UTF-8 |
| } | | |
| If(LRingFlag){ | | |
|   LRing | See ISO 10646 | UTF-8 |
| } | | |
| If(LPhalanges9Flag){ | | |
|   LPhalanges9 | See ISO 10646 | UTF-8 |
| } | | |
| If(LPhalanges10Flag){ | | |
|   LPhalanges10 | See ISO 10646 | UTF-8 |
| } | | |
| If(LPhalanges11Flag){ | | |
|   LPhalanges11 | See ISO 10646 | UTF-8 |
| } | | |
| If(LPinkyFlag){ | | |
|   LPinky | See ISO 10646 | UTF-8 |
| } | | |
| If(LPhalanges12Flag) { | | |

TABLE 67-1-continued

UpperBodyBonesType{

| | Number of bits | Mnemonic |
|---|---|---|
|   LPhalanges12 | See ISO 10646 | UTF-8 |
| } | | |
| If(LPhalanges13Flag){ | | |
|   LPhalanges13 | See ISO 10646 | UTF-8 |
| } | | |
| If(LPhalanges14Flag){ | | |
|   LPhalanges14 | See ISO 10646 | UTF-8 |
| } | | |
| If(RClavicleFlag){ | | |
|   RClavicle | See ISO 10646 | UTF-8 |
| } | | |
| If(RScapulaeFlag){ | | |
|   RScapulae | See ISO 10646 | UTF-8 |
| } | | |
| If(RHumerusFlag){ | | |
|   RHumerus | See ISO 10646 | UTF-8 |
| } | | |
| If(RRadiusFlag){ | | |
|   RRadius | See ISO 10646 | UTF-8 |
| } | | |
| If(RWristFlag){ | | |
|   RWrist | See ISO 10646 | UTF-8 |
| } | | |
| If(RHandFlag){ | | |
|   RHand | See ISO 10646 | UTF-8 |
| } | | |
| If(RThumbFlag){ | | |
|   RThumb | See ISO 10646 | UTF-8 |
| } | | |
| If(RPhalanges1Flag){ | | |
|   RPhalanges1 | See ISO 10646 | UTF-8 |
| } | | |
| If(RThumb2Flag){ | | |
|   RThumb2 | See ISO 10646 | UTF-8 |
| } | | |
| If(RPhalanges2Flag){ | | |
|   RPhalanges2 | See ISO 10646 | UTF-8 |
| } | | |
| If(RIndexFlag){ | | |
|   RIndex | See ISO 10646 | UTF-8 |
| } | | |
| If(RPhalanges3Flag){ | | |
|   RPhalanges3 | See ISO 10646 | UTF-8 |
| } | | |
| If(RPhalanges4Flag){ | | |
|   RPhalanges4 | See ISO 10646 | UTF-8 |
| } | | |
| If(RPhalanges5Flag){ | | |
|   RPhalanges5 | See ISO 10646 | UTF-8 |
| } | | |
| If(RMiddleFlag){ | | |
|   RMiddle | See ISO 10646 | UTF-8 |
| } | | |
| If(RPhalanges6Flag){ | | |
|   RPhalanges6 | See ISO 10646 | UTF-8 |
| } | | |
| If(RPhalanges7Flag){ | | |
|   RPhalanges7 | See ISO 10646 | UTF-8 |
| } | | |
| If(RPhalanges8Flag){ | | |
|   RPhalanges8 | See ISO 10646 | UTF-8 |
| } | | |
| If(RRingFlag){ | | |
|   RRing | See ISO 10646 | UTF-8 |
| } | | |
| If(RPhalanges9Flag){ | | |
|   RPhalanges9 | See ISO 10646 | UTF-8 |
| } | | |
| If(RPhalanges10Flag){ | | |
|   RPhalanges10 | See ISO 10646 | UTF-8 |
| } | | |
| If(RPhalanges11Flag){ | | |
|   RPhalanges11 | See ISO 10646 | UTF-8 |
| } | | |
| If(RPinkyFlag){ | | |
|   RPinky | See ISO 10646 | UTF-8 |

TABLE 67-1-continued

| UpperBodyBonesType{ | Number of bits | Mnemonic |
|---|---|---|
| } | | |
| If(RPhalanges12Flag){ | | |
| RPhalanges12 | See ISO 10646 | UTF-8 |
| } | | |
| If(RPhalanges13Flag){ | | |
| RPhalanges13 | See ISO 10646 | UTF-8 |
| } | | |
| If(RPhalanges14Flag){ | | |
| RPhalanges14 | See ISO 10646 | UTF-8 |
| } | | |
| } | | |

Table 67-2 shows example descriptor components semantics of the upper body bones 1842 of the control body features type 1840, according to the example embodiments.

TABLE 67-2

| Names | Description |
|---|---|
| UpperBodyBonesType | Defines the upper body bones of an avatar |
| LClavicleFlag | This field, which is only present in the binary representation, signals the presence of the LClavicle element. "1" means that the element shall be used. "0" means that the element shall not be used. |
| LScapulaeFlag | This field, which is only present in the binary representation, signals the presence of the LScapulae element. "1" means that the element shall be used. "0" means that the element shall not be used. |
| LHumerusFlag | This field, which is only present in the binary representation, signals the presence of the LHumerus element. "1" means that the element shall be used. "0" means that the element shall not be used. |
| LRadiusFlag | This field, which is only present in the binary representation, signals the presence of the LRadius element. "1" means that the element shall be used. "0" means that the element shall not be used. |
| LWristFlag | This field, which is only present in the binary representation, signals the presence of the LWrist element. "1" means that the element shall be used. "0" means that the element shall not be used. |
| LHandFlag | This field, which is only present in the binary representation, signals the presence of the LHand element. "1" means that the element shall be used. "0" means that the element shall not be used. |
| LThumbFlag | This field, which is only present in the binary representation, signals the presence of the LThumb element. "1" means that the element shall be used. "0" means that the element shall not be used. |
| LPhalanges1Flag | This field, which is only present in the binary representation, signals the presence of the LPhalanges1 element. "1" means that the element shall be used. "0" means that the element shall not be used. |
| LThumb2Flag | This field, which is only present in the binary representation, signals the presence of the LThumb2 element. "1" means that the element shall be used. "0" means that the element shall not be used. |
| LPhalanges2Flag | This field, which is only present in the binary representation, signals the presence of the LPhalanges2 element. "1" means that the element shall be used. "0" means that the element shall not be used. |
| LIndexFlag | This field, which is only present in the binary representation, signals the presence of the LIndex element. "1" means that the element shall be used. "0" means that the element shall not be used. |
| LPhalanges3Flag | This field, which is only present in the binary representation, signals the presence of the LPhalanges3 element. "1" means that the element shall be used. "0" means that the element shall not be used. |
| LPhalanges4Flag | This field, which is only present in the binary representation, signals the presence of the LPhalanges4 element. "1" means that the element shall be used. "0" means that the element shall not be used. |
| LPhalanges5Flag | This field, which is only present in the binary representation, signals the presence of the LPhalanges5 element. "1" means that the element shall be used. "0" means that the element shall not be used. |
| LMiddleFlag | This field, which is only present in the binary representation, signals the presence of the LMiddle element. "1" means that the element shall be used. "0" means that the element shall not be used. |
| LPhalanges6Flag | This field, which is only present in the binary representation, signals the presence of the LPhalanges6 element. "1" means that the element shall be used. "0" means that the element shall not be used. |
| LPhalanges7Flag | This field, which is only present in the binary representation, signals the presence of the LPhalanges7 element. "1" means that the element shall be used. "0" means that the element shall not be used. |
| LPhalanges8Flag | This field, which is only present in the binary representation, signals the presence of the LPhalanges8 element. "1" means that the element shall be used. "0" means that the element shall not be used. |
| LRingFlag | This field, which is only present in the binary representation, signals the presence of the LRing element. "1" means that the element shall be used. "0" means that the element shall not be used. |
| LPhalanges9Flag | This field, which is only present in the binary representation, signals the presence of the LPhalanges9 element. "1" means that the element shall be used. "0" means that the element shall not be used. |

TABLE 67-2-continued

| Names | Description |
| --- | --- |
| LPhalanges10Flag | This field, which is only present in the binary representation, signals the presence of the LPhalanges10 element. "1" means that the element shall be used. "0" means that the element shall not be used. |
| LPhalanges11Flag | This field, which is only present in the binary representation, signals the presence of the LPhalanges11 element. "1" means that the element shall be used. "0" means that the element shall not be used. |
| LPinkyFlag | This field, which is only present in the binary representation, signals the presence of the LPinky element. "1" means that the element shall be used. "0" means that the element shall not be used. |
| LPhalanges12Flag | This field, which is only present in the binary representation, signals the presence of the LPhalanges12 element. "1" means that the element shall be used. "0" means that the element shall not be used. |
| LPhalanges13Flag | This field, which is only present in the binary representation, signals the presence of the LPhalanges13 element. "1" means that the element shall be used. "0" means that the element shall not be used. |
| LPhalanges14Flag | This field, which is only present in the binary representation, signals the presence of the LPhalanges14 element. "1" means that the element shall be used. "0" means that the element shall not be used. |
| RClavicleFlag | This field, which is only present in the binary representation, signals the presence of the RClavicle element. "1" means that the element shall be used. "0" means that the element shall not be used. |
| RScapulaeFlag | This field, which is only present in the binary representation, signals the presence of the RScapulae element. "1" means that the element shall be used. "0" means that the element shall not be used. |
| RHumerusFlag | This field, which is only present in the binary representation, signals the presence of the RHumerus element. "1" means that the element shall be used. "0" means that the element shall not be used. |
| RRadiusFlag | This field, which is only present in the binary representation, signals the presence of the RRadius element. "1" means that the element shall be used. "0" means that the element shall not be used. |
| RWristFlag | This field, which is only present in the binary representation, signals the presence of the RWrist element. "1" means that the element shall be used. "0" means that the element shall not be used. |
| RHandFlag | This field, which is only present in the binary representation, signals the presence of the RHand element. "1" means that the element shall be used. "0" means that the element shall not be used. |
| RThumbFlag | This field, which is only present in the binary representation, signals the presence of the RThumb element. "1" means that the element shall be used. "0" means that the element shall not be used. |
| RPhalanges1Flag | This field, which is only present in the binary representation, signals the presence of the RPhalanges1 element. "1" means that the element shall be used. "0" means that the element shall not be used. |
| RThumb2Flag | This field, which is only present in the binary representation, signals the presence of the RThumb2 element. "1" means that the element shall be used. "0" means that the element shall not be used. |
| RPhalanges2Flag | This field, which is only present in the binary representation, signals the presence of the RPhalanges2 element. "1" means that the element shall be used. "0" means that the element shall not be used. |
| RIndexFlag | This field, which is only present in the binary representation, signals the presence of the RIndex element. "1" means that the element shall be used. "0" means that the element shall not be used. |
| RPhalanges3Flag | This field, which is only present in the binary representation, signals the presence of the RPhalanges3 element. "1" means that the element shall be used. "0" means that the element shall not be used. |
| RPhalanges4Flag | This field, which is only present in the binary representation, signals the presence of the RPhalanges4 element. "1" means that the element shall be used. "0" means that the element shall not be used. |
| RPhalanges5Flag | This field, which is only present in the binary representation, signals the presence of the RPhalanges5 element. "1" means that the element shall be used. "0" means that the element shall not be used. |
| RMiddleFlag | This field, which is only present in the binary representation, signals the presence of the RMiddle element. "1" means that the element shall be used. "0" means that the element shall not be used. |
| RPhalanges6Flag | This field, which is only present in the binary representation, signals the presence of the RPhalanges6 element. "1" means that the element shall be used. "0" means that the element shall not be used. |
| RPhalanges7Flag | This field, which is only present in the binary representation, signals the presence of the RPhalanges7 element. "1" means that the element shall be used. "0" means that the element shall not be used. |
| RPhalanges8Flag | This field, which is only present in the binary representation, signals the presence of the RPhalanges8 element. "1" means that the element shall be used. "0" means that the element shall not be used. |
| RRingFlag | This field, which is only present in the binary representation, signals the presence of the RRing element. "1" means that the element shall be used. "0" means that the element shall not be used. |
| RPhalanges9Flag | This field, which is only present in the binary representation, signals the presence of the RPhalanges9 element. "1" means that the element shall be used. "0" means that the element shall not be used. |

TABLE 67-2-continued

| Names | Description |
|---|---|
| RPhalanges10Flag | This field, which is only present in the binary representation, signals the presence of the RPhalanges10 element. "1" means that the element shall be used. "0" means that the element shall not be used. |
| RPhalanges11Flag | This field, which is only present in the binary representation, signals the presence of the RPhalanges11 element. "1" means that the element shall be used. "0" means that the element shall not be used. |
| RPinkyFlag | This field, which is only present in the binary representation, signals the presence of the RPinky element. "1" means that the element shall be used. "0" means that the element shall not be used. |
| RPhalanges12Flag | This field, which is only present in the binary representation, signals the presence of the RPhalanges12 element. "1" means that the element shall be used. "0" means that the element shall not be used. |
| RPhalanges13Flag | This field, which is only present in the binary representation, signals the presence of the RPhalanges13 element, "1" means that the element shall be used. "0" means that the element shall not be used. |
| RPhalanges14Flag | This field, which is only present in the binary representation, signals the presence of the RPhalanges14 element, "1" means that the element shall be used. "0" means that the element shall not be used. |
| LClavicle | Left clavicle |
| LScapulae | Left scapulae |
| LHumerus | Left humerus |
| LRadius | Left radius |
| LWrist | Left wrist |
| LHand | Left Hand |
| LThumb | Left thumb_Metacarpal |
| LPhalanges1 | Left Phalanges1 |
| LThumb2 | Left Thumb2 |
| LPhalanges2 | Left Phalanges2 |
| LIndex | Left index_Metacarpal |
| LPhalanges3 | Left Phalanges3 |
| LPhalanges4 | Left Phalanges4 |
| LPhalanges5 | Left Phalanges5 |
| LMiddle | Left middle_Metacarpal |
| LPhalanges6 | Left Phalanges6 |
| LPhalanges7 | Left Phalanges7 |
| LPhalanges8 | Left Phalanges8 |
| LRing | Left ring_Metacarpal |
| LPhalanges9 | Left Phalanges9 |
| LPhalanges10 | Left Phalanges10 |
| LPhalanges11 | Left Phalanges11 |
| LPinky | Left pinky_Metacarpal |
| LPhalanges12 | Left Phalanges12 |
| LPhalanges13 | Left Phalanges13 |
| LPhalanges14 | Left Phalanges14 |
| RClavicle | Right clavicle 362 |
| RScapulae | Right scapulae |
| RHumerus | Right humerus |
| RRadius | Right radius |
| RWrist | Right wrist |
| RHand | Right Hand |
| RThumb | Right thumb_Metacarpal |
| RPhalanges1 | Right Phalanges1 |
| RThumb2 | Right Thumb2 |
| RPhalanges2 | Right Phalanges2 |
| RIndex | Right index_Metacarpal |
| RPhalanges3 | Right Phalanges3 |
| RPhalanges4 | Right Phalanges4 |
| RPhalanges5 | Right Phalanges5 |
| RMiddle | Right middle_Metacarpal |
| RPhalanges6 | Right Phalanges6 |
| RPhalanges7 | Right Phalanges7 |
| RPhalanges8 | Right Phalanges8 |
| RRing | Right ring_Metacarpal |
| RPhalanges9 | Right Phalanges9 |
| RPhalanges10 | Right Phalanges10 |
| RPhalanges11 | Right Phalanges11 |
| RPinks | Right pinky_Metacarpal |
| RPhalanges12 | Right Phalanges12 |
| RPhalanges13 | Right Phalanges13 |
| RPhalanges14 | Right Phalanges14 |

Depending on embodiments, the down body bones 1843 of the control body features type 1840 may be expressed using the XML, for example, as shown below in Source 68. However, a program source shown in Source 68 is not limiting and is only an example embodiment.

---

Source 68

---

```
<!-- ################################################# -->
<!-- Down Body BonesType                              -->
<!-- ################################################# -->
<complexType name="DownBodyBonesType">
    <sequence>
        <element name="LFemur" type="string" minOccurs="0"/>
        <element name="LPatella" type="string" minOccurs="0"/>
        <element name="LTibia" type="string" minOccurs="0"/>
        <element name="LFibulae" type="string" minOccurs="0"/>
        <element name="LTarsals1" type="string" minOccurs="0"/>
        <element name="LTarsals2" type="string" minOccurs="0"/>
        <element name="LMetaTarsals" type="string"
          minOccurs="0"/>
        <element name="LPhalanges" type="string" minOccurs="0"/>
        <element name="RFemur" type="string" minOccurs="0"/>
        <element name="RPatella" type="string" minOccurs="0"/>
        <element name="RTibia" type="string" minOccurs="0"/>
        <element name="RFibulae" type="string" minOccurs="0"/>
        <element name="RTarsals1" type="string" minOccurs="0"/>
        <element name="RTarsals2" type="string" minOccurs="0"/>
        <element name="RMetaTarsals" type="string"
          minOccurs="0"/>
        <element name="RPhalangas" type="string" minOccurs="0"/>
    </sequence>
</complexType>
```

Table 68-1 shows example binary representation syntax corresponding to the down body bones 1843 of the control body features type 1840, according to the example embodiments.

TABLE 68-1

| DownBodyBonesType{ | | |
|---|---|---|
| | Number of bits | Mnemonic |
| LFemurFlag | 1 | bslbf |
| LPatellaFlag | 1 | bslbf |
| LTibiaFlag | 1 | bslbf |
| LFibulaeFlag | 1 | bslbf |
| LTarsals1Flag | 1 | bslbf |
| LTarsals2Flag | 1 | bslbf |
| LMetaTarsalsFlag | 1 | bslbf |
| LPhalangesFlag | 1 | bslbf |
| RFemurFlag | 1 | bslbf |
| RPatellaFlag | 1 | bslbf |
| RTibiaFlag | 1 | bslbf |
| RFibulaeFlag | 1 | bslbf |
| RTarsals1Flag | 1 | bslbf |
| RTarsals2Flag | 1 | bslbf |
| RMetaTarsalsFlag | 1 | bslbf |
| RPhalangasFlag | 1 | bslbf |
| If(LFemurFlag){ | | |
| LFemur | See ISO 10646 | UTF-8 |
| } | | |
| If(LPatellaFlag){ | | |
| LPatella | See ISO 10646 | UTF-8 |
| } | | |
| If(LTibiaFlag){ | | |
| LTibia | See ISO 10646 | UTF-8 |
| } | | |
| If(LFibulaeFlag){ | | |
| LFibulae | See ISO 10646 | UTF-8 |
| } | | |
| If(LTarsals1Flag){ | | |
| LTarsals1 | See ISO 10646 | UTF-8 |
| } | | |
| If(LTarsals2Flag){ | | |
| LTarsals2 | See ISO 10646 | UTF-8 |
| } | | |
| If(LMetaTarsalsFlag){ | | |
| LMetaTarsals | See ISO 10646 | UTF-8 |
| } | | |
| If(LPhalangesFlag){ | | |
| LPhalanges | See ISO 10646 | UTF-8 |
| } | | |
| If(RFemurFlag){ | | |
| RFemur | See ISO 10646 | UTF-8 |
| } | | |
| If(RPatellaFlag){ | | |
| RPatella | See ISO 10646 | UTF-8 |
| } | | |
| If(RTibiaFlag){ | | |
| RTibia | See ISO 10646 | UTF-8 |
| } | | |
| If(RFibulaeFlag){ | | |
| RFibulae | See ISO 10646 | UTF-8 |
| } | | |
| If(RTarsals1Flag){ | | |
| RTarsals1 | See ISO 10646 | UTF-8 |
| } | | |
| If(RTarsals2Flag){ | | |
| RTarsals2 | See ISO 10646 | UTF-8 |
| } | | |
| If(RMetaTarsalsFlag){ | | |
| RMetaTars als | See ISO 10646 | UTF-8 |
| } | | |
| If(RPhalangesFlag){ | | |
| RPhalanges | See ISO 10646 | UTF-8 |
| } | | |
| } | | |

Table 68-2 shows example descriptor components semantics of the down body bones 1843 of the control body features type 1840, according to the example embodiments.

TABLE 68-2

| Names | Description |
|---|---|
| DownBodyBonesType | Defines the down body bones of an avatar |
| LFemurFlag | This field, which is only present in the binary representation, signals the presence of the LFemur element. "1" means that the element shall be used. "0" means that the element shall not be used. |
| LPatellaFlag | This field, which is only present in the binary representation, signals the presence of the LPatella element. "1" means that the element shall be used. "0" means that the element shall not be used. |
| LTibiaFlag | This field, which is only present in the binary representation, signals the presence of the LTibia element. "1" means that the element shall be used. "0" means that the element shall not be used. |
| LFibulaeFlag | This field, which is only present in the binary representation, signals the presence of the LFibulae element. "1" means that the element shall be used. "0" means that the element shall not be used. |
| LTarsals1Flag | This field, which is only present in the binary representation, signals the presence of the LTarsals1 element. "1" means that the element shall be used. "0" means that the element shall not be used. |
| LTarsals2Flag | This field, which is only present in the binary representation, signals the presence of the LTarsals2 element. "1" means that the element shall be used. "0" means that the element shall not be used. |

TABLE 68-2-continued

| Names | Description |
|---|---|
| LMetaTarsalsFlag | This field, which is only present in the binary representation, signals the presence of the LMetaTarsals element. "1" means that the element shall be used. "0" means that the element shall not be used. |
| LPhalangesFlag | This field, which is only present in the binary representation, signals the presence of the LPhalanges element. "1" means that the element shall be used. "0" means that the element shall not be used. |
| RFemurFlag | This field, which is only present in the binary representation, signals the presence of the RFemur element. "1" means that the element shall be used. "0" means that the element shall not be used. |
| RPatellaFlag | This field, which is only present in the binary representation, signals the presence of the RPatella element. "1" means that the element shall be used. "0" means that the element shall not be used. |
| RTibiaFlag | This field, which is only present in the binary representation, signals the presence of the RTibia element. "1" means that the element shall be used. "0" means that the element shall not be used. |
| RFibulaeFlag | This field, which is only present in the binary representation, signals the presence of the RFibulae element. "1" means that the element shall be used. "0" means that the element shall not be used. |
| RTarsals1Flag | This field, which is only present in the binary representation, signals the presence of the RTarsals1 element. "1" means that the element shall be used. "0" means that the element shall not be used. |
| RTarsals2Flag | This field, which is only present in the binary representation, signals the presence of the RTarsals2 element. "1" means that the element shall be used. "0" means that the element shall not be used. |
| RMetaTarsalsFlag | This field, which is only present in the binary representation, signals the presence of the RMetaTarsals element. "1" means that the element shall be used. "0" means that the element shall not be used. |
| RPhalangasFlag | This field, which is only present in the binary representation, signals the presence of the RPhalanges element. "1" means that the element shall be used. "0" means that the element shall not be used. |
| LFemur | Left femur |
| LPatella | Left patella (knee bone) |
| LTibia | Left tibia (femur in front) |
| LFibulae | Left fibulae |
| LTarsals1 | Left tarsals1 (parts of ankle) |
| LTarsals2 | Left tarsals2 (7 are all) |
| LMetaTarsals | Left metatarsals (5) (foot parts) |
| LPhalanges | Left Phalanges (1-14) (foot parts) |
| RFemur | Right femur |
| RPatella | Right patella (knee bone) |
| RTibia | Right tibia (femur in front) |
| RFibulae | Right fibulae |
| RTarsals1 | Right tarsals1 (parts of ankle) |
| RTarsals2 | Right tarsals2 (7 are all) |
| RMetaTarsals | Right metatarsals (5) (foot parts) |
| RPhalangas | Right Phalanges (1-14) (foot parts) |

Depending on embodiments, the middle body bones 1844 of the control body features type 1840 may be expressed using the XML, for example, as shown below in Source 69. However, a program source shown in Source 69 is not limiting and is only an example embodiment.

Source 69

```
<xsd:complexType name="MiddleBodyBonesType">
    <xsd:sequence>
        <xsd:element name="Sacrum" type="xsd:string"
 minOccurs="0"/>
        <xsd:element name="Pelvis" type="xsd:string"
 minOccurs="0"/>
        <xsd:element name="LumbarVertebrae5" type="xsd:string"
minOccurs="0"/>
        <xsd:element name="LumbarVertebrae4" type="xsd:string"
minOccurs="0"/>
        <xsd:element name="LumbarVertebrae3" type="xsd:string"
minOccurs="0"/>
        <xsd:element name="LumbarVertebrae2" type="xsd:string"
minOccurs="0"/>
        <xsd:element name="LumbarVertebrae1" type="xsd:string"
minOccurs="0"/>
        <xsd:element name="ThoracicVertebrae12"
type="xsd:string" minOccurs="0"/>
        <xsd:element name="ThoracicVertebrae11"
type="xsd:string" minOccurs="0"/>
        <xsd:element name="ThoracicVertebrae10"
type="xsd:string" minOccurs="0"/>
        <xsd:element name="ThoracicVertebrae9" type="xsd:string"
minOccurs="0"/>
        <xsd:element name="ThoracicVertebrae8" type="xsd:string"
minOccurs="0"/>
        <xsd:element name="ThoracicVertebrae7" type="xsd:string"
minOccurs="0"/>
        <xsd:element name="ThoracicVertebrae6" type="xsd:string"
minOccurs="0"/>
        <xsd:element name="ThoracicVertebrae5" type="xsd:string"
minOccurs="0"/>
        <xsd:element name="ThoracicVertebrae4" type="xsd:string"
minOccurs="0"/>
        <xsd:element name="ThoracicVertebrae3" type="xsd:string"
minOccurs="0"/>
        <xsd:element name="ThoracicVertebrae2" type="xsd:string"
minOccurs="0"/>
        <xsd:element name="ThoracicVertebrae1" type="xsd:string"
minOccurs="0"/>
    </xsd:sequence>
</xsd:complexType>
```

Table 69-1 shows example binary representation syntax corresponding to the middle body bones 1844 of the control body features type 1840, according to the example embodiments.

TABLE 69-1

| DownBodyBonesType { | Number of bits | Mnemonic |
|---|---|---|
| SacrumFlag | 1 | bslbf |
| PelvisFlag | 1 | bslbf |
| LumbarVertebrae5Flag | 1 | bslbf |
| LumbarVertebrae4Flag | 1 | bslbf |
| LumbarVertebrae3Flag | 1 | bslbf |
| LumbarVertebrae2Flag | 1 | bslbf |
| LumbarVertebrae1Flag | 1 | bslbf |
| ThoracicVertebrae12Flag | 1 | bslbf |
| ThoracicVertebrae11Flag | 1 | bslbf |
| ThoracicVertebrae10Flag | 1 | bslbf |
| ThoracicVertebrae9Flag | 1 | bslbf |
| ThoracicVertebrae8Flag | 1 | bslbf |
| ThoracicVertebrae7Flag | 1 | bslbf |
| ThoracicVertebrae6Flag | 1 | bslbf |
| ThoracicVertebrae5Flag | 1 | bslbf |
| ThoracicVertebrae4Flag | 1 | bslbf |
| ThoracicVertebrae3Flag | 1 | bslbf |
| ThoracicVertebrae2Flag | 1 | bslbf |
| ThoracicVertebrae1Flag | 1 | bslbf |
| If(SacrumFlag){ | | |
| Sacrum | See ISO 10646 | UTF-8 |
| } | | |
| If(PelvisFlag){ | | |
| Pelvis | See ISO 10646 | UTF-8 |
| } | | |

TABLE 69-1-continued

| DownBodyBonesType { | Number of bits | Mnemonic |
|---|---|---|
| If(LumbarVertebrae5Flag){ | | |
|   LumbarVertebrae5 | See ISO 10646 | UTF-8 |
| } | | |
| If(LumbarVertebrae4Flag){ | | |
|   LumbarVertebrae4 | See ISO 10646 | UTF-8 |
| } | | |
| If(LumbarVertebrae4Flag){ | | |
|   LumbarVertebrae4 | See ISO 10646 | UTF-8 |
| } | | |
| If(LumbarVertebrae3Flag){ | | |
|   LumbarVertebrae3 | See ISO 10646 | UTF-8 |
| } | | |
| If(LumbarVertebrae2Flag){ | | |
|   LumbarVertebrae2 | See ISO 10646 | UTF-8 |
| } | | |
| If(LumbarVertebrae1Flag){ | | |
|   LumbarVertebrae1 | See ISO 10646 | UTF-8 |
| } | | |
| If(ThoracicVertebrae12Flag){ | | |
|   ThoracicVertebrae12 | See ISO 10646 | UTF-8 |
| } | | |
| If(ThoracicVertebrae11Flag){ | | |
|   ThoracicVertebrae11 | See ISO 10646 | UTF-8 |
| } | | |
| If(ThoracicVertebrae10Flag){ | | |
|   ThoracicVertebrae10 | See ISO 10646 | UTF-8 |
| } | | |
| If(ThoracicVertebrae9Flag){ | | |
|   ThoracicVertebrae9 | See ISO 10646 | UTF-8 |
| } | | |
| If(ThoracicVertebrae8Flag){ | | |
|   ThoracicVertebrae8 | See ISO 10646 | UTF-8 |
| } | | |
| If(ThoracicVertebrae7Flag){ | | |
|   ThoracicVertebrae7 | See ISO 10646 | UTF-8 |
| } | | |
| If(ThoracicVertebrae6Flag){ | | |
|   ThoracicVertebrae6 | See ISO 10646 | UTF-8 |
| } | | |
| If(ThoracicVertebrae5Flag){ | | |
|   ThoracicVertebrae5 | See ISO 10646 | UTF-8 |
| } | | |
| If(ThoracicVertebrae4Flag){ | | |
|   ThoracicVertebrae4 | See ISO 10646 | UTF-8 |
| } | | |
| If(ThoracicVertebrae3Flag){ | | |
|   ThoracicVertebrae3 | See ISO 10646 | UTF-8 |
| } | | |
| If(ThoracicVertebrae2Flag){ | | |
|   ThoracicVertebrae2 | See ISO 10646 | UTF-8 |
| } | | |
| If(ThoracicVertebrae1Flag){ | | |
|   ThoracicVertebrae1 | See ISO 10646 | UTF-8 |
| } | | |
| } | | |

Table 69-2 shows example descriptor components semantics of the middle body bones 1844 of the control body features type 1840, according to the example embodiments.

TABLE 69-2

| Names | Description |
|---|---|
| MiddleBodyBonesType | Defines the down body bones of an avatar |
| SacrumFlag | This field, which is only present in the binary representation, signals the presence of the Sacrum element. "1" means that the element shall be used. "0" means that the element shall not be used. |
| PelvisFlag | This field, which is only present in the binary representation, signals the presence of the Pelvis element. "1" means that the element shall be used. "0" means that the element shall not be used. |

TABLE 69-2-continued

| Names | Description |
|---|---|
| LumbarVertebrae5Flag | This field, which is only present in the binary representation, signals the presence of the LumbarVertebrae5 element. "1" means that the element shall be used. "0" means that the element shall not be used. |
| LumbarVertebrae4Flag | This field, which is only present in the binary representation, signals the presence of the LumbarVertebrae4 element. "1" means that the element shall be used. "0" means that the element shall not be used. |
| LumbarVertebrae3Flag | This field, which is only present in the binary representation, signals the presence of the LumbarVertebrae3 element. "1" means that the element shall be used. "0" means that the element shall not be used. |
| LumbarVertebrae2Flag | This field, which is only present in the binary representation, signals the presence of the LumbarVertebrae2 element. "1" means that the element shall be used. "0" means that the element shall not be used. |
| LumbarVertebrae1Flag | This field, which is only present in the binary representation, signals the presence of the LumbarVertebrae1 element. "1" means that the element shall be used. "0" means that the element shall not be used. |
| ThoracicVertebrae12Flag | This field, which is only present in the binary representation, signals the presence of the ThoracicVertebrae12 element. "1" means that the element shall be used. "0" means that the element shall not be used. |
| ThoracicVertebrae11Flag | This field, which is only present in the binary representation, signals the presence of the ThoracicVertebrae11 element, "1" means that the element shall be used. "0" means that the element shall not be used. |
| ThoracicVertebrae10Flag | This field, which is only present in the binary representation, signals the presence of the ThoracicVertebrae10 element. "1" means that the element shall be used. "0" means that the element shall not be used. |
| ThoracicVertebrae9Flag | This field, which is only present in the binary representation, signals the presence of the ThoracicVertebrae9 element. "1" means that the element shall be used. "0" means that the element shall not be used. |
| ThoracicVertebrae8Flag | This field, which is only present in the binary representation, signals the presence of the ThoracicVertebrae8 element. "1" means that the element shall be used. "0" means that the element shall not be used. |
| ThoracicVertebrae7Flag | This field, which is only present in the binary representation, signals the presence of the ThoracicVertebrae7 element. "1" means that the element shall be used. "0" means that the element shall not be used. |
| ThoracicVertebrae6Flag | This field, which is only present in the binary representation, signals the presence of the ThoracicVertebrae6 element. "1" means that the element shall be used. "0" means that the element shall not be used. |
| ThoracicVertebrae5Flag | This field, which is only present in the binary representation, signals the presence of the ThoracicVertebrae5 element. "1" means that the element shall be used. "0" means that the element shall not be used. |

TABLE 69-2-continued

| Names | Description |
|---|---|
| ThoracicVertebrae4Flag | This field, which is only present in the binary representation, signals the presence of the ThoracicVertebrae4 element. "1" means that the element shall be used. "0" means that the element shall not be used. |
| ThoracicVertebrae3Flag | This field, which is only present in the binary representation, signals the presence of the ThoracicVertebrae3 element. "1" means that the element shall be used. "0" means that the element shall not be used. |
| ThoracicVertebrae2Flag | This field, which is only present in the binary representation, signals the presence of the ThoracicVertebrae2 element. "1" means that the element shall be used. "0" means that the element shall not be used. |
| ThoracicVertebrae1Flag | This field, which is only present in the binary representation, signals the presence of the ThoracicVertebrae1 element. "1" means that the element shall be used. "0" means that the element shall not be used. |
| Sacrum | Sacrum |
| Pelvis | pelvis |
| LumbarVertebrae5 | lumbar vertebrae5 |
| LumbarVertebrae4 | lumbar vertebrae4 |
| LumbarVertebrae 3 | lumbar vertebrae3 |
| LumbarVertebrae2 | lumbar vertebrae2 |
| LumbarVertebrae1 | lumbar vertebrae1 |
| ThoracicVertebrae12 | thoracic vertebrae12 |
| ThoracicVertebrae11 | thoracic vertebrae11 |
| ThoracicVertebrae10 | thoracic vertebrae10 |
| ThoracicVertebrae9 | thoracic vertebrae9 |
| ThoracicVertebrae8 | thoracic vertebrae8 |
| ThoracicVertebrae7 | thoracic vertebrae7 |
| ThoracicVertebrae6 | thoracic vertebrae6 |
| ThoracicVertebrae5 | thoracic vertebrae5 |
| ThoracicVertebrae4 | thoracic vertebrae4 |
| ThoracicVertebrae3 | thoracic vertebrae3 |
| ThoracicVertebrae2 | thoracic vertebrae2 |
| ThoracicVertebrae1 | thoracic vertebrae1 |

The virtual object in the virtual environment, according to example embodiments, may be represented by virtual object metadata.

The virtual object metadata may characterize various types of object in the virtual environment. Additionally, the virtual object metadata may provide interaction between the virtual object and the avatar. In addition, the virtual object metadata may provide interaction in the virtual environment.

The virtual object, according to the example embodiments, may further include elements including appearance and animation, in addition to extension of the base type of VWO. Hereinafter, the virtual object will be described in detail with reference to FIG. 28.

Figure 28:
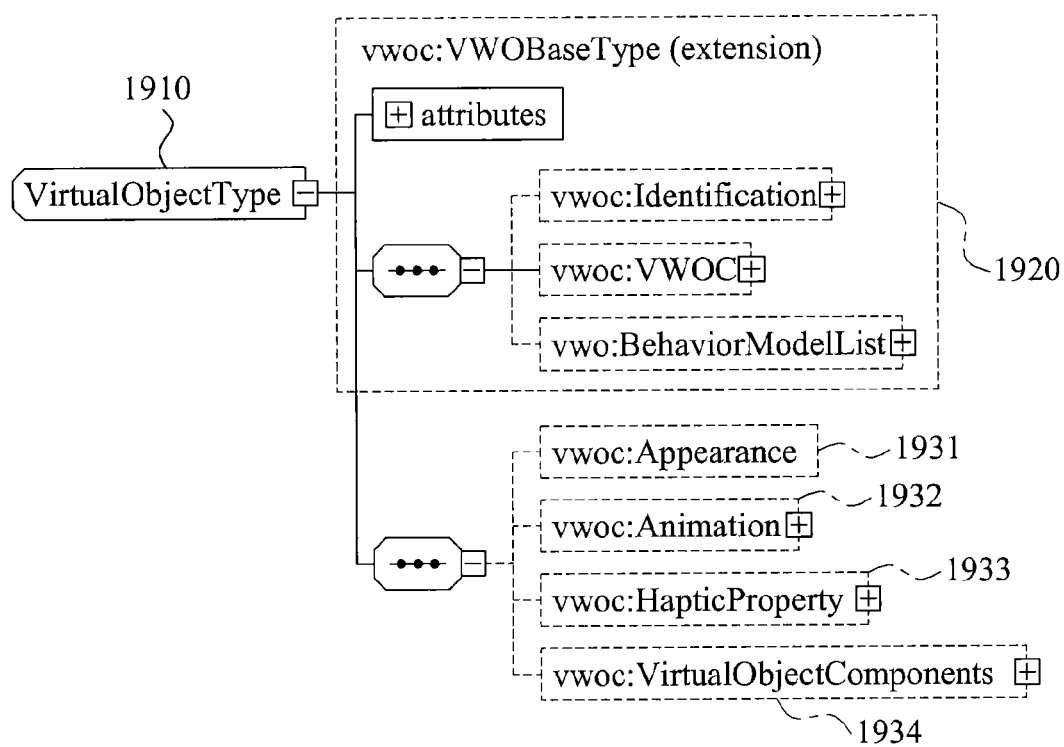
FIG. 28 illustrates a data structure of a virtual object type, according to example embodiments.

FIG. 28 illustrates a data structure of a virtual object type 1910, according to example embodiments.

Referring to FIG. 28, the virtual object type 1910 may include a plurality of elements 1931, 1932, 1933, and 1934, in addition to extension of a VWO base type 1920; however, the present disclosure is not limited thereto.

The virtual object type 1910 may refer to a data type with respect to the virtual object.

The VWO base type 1920 may refer to the VWO base type 510 of FIG. 5. That is, the VWO base type 1920 may refer to the VWO base type 510 inherited as the virtual object metadata to extend particular aspects of the virtual object metadata related to the virtual object.

The virtual object type 1910, according to the example embodiments, may include elements including appearance 1931 and animation 1932. Depending on embodiments, the virtual object type 1910 may further include haptic property 1933 and virtual object components 1934.

The appearance 1931 may include at least one resource link with respect to an appearance file describing elements such as tactile and visual of the virtual object.

The animation 1932 may include a set of metadata describing pre-recorded animation related to the virtual object.

The haptic property 1933 may include a set of descriptors of haptic property defined by the VWO haptic property type 1210 described with reference to FIG. 17.

The virtual object components 1934 may include a list of virtual objects concatenating the virtual objects to components.

Depending on embodiments, the virtual object type 1910 may be expressed using the XML, for example, as shown below in Source 70. However, a program source shown in Source 70 is not limiting and is only an example embodiment.

Source 70

```
<!-- ############################################## -->
<!-- Virtual Object Type                             -->
<!-- ############################################## -->
<complexType name="VirtualObjectType">
    <complexContent>
        <extension base="vwoc:VWOBaseType">
            <sequence>
                <element name="Appearance" type="anyURI" minOccurs="0" maxOccurs="unbounded"/>
                <element name="Animation" type="vwoc:VOAnimationType" minOccurs="0"/>
                <element name="HapticProperty" type="vwoc:VWOHapticPropertyType" minOccurs="0"/>
                <element name="VirtualObjectComponents" type="vwoc:VirtualObjectListType" minOccurs="0"/>
            </sequence>
        </extension>
    </complexContent>
</complexType>
```

Table 70 shows example binary representation syntax corresponding to the virtual object type 1910, according to the example embodiments.

TABLE 70

| VirtualObjectType{ | Number or bits | Mnemonic |
|---|---|---|
| NumAppearance |  | vluimsbf5 |
| AnimationFlag | 1 | bslbf |
| HapticPropertyFlag | 1 | bslbf |
| VirtualObjectComponentsFlag | 1 | bslbf |
| VWOBase |  | VWOBaseType |
| f or(k = 0; k < NumAppearance; k+ +){ |  |  |
| Appearance | See ISO 10646 | UTF-8 |

TABLE 70-continued

| VirtualObjectType{ | Number or bits | Mnemonic |
|---|---|---|
| } | | |
| if(AnimationFlag){ | | |
|   Animation | | VOAnimationType |
| } | | |
| if(HapticPropertyFlag){ | | |
|   HapticProperty | | VWOHapticPropertyType |
| } | | |
| if(VirtualObjectComponentsFlag){ | | |
|   VirtualObjectComponents | | VirtualObjectListType |
| } | | |
| } | | |

Table 70-2 shows example descriptor components semantics of the virtual object type 1910, according to the example embodiments.

TABLE 70-2

| Names | Description |
|---|---|
| VirtualObjectType | Defines the avatar personality. |
| NumAppearance | This field, which is only present in the binary representation, specifies the number of virtual object appearance elements. |
| AnimationFlag | This field, which is only present in the binary representation, signals the presence of the Animation element. "1" means that the element shall be used. "0" means that the element shall not be used. |
| HapticPropertyFlag | This field, which is only present in the binary representation, signals the presence of the Haptic Property element. "1" means that the element shall be used. "0" means that the element shall not be used. |
| VirtualObjectComponentsFlag | This field, which is only present in the binary representation, signals the presence of the Virtual Object Components element. "1" means that the element shall be used. "0" means that the element shall not be used. |
| VWOBase | This element contains a set of base type descriptors defined as the base type of the virtual world object. |
| Appearance | This element contains a set of URL link describing the visual and tactile elements of the object. |
| Animation | This element contains a set of metadata describing pre-recorded animations associated with the object. |
| HapticProperty | This element contains a set of descriptors of haptic property of the virtual world object. |
| VirtualObjectComponents | This element contains a list of virtual object components which are pans of the virtual object. |

Figure 29:
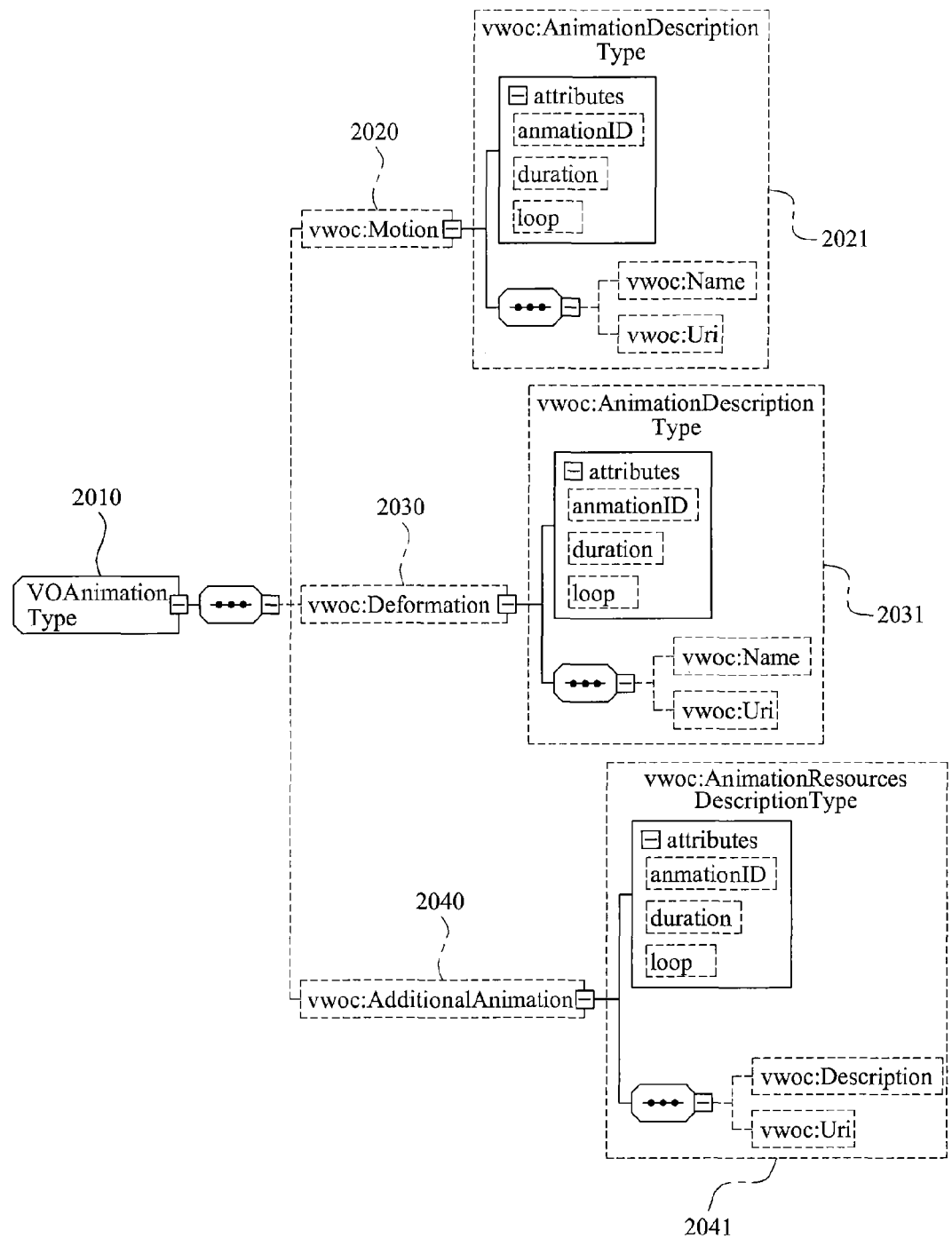
FIG. 29 illustrates a data structure of a virtual object (VO) animation type 2010, according to example embodiments.

FIG. 29 illustrates a data structure of a virtual object (VO) animation type 2010, according to example embodiments.

Referring to FIG. 29, the VO animation type 2010 may include elements including motion 2020, deformation 2030, and additional animation 2040; however, the present disclosure is not limited thereto.

The motion 2020 may refer to a set of animation defined as a rigid motion. Depending on embodiments, the motion 2020 may include an animation description type 2021. The animation description type 2021 may refer to the animation description type 1710 of FIG. 17.

Table 71 below shows a specific embodiment of the motion 2020.

TABLE 71

| Name | Description |
|---|---|
| MoveDown | move down |
| MoveLeft | move left |
| MoveRight | move right |
| MoveUp | move up |
| Turn180 | make a turn for 180° |
| Turnback180 | make a turn back for 180° |
| TurnLeft | turn left |
| TurnRight | turn right |
| Turn360 | make a turn for 360° |
| Turnback360 | make a turn back for 360° |
| FreeDirection | Move to an arbitrary direction |
| Appear | appear from somewhere |
| Away | go away |
| Disappear | disappear somewhere |
| Falldown | falling down |
| Bounce | Bounce |
| Toss | Toss |
| Spin | Spin |
| Fly | Fly |
| Vibrate | Vibrate |
| Flow | Flow |

The deformation 2030 refers to a set of deformation animation. Depending on embodiments, the deformation 2030 may include an animation description type 2031. The animation description type 2031 may refer to the animation description type 1710 of FIG. 17.

Table 71-1 below shows a specific embodiment of the deformation 2030.

TABLE 71-1

| Name | Description |
|---|---|
| Flip | Flip |
| Stretch | Stretch |
| Swirl | Swirl |
| Twist | Twist |
| Bend | Bend |
| Roll | Roll |
| Press | Press |
| FallToPieces | Falling to pieces |
| Explode | Exploding |
| Fire | firing |

The additional animation 2040 may include at least one link with respect to the animation file. Depending on embodiments, the additional animation 2040 may include an animation resources description type 2041. The animation resources description type 2041 may refer to the animation resources description type 1810 described with reference to FIG. 18.

Depending on embodiments, the VO animation type 2010 may be expressed using the XML, for example, as shown below in Source 71-2. However, a program source shown in Source 71-2 is not limiting and is only an example embodiment.

Source 71-2

```
<!-- ################################################## -->
<!-- VO Animation Type                                   -->
<!-- ################################################## -->
<complexType name="VOAnimationType">
    <sequence>
        <element name="Motion"
type="vwoc:AnimationDescriptionType" minOccurs="0"
maxOccurs="unbounded"/>
        <element name="Deformation"
type="vwoc:AnimationDescriptionType"
minOccurs="0" maxOccurs="unbounded"/>
        <element name="AdditionalAnimation"
type="vwoc:AnimationResourcesDescriptionType"
minOccurs="0" maxOccurs="unbounded"/>
    </sequence>
</complexType>
```

Table 71-3 shows example binary representation syntax corresponding to the VO animation type 2010, according to the example embodiments.

TABLE 71-3

| VOAnimationType{ | Number of bits | Mnemonic |
|---|---|---|
| NumMotion | | vluimsbf5 |
| NumDeformation | | vluimsbf5 |
| NumAdditionalAnimation | | vluimsbf5 |
| for(k = 0;k < NumMotion;k+ +){ | | |
|   Motion | | AnimatonDescriptionType |
| } | | |
| for(k =0;k < NumDeformation;k+ +) { | | |
|   Deformation | | AnimationDescriptionType |
| } | | |
| for(k = 0;k < NumAdditionalAnimation;k + +){ | | |
|   AdditionalAnimation | | AnimationResourcesDescriptionType |
| } | | |
| } | | |

Table 71-4 shows example descriptor components semantics of the VO animation type 2010, according to the example embodiments.

TABLE 71-4

| Names | Description |
|---|---|
| VOAnimationType | Defines the animation of virtual object. |
| NumMotion | This field, which is only present in the binary representation, specifies the number of rigid motion elements. |
| NumDeformation | This field, which is only present in the binary representation, specifies the number of deformation action elements. |
| NumAdditionalAnimation | This field, which is only present in the binary representation, specifies the number of additional animation elements. |
| | |
| Motion | Set of animations defined as a rigid motion. |

TABLE 71-4-continued

| Names | Description | | |
|---|---|---|---|
| | Binary representation (4 bits) | description | |
| | 1 | move down | |
| | 2 | move left | |
| | 3 | move right | |
| | 4 | move up | |
| | 5 | turn 180 | |
| | 6 | turn back 180 | |
| | 7 | turn left | |
| | 8 | turn right | |
| | 9 | turn 360 | |
| | 10 | turn back 360 | |
| | 11 | free direction | |
| | 12 | appear | |
| | 13 | away | |
| | 14 | disappear | |
| | 15 | fall down | |
| | 16 | bounce | |
| | 17 | toss | |
| | 18 | spin | |
| | 19 | fly | |
| | 20 | vibrate | |
| | 21 | flow | |
| | 0, 22-64 | Reserved | |

TABLE 71-4-continued

| Names | Description | | |
|---|---|---|---|
| | Set of animations for deformation action. | | |
| Deformation | Binary representation (4 bits) | description | |
| | 1 | flip | |
| | 2 | stretch | |
| | 3 | swirl | |
| | 4 | twist | |
| | 5 | bend | |
| | 6 | roll | |
| | 7 | press | |
| | 8 | fall to pieces | |
| | 9 | explode | |
| | 10 | fire | |
| | 0, 11-64 | Reserved | |
| AdditionalAnimation | Set of animations for additional animation files. | | |

Figure 30:
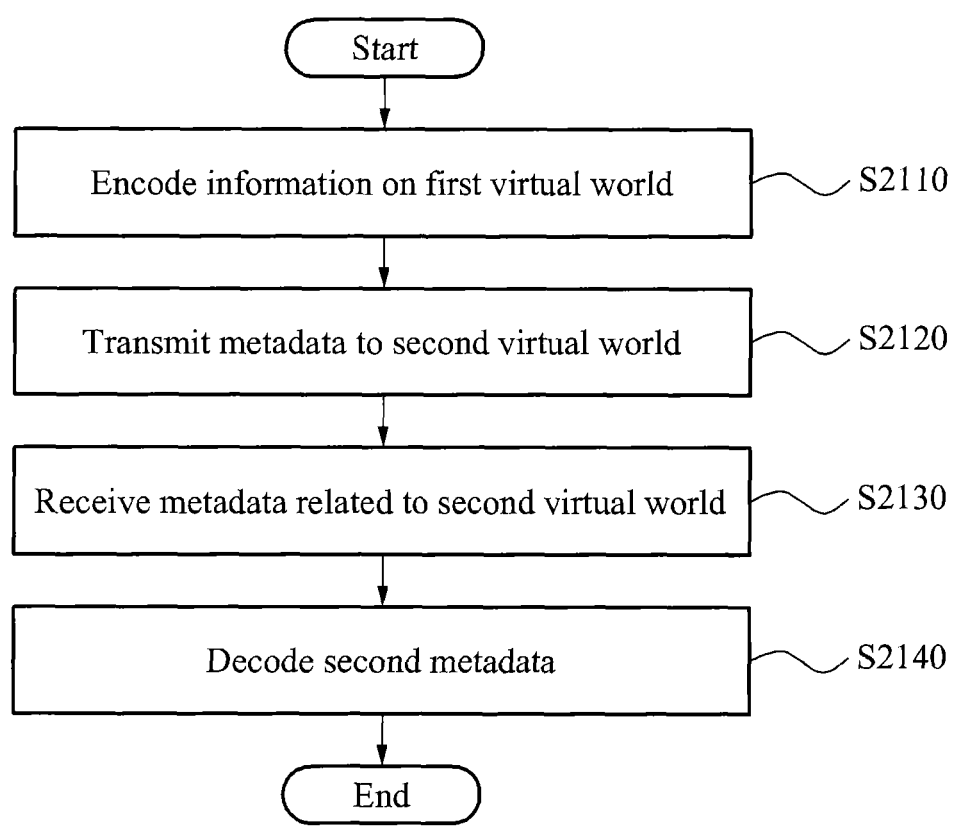
FIG. 30 is a flowchart illustrating a data transmission method, according to example embodiments.

FIG. 30 is a flowchart illustrating a data transmission method, according to example embodiments.

Referring to FIG. 30, the data transmission method to transmit data from a first virtual world to a second virtual world may encode information on the first virtual world into first metadata, in operation S2110.

The virtual world may be classified into a virtual environment and a virtual world object. The virtual world object may characterize various types of object in the virtual environment. In addition, the virtual world object may provide interaction in the virtual environment.

The virtual world object may include an avatar and a virtual object. The avatar may be used as representation of a user in the virtual environment.

Information on the virtual world may include at least one of information relating to the avatar of the virtual world and information relating to the virtual object of the virtual world.

The data transmission method may generate the first metadata by encoding the information on the first virtual world into a binary format. In addition, the data transmission method may generate the first metadata by encoding the information on the first virtual world into the binary format and losslessly compressing the binary format information.

Depending on embodiments, the data transmission method may generate the first metadata by encoding the information on the first virtual world into an XML format and encoding the XML format information into a binary format. In addition, the data transmission method may generate the first metadata by encoding the information on the first virtual world into an XML format, encoding the XML format information into a binary format, and losslessly compressing the binary format information.

The data transmission method may transmit the encoded first metadata to the second virtual world, in operation S2120. Depending on embodiments, the transmission unit 212 may transmit the encoded first metadata to a data transmission apparatus that corresponds to the second virtual world.

The data transmission method may receive the second metadata related to the second virtual world in operation S2130.

In addition, the data transmission method may decode the received second metadata in operation S2140. The data transmission method may recover information on the second virtual world by decoding the second metadata.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the data transmission apparatus, and its various embodiments, may include at least one processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A data transmission apparatus that transmits data relating to a first virtual world defining a first interactable computer-based simulated environment to a second virtual world defining a second interactable computer-based simulated environment, the data transmission apparatus comprising:
an encoder, configured by a processor, to encode information relating to the first virtual world for a virtual world object into a first metadata, based on a binary representation syntax; and
a transmission unit, configured by the processor, to transmit the first metadata to the second virtual world,
wherein the binary representation syntax defines elements available to be included in respective metadata, with flags in a corresponding metadata indicating which of the elements are present in the corresponding metadata,
wherein the first metadata comprises the flags and at least one element corresponding to at least one flag having a predetermined logic value that indicates presence of the at least one element in the first metadata,
wherein the elements comprise:
Identification describing an identification of a corresponding virtual world object;
SoundList describing a sound effect associated to the corresponding virtual world object;
ControlList describing a controlling of scaling, translation, or rotation associated to the corresponding virtual world object;
EventList describing an input event associated to the corresponding virtual world object; and
BehaviorModelList describing a behavior model associated to the corresponding virtual world object,
wherein the binary representation syntax defines a fixed region of each of the respective metadata comprising the flags and a variable region of each of the respective metadata respectively configured to comprise elements indicated as being present in the respective metadata according to the flags,
wherein a bit number of the fixed region is defined based on a number of the flags, and an order of present elements included in the variable region is defined according to an order of the flags in the fixed region, wherein the first metadata comprises the flags included in the fixed region and the at least one element included in the variable region according to an order of the at least one flag having the predetermined logic value, and wherein another data transmission apparatus receives the encoded information and applies the encoded information to the second virtual world.

2. The data transmission apparatus of claim 1, wherein the encoder generates the first metadata by encoding the information relating to the first virtual world into a binary format.

3. The data transmission apparatus of claim 2, wherein the encoder generates the first metadata by losslessly compressing the information encoded into the binary format.

4. The data transmission apparatus of claim 1, wherein the encoder generates the first metadata by encoding the information relating to the first virtual world into an XML format and encoding the XML format information into a binary format.

5. The data transmission apparatus of claim 4, wherein the encoder generates the first metadata by losslessly compressing the information encoded into the binary format.

6. The data transmission apparatus of claim 1, wherein the information relating to the first virtual world comprises at least one of information relating to an avatar of the first virtual world and information relating to a virtual object of the first virtual world.

7. The data transmission apparatus of claim 1, further comprising:
   a receiving unit, configured by the processor, to receive second metadata encoded from information on the second virtual world; and
   a decoder, configured by the processor, to decode the second metadata.

8. A data transmission method to transmit data relating to a first virtual world defining a first interactable computer-based simulated environment to a second virtual world defining a second interactable computer-based simulated environment, the data transmission method comprising:
   encoding, by a processor, information relating to the first virtual world for a virtual world object into a first metadata, based on a binary representation syntax; and
   transmitting, by the processor, the first metadata to the second virtual world,
   wherein the binary representation syntax defines elements available to be included in respective metadata, with flags in a corresponding metadata indicating which of the elements are present in the corresponding metadata,
   wherein the first metadata comprises the flags and at least one element corresponding to at least one flag having a predetermined logic value that indicates presence of the at least one element in the first metadata,
   wherein the elements comprise:
   Identification describing an identification of a corresponding virtual world object;
   SoundList describing a sound effect associated to the corresponding virtual world object;
   ControlList describing a controlling of scaling, translation, or rotation associated to the corresponding virtual world object;
   EventList describing an input event associated to the corresponding virtual world object; and
   BehaviorModelList describing a behavior model associated to the corresponding virtual world object,
   wherein the binary representation syntax defines a fixed region of each of the respective metadata comprising the flags and a variable region of each of the respective metadata respectively configured to comprise elements indicated as being present in the respective metadata according to the flags,
   wherein a bit number of the fixed region is defined based on a number of the flags, and an order of present elements included in the variable region is defined according to an order of the flags in the fixed region,
   wherein the first metadata comprises the flags included in the fixed region and the at least one element included in the variable region according to an order of the at least one flag having the predetermined logic value, and
   wherein another data transmission apparatus receives the encoded information and applies the encoded information to the second virtual world.

9. The data transmission method of claim 8, wherein the encoding comprises generating the first metadata by encoding the information relating to the first virtual world into a binary format.

10. The data transmission method of claim 9, wherein the encoding comprises: generating the first metadata by losslessly compressing the information encoded into the binary format.

11. The data transmission method of claim 8, wherein the encoding comprises: generating the first metadata by encoding the information relating to the first virtual world into an XML format and encoding the XML format information into a binary format.

12. The data transmission method of claim 11, wherein the encoding comprises:
   generating the first metadata by losslessly compressing the information encoded into the binary format.

13. The data transmission method of claim 8, further comprising:
   receiving second metadata encoded from information relating to the second virtual world; and
   decoding the second metadata.

14. A non-transitory computer readable recording medium storing a program to cause a computer to implement the method of claim 8.

15. A system for transmitting data between a first virtual world defining a first interactable computer-based simulated environment and a second virtual world defining a second interactable computer-based simulated environment, the system comprising:
   a first data transmission apparatus configured by a processor to encode information relating to the first virtual world, and to transmit the encoded information to a second data transmission apparatus; and
   the second data transmission apparatus configured by the processor to receive the encoded information from the first data transmission apparatus, and to decode the received encoded information based on a binary representation syntax,
   wherein the decoded information is applied to the second virtual world,
   wherein the binary representation syntax defines elements available to be included in a virtual world object, with flags indicating which of the elements are present in the virtual world object, and
   wherein the encoded information comprises the flags and at least one element corresponding to at least one flag having a predetermined logic value that indicates presence of the at least one element,
   wherein the elements comprise:
   Identification describing an identification of the virtual world object;

SoundList describing a sound effect associated to the virtual world object;
ControlList describing a controlling of scaling, translation, or rotation associated to the virtual world object;
EventList describing an input event associated to the virtual world object; and
BehaviorModelList describing a behavior model associated to the virtual world object,
wherein the binary representation syntax defines a fixed region comprising the flags and a variable region comprising the elements indicated as being present according to the flags,
wherein a bit number of the fixed region is defined based on a number of the flags, and an order of present elements included in the variable region is defined according to an order of the flags in the fixed region, and
wherein the encoded information comprises the flags included in the fixed region and the at least one element included in the variable region according to an order of the at least one flag having the predetermined logic value.

* * * * *